US012567122B1

(12) United States Patent (10) Patent No.: US 12,567,122 B1
Acharya et al. (45) Date of Patent: Mar. 3, 2026

(54) APPLICATION PROGRAMMING INTERFACE TO MODIFY TENSOR DIMENSIONS

(71) Applicant: NVIDIA Corporation, Santa Clara, CA (US)

(72) Inventors: Aravind Narayana Acharya, Redmond, WA (US); Somashekaracharya Gunasagara Bhaskaracharya, Redmond, WA (US); Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 164 days.

(21) Appl. No.: 17/723,986

(22) Filed: Apr. 19, 2022

(51) Int. Cl.
 *G06T 1/20* (2006.01)
 *G06F 8/30* (2018.01)
(52) U.S. Cl.
 CPC . *G06T 1/20* (2013.01); *G06F 8/30* (2013.01)
(58) Field of Classification Search
 CPC ................................... G06T 1/20; G06F 8/30
 USPC ............................................. 345/522; 726/1
 See application file for complete search history.

(56) References Cited

U.S. PATENT DOCUMENTS

| 10,108,538 B1 | 10/2018 | Temam et al. |
| 2007/0028076 A1 | 2/2007 | Wezelenburg |
| 2007/0294663 A1 | 12/2007 | McGuire et al. |
| 2008/0120626 A1* | 5/2008 | Graffagnino .......... G06F 40/123 |
| | | 719/320 |

| 2015/0350249 A1* | 12/2015 | Reno ................... H04L 63/1441 |
| | | 726/1 |
| 2016/0335120 A1 | 11/2016 | Gupta et al. |
| 2018/0268548 A1 | 9/2018 | Lin et al. |
| 2018/0321938 A1 | 11/2018 | Boswell et al. |
| 2019/0042092 A1* | 2/2019 | Wu ........................ G06N 3/063 |
| 2019/0138902 A1 | 5/2019 | Matveev |
| 2019/0205735 A1 | 7/2019 | Smelyanskiiy |
| 2019/0228809 A1 | 7/2019 | Srinivasan |
| 2019/0340499 A1 | 11/2019 | Burger et al. |
| 2019/0370631 A1* | 12/2019 | Fais ........................ G06N 3/105 |
| 2020/0034148 A1 | 1/2020 | Sumbul et al. |
| 2020/0042875 A1 | 2/2020 | Shazeer |
| 2020/0050429 A1 | 2/2020 | Li et al. |
| 2020/0074288 A1 | 3/2020 | Zhang et al. |
| 2020/0110986 A1* | 4/2020 | Michiels ................ G06N 3/045 |
| 2020/0134417 A1* | 4/2020 | Mohapatra .............. G06F 15/80 |
| 2020/0218777 A1 | 7/2020 | Xu |
| 2020/0349465 A1* | 11/2020 | Hechtman ............ G06F 8/4434 |
| 2020/0409664 A1 | 12/2020 | Li |

(Continued)

FOREIGN PATENT DOCUMENTS

| CN | 113205468 A | 8/2021 |

OTHER PUBLICATIONS

Cheng Zhiyu et al. Method and device for generating information Oct. 30, 2020 Baidu Com Times Tech Beijing Co Ltd; Baidu USA LLC CN111860076 (A) para. 13-16 and 55-63 English.*

(Continued)

*Primary Examiner* — Prabodh M Dharia
(74) *Attorney, Agent, or Firm* — Robert C. Kowert; Kowert, Hood, Munyon, Rankin & Goetzel, P.C.

(57) ABSTRACT

Apparatuses, systems, and techniques to perform image processing. In at least one embodiment, an application programming interface is performed to cause dimensions of a tensor to be modified.

30 Claims, 54 Drawing Sheets

100

(56) References Cited

U.S. PATENT DOCUMENTS

| | | | |
|---|---|---|---|
| 2020/0410318 A1 | 12/2020 | del Mundo et al. | |
| 2020/0410330 A1* | 12/2020 | Liu | G06F 9/38885 |
| 2021/0011849 A1* | 1/2021 | Simpson | G06F 13/28 |
| 2021/0042624 A1 | 2/2021 | Matveev | |
| 2021/0048991 A1 | 2/2021 | Tanner | |
| 2021/0056363 A1* | 2/2021 | Song | G06V 20/695 |
| 2021/0064987 A1* | 3/2021 | Springer | G06N 3/08 |
| 2021/0117806 A1* | 4/2021 | Liu | G06F 17/16 |
| 2021/0247978 A1 | 8/2021 | Malladi | |
| 2021/0303284 A1* | 9/2021 | Rodgers | G06F 17/16 |
| 2021/0303994 A1 | 9/2021 | Hariri et al. | |
| 2022/0012578 A1* | 1/2022 | Brady | G06N 3/063 |
| 2022/0058476 A1 | 2/2022 | Calidas et al. | |
| 2022/0101102 A1* | 3/2022 | Sheth | G06F 17/153 |
| 2022/0114234 A1 | 4/2022 | George et al. | |
| 2022/0137941 A1 | 5/2022 | Wu et al. | |
| 2022/0147826 A1 | 5/2022 | Xiao et al. | |
| 2022/0309336 A1* | 9/2022 | Minkin | G06F 17/16 |
| 2022/0366222 A1* | 11/2022 | Ye | G06N 3/045 |
| 2022/0374288 A1* | 11/2022 | Kibardin | G06N 3/084 |
| 2023/0076138 A1 | 3/2023 | Whatmough et al. | |
| 2023/0117042 A1 | 4/2023 | Mantia et al. | |
| 2023/0236891 A1 | 7/2023 | Xin | |
| 2023/0259758 A1 | 8/2023 | Zhang et al. | |
| 2023/0334747 A1* | 10/2023 | Sarokin | G06T 15/005 |

OTHER PUBLICATIONS

Cheng Zhiyu et al. Method and device for generating information Oct. 30, 2020 Baidu Com Times Tech Beijing Co Ltd; Baidu USA LLC CN111860076 (A) para. 13-16 and 55-63 Chinese.*

Lyu Chengfei; End-cloud cooperative processing method and device; Mar. 11, 2022; Univ Zhejiang; CN114172908 (A); paras. 56-104, fig. 1-6 English.*

Lyu Chengfei; End-cloud cooperative processing method and device; Mar. 11, 2022; Univ Zhejiang; CN114172908 (A); paras. 56-104, fig. 1-6 Chinese.*

Chetlur et al., "cuDNN: Efficient Primitives for Deep Learning," Dec. 18, 2014, retrived Dec. 30, 2020 from https://arxiv.org/pdf/1410.0759.pdf, 9 pages.

IEEE "IEEE Standard for Floating-Point Arithmetric", Microprocessor Standards Committee of the IEEE Computer Society, IEEE Std 754-2008, dated Jun. 12, 2008.

Nvidia, "Nvidia cuDNN," Retrieved from, "https://developer.nvidia. com/cudnn," 2020,4 pages.

Gu et al., "Improving Execution Concurrency of Large-Scale Matrix Multiplication on Distributed Data-Parallel Platforms," 2017, 14 pages.

U.S. Appl. No. 17/723,886, filed Apr. 19, 2022, Aravind Narayana Acharya, et al.

Paul Springer, et al., "Design of a High-Performance GEMM-like Tensor-Tensor Multiplication," ACM Transactions on Mathematical Software, Jan. 2018, vol. 44, No. 3, Article 28, 29 pages.

* cited by examiner

100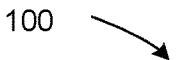

```
                    ┌─────────────────────────────────────────┐
                    │            PROCESSOR                     │
                    │                                          │
┌──────────────┐    │   ┌──────────────────┐                  │
│              │    │   │                  │                  │
│ SPECIFICATION│────┼──▶│    COMPILER      │                  │
│              │    │   │                  │                  │
│     102      │    │   │      106         │                  │
└──────────────┘    │   └──────────────────┘                  │
                    │            │                             │
                    │            ▼                             │
                    │   ┌──────────────────┐        ┌──────────────────┐
                    │   │     KERNEL       │        │    SOFTWARE      │
                    │   │   OPTIMIZER      │───────▶│     KERNEL       │
                    │   │                  │        │                  │
                    │   │      108         │        │      112         │
                    │   └──────────────────┘        └──────────────────┘
                    │                                         │
                    │                                         ▼
                    │   ┌──────────────────┐        ┌──────────────────┐
                    │   │                  │        │    GRAPHICS      │
                    │   │    PROCESSOR     │        │   PROCESSOR      │
                    │   │     MEMORY       │        │ ┌──────────────┐ │
                    │   │                  │        │ │   GRAPHICS   │ │
                    │   │      110         │        │ │  PROCESSOR   │ │
                    │   └──────────────────┘        │ │   MEMORY     │ │
                    │                               │ │     116      │ │
                    │          104                  │ └──────────────┘ │
                    └───────────────────────────────│      114         │
                                                    └──────────────────┘
```

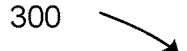

```
                          CONVOLUTION for (n=0; n < BATCH_SIZE; n++)
  for (p=0; p < IMAGE_HEIGHT; p++)
    for (q=0; q < IMAGE_WIDTH; q++)
      for (k=0; k < OUTPUT_CHANNELS; k++)
        for (c=0; c < INPUT_CHANNELS; c++)
          for (r=0; r < FILTER_HEIGHT; r++)
            for (s=0; s < FILTER_WIDTH; s++)
              OUTPUT[n][p][q][k] = IMAGE[n][p-r][q-s][c] *
                                   FILTER[k][r][s][c];
```

302

```
                          CONVOLUTION
                       (N C P Q)(K C R S)

for (n=0; n < N; n++)
  for (p=0; p < P; p++)
    for (q=0; q < Q; q++)
      for (k=0; k < K; k++)
        for (c=0; c < C; c++)
          for (r=0; r < R; r++)
            for (s=0; s < S; s++)
              OUTPUT[n][p][q][k] = IMAGE[n][p-r][q-s][c] *
                                   FILTER[k][r][s][c];
```

304

```
                          CONVOLUTION
                       (N P Q) x K x (C R S)

for (i=0; i < N * P * Q; i++)
  for (k=0; k < K; k++)
    for (j=0; j < C * R * S; j++)
      OUTPUT[i][k] = IMAGE[i][j] * FILTER[j][k];
```

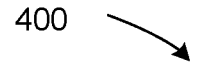
400
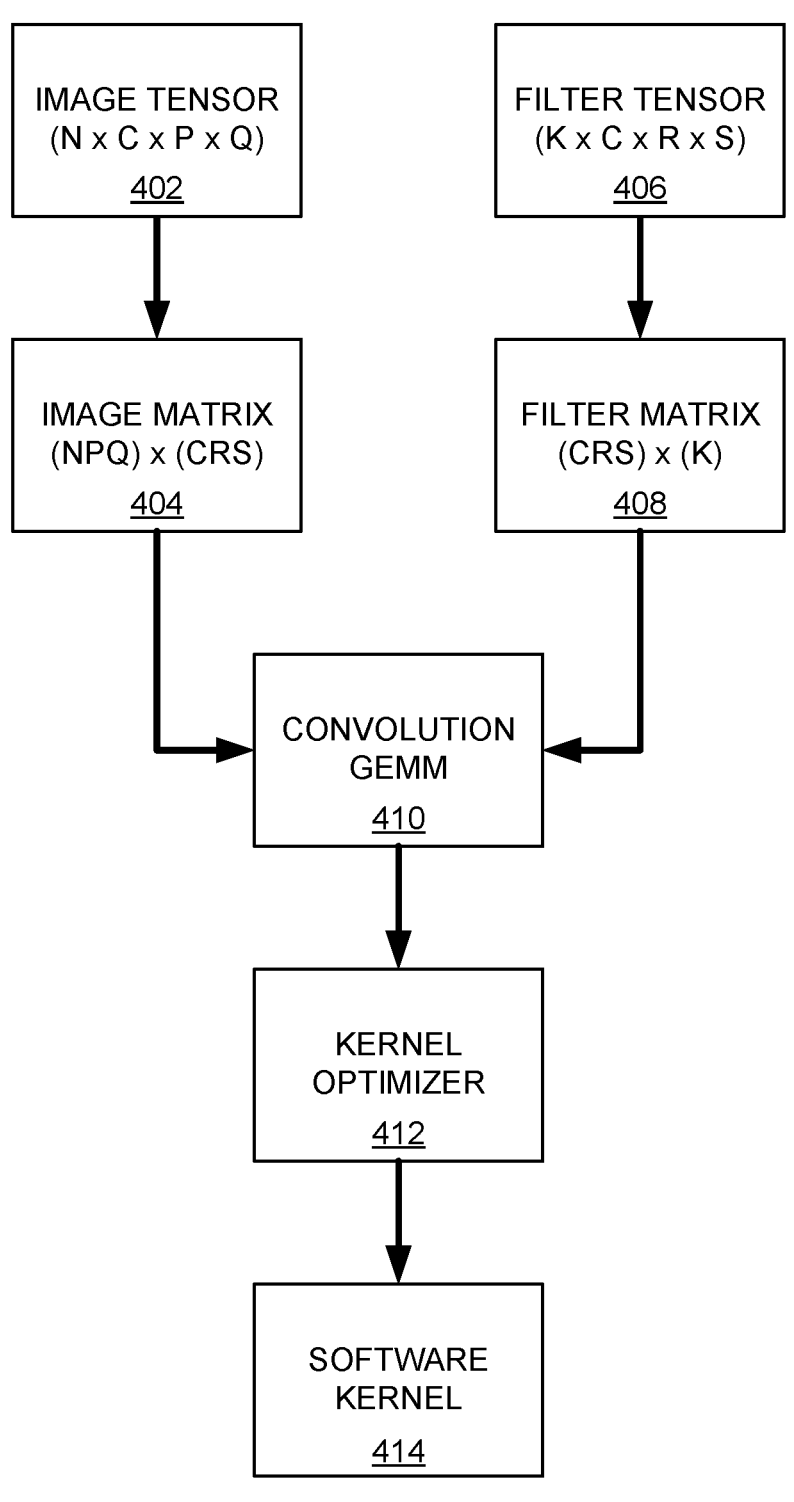
FIG. 4

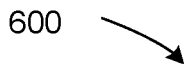
600
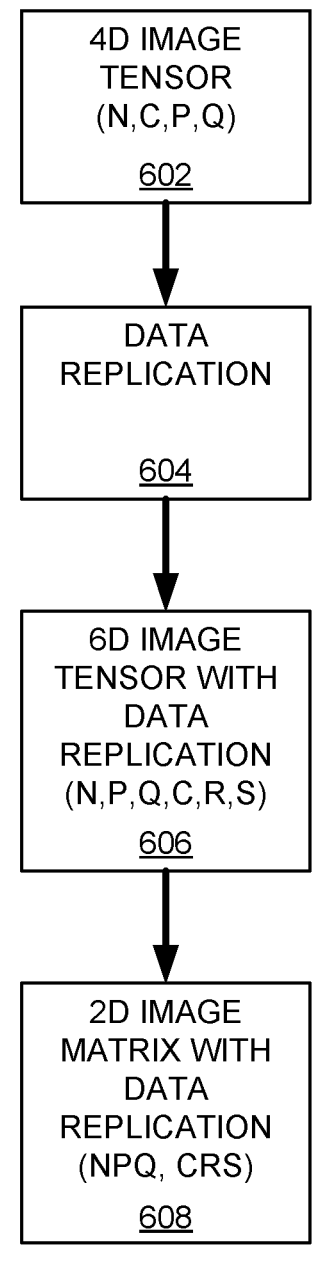
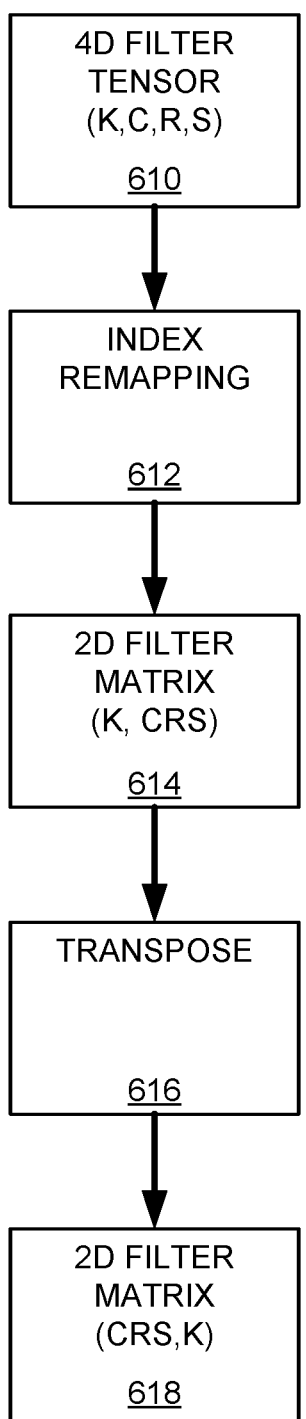
FIG. 6

700

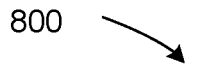
800
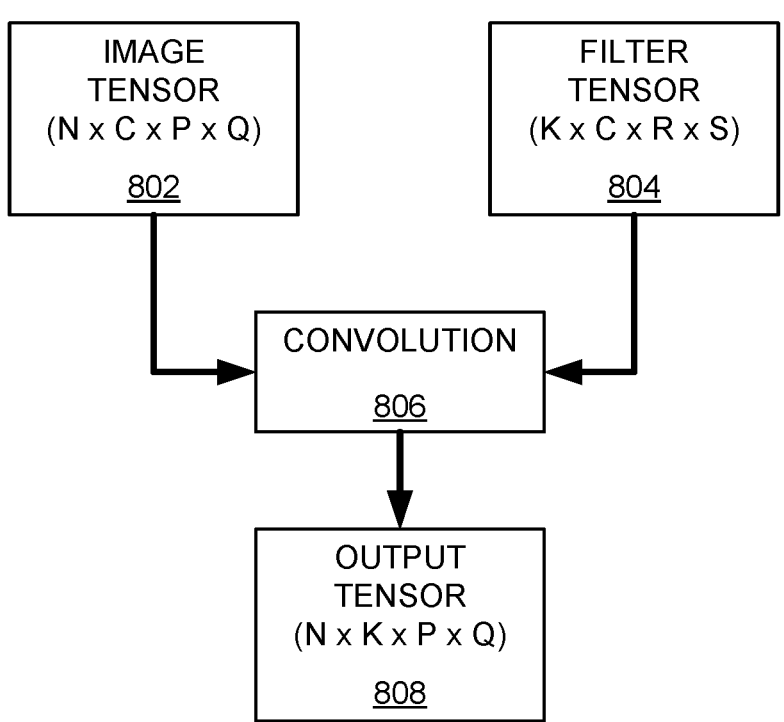
FIG. 8

900

IMAGE
TENSOR
(N x C x P x Q)
1002

FILTER
TENSOR
(K x C x R x S)
1004

CONVOLUTION
1006

RESULT
TENSOR
(N x K x P x Q)
1008

OPERAND
TENSOR
(N x K x P x Q)
1010

ADDITION
1012

OUTPUT
TENSOR
(N x K x P x Q)
1014

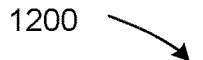

1200

```
┌──────────────┐          ┌──────────────┐
│    IMAGE     │          │   OPERAND    │
│   TENSOR     │          │   TENSOR     │
│ (N x C x P x Q)│        │ (N x C x P x Q)│
│    1202      │          │    1204      │
└──────────────┘          └──────────────┘
        │                         │
        │     ┌──────────────┐    │
        └────►│   ADDITION   │◄───┘
              │              │
              │    1206      │
              └──────────────┘
                      │
                      ▼
        ┌──────────────┐          ┌──────────────┐
        │    RESULT    │          │    FILTER    │
        │   TENSOR     │          │   TENSOR     │
        │ (N x C x P x Q)│        │ (K x C x R x S)│
        │    1208      │          │    1210      │
        └──────────────┘          └──────────────┘
                │                         │
                │   ┌──────────────┐      │
                └──►│ CONVOLUTION  │◄─────┘
                    │    1212      │
                    └──────────────┘
                            │
                            ▼
                    ┌──────────────┐
                    │    OUTPUT    │
                    │   TENSOR     │
                    │ (N x K x P x Q)│
                    │    1214      │
                    └──────────────┘
```

FIG. 12

IMAGE
TENSOR
(N x C x P x Q)
1302

FILTER
TENSOR
(K x C x R x S)
1304

CONVOLUTION
1306

RESULT
TENSOR
(N x K x P x Q)
1308

REDUCTION
1312

REDUCTION
OPERATION
1310

OUTPUT
TENSOR
(? x ? x ? x ?)
1314

Figure 14:
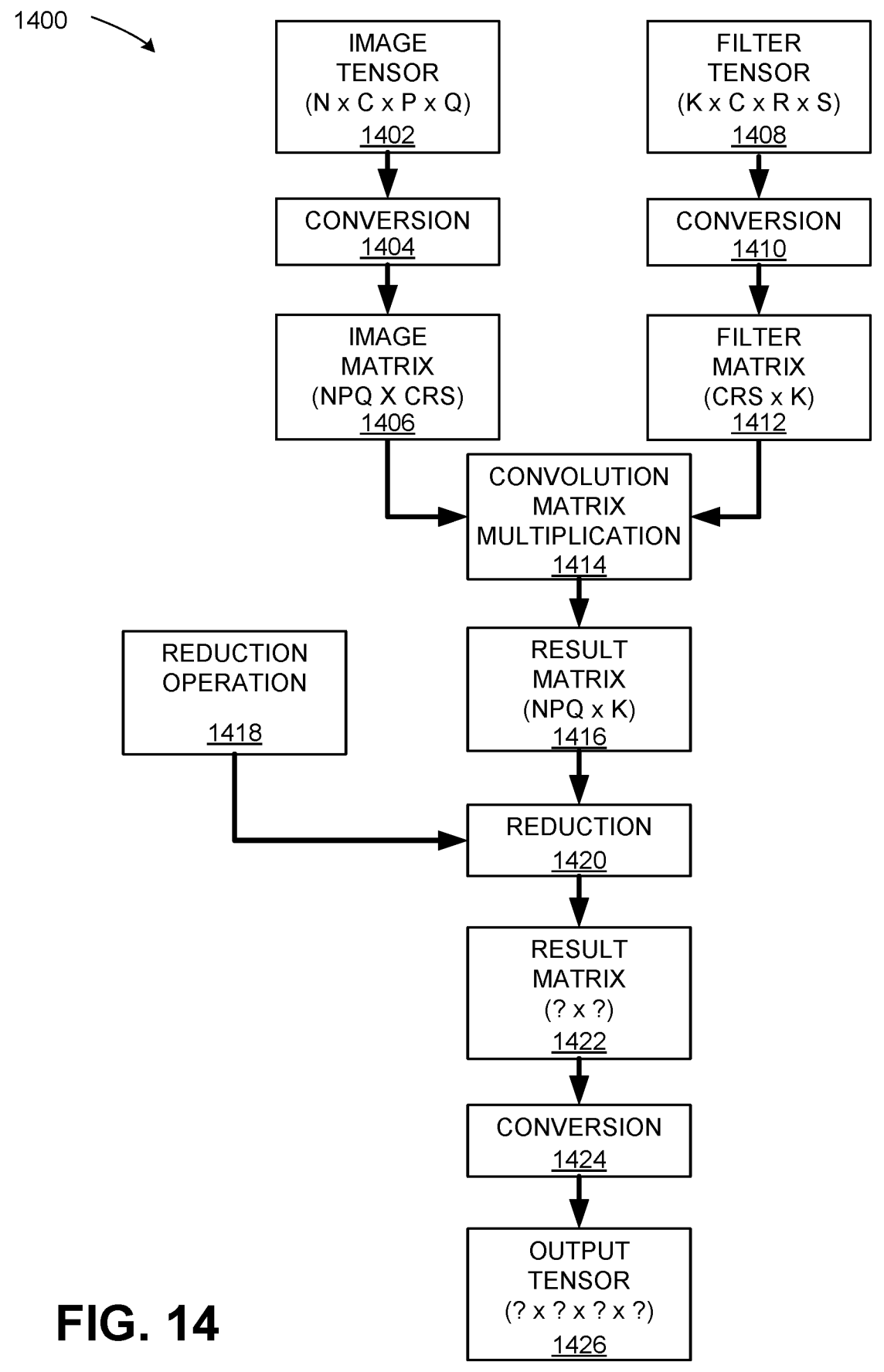

1400

IMAGE
TENSOR
(N x C x P x Q)
1402

FILTER
TENSOR
(K x C x R x S)
1408

CONVERSION
1404

CONVERSION
1410

IMAGE
MATRIX
(NPQ X CRS)
1406

FILTER
MATRIX
(CRS x K)
1412

CONVOLUTION
MATRIX
MULTIPLICATION
1414

REDUCTION
OPERATION

1418

RESULT
MATRIX
(NPQ x K)
1416

REDUCTION
1420

RESULT
MATRIX
(? x ?)
1422

CONVERSION
1424

OUTPUT
TENSOR
(? x ? x ? x ?)
1426

DATA CENTER
1700
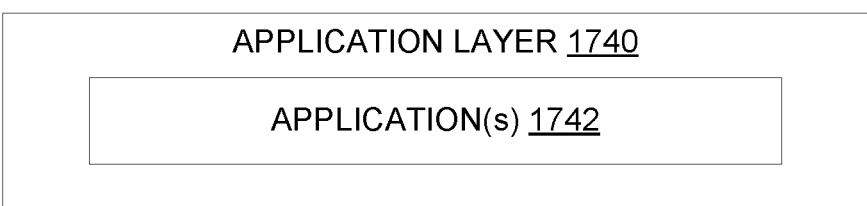
APPLICATION LAYER 1740
APPLICATION(s) 1742
SOFTWARE LAYER 1730
SOFTWARE 1752
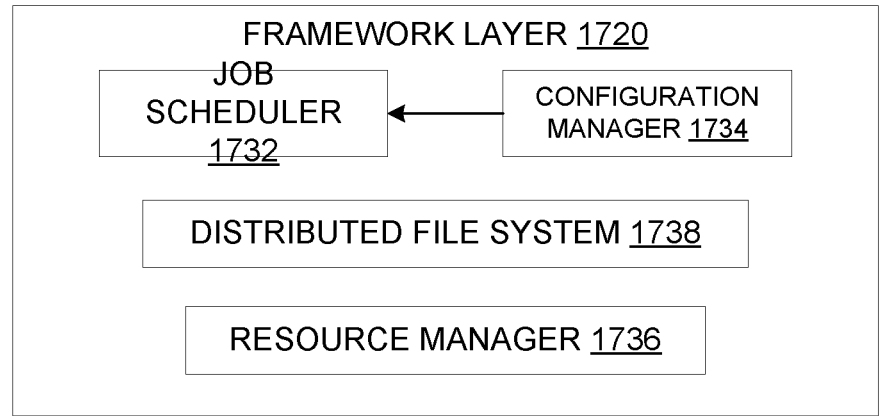
FRAMEWORK LAYER 1720
JOB SCHEDULER 1732
CONFIGURATION MANAGER 1734
DISTRIBUTED FILE SYSTEM 1738
RESOURCE MANAGER 1736
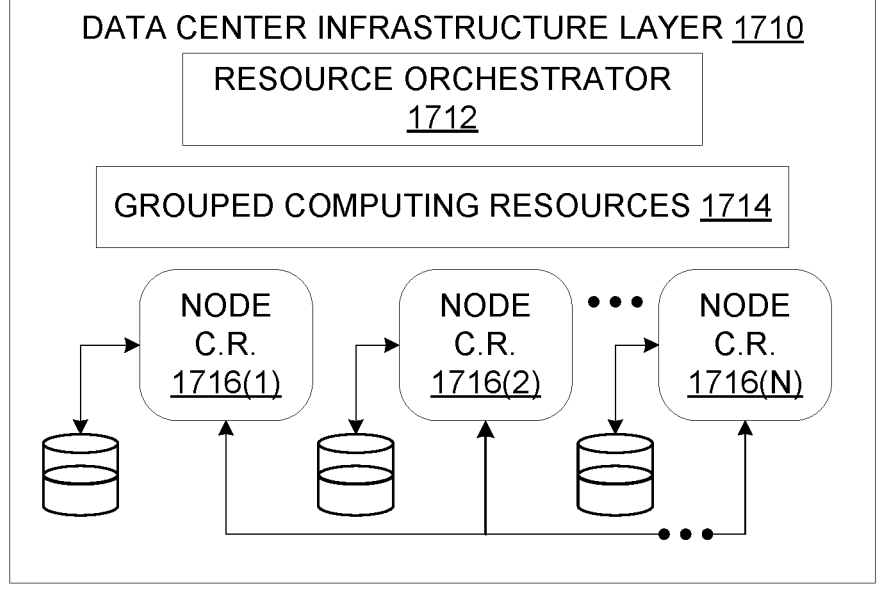
DATA CENTER INFRASTRUCTURE LAYER 1710
RESOURCE ORCHESTRATOR 1712
GROUPED COMPUTING RESOURCES 1714
NODE C.R. 1716(1)
NODE C.R. 1716(2)
• • •
NODE C.R. 1716(N)
FIG. 17

INTEGRATED
CIRCUIT
2100

2610

GRAPHICS PROCESSOR
2640

INTER-CORE TASK MANAGER
(e.g., THREAD DISPATCHER)
2645

SHADER CORE 2655A

SHADER CORE 2655C

SHADER CORE 2655E

- - -

SHADER CORE 2655N-1

SHADER CORE 2655B

SHADER CORE 2655D

SHADER CORE 2655F

- - -

SHADER CORE 2655N

TILING UNIT
2658

MMU
2620A

MMU
2620B

CACHE
2625A

CACHE
2625B

INTERCONNECT
2630A

INTERCONNECT
2630B

GRAPHICS CORE
2700

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
4410

CUDA to HIP Translation Tool 4420

CUDA Kernel Launch Syntax 4510

KernelName<<<GridSize, BlockSize,
SharedMemorySize,
Stream>>>(KernelArguments);

HIP Kernel Launch Syntax 4520 hipLaunchKernelGGL(KernelName, GridSize,
BlockSize, SharedMemorySize, Stream,
KernelArguments);

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
4430

FIG. 45

Grid 4720
GridSize = dim3(BX,BY,1)    BlockSize = dim3(TX,TY,1)

Thread Block 4730(1,1)

Thread
4740(1,1)

Thread
4740(1,TY)

Thread
4740(TX,1)

Thread
4740(TX,TY)

4730(1,BY)

Shared
Memory
4660(1)

4730(BJ,1)

4730(BJ,BY)

Compute
Unit 4640(1)

4730(BJ+1,1)

Compute Unit
4640(2)

4730(BJ+1,BY)

4730(BX,1)

4730(BX,BY)

Shared
Memory
4660(2)

Compute Unit 4640(C)

Programmable Processing
Unit 4620(1)

APPLICATION PROGRAMMING INTERFACE TO MODIFY TENSOR DIMENSIONS

CROSS-REFERENCE TO RELATED APPLICATIONS

This application incorporates by reference for all purposes the full disclosures of co-pending U.S. patent application Ser. No. 17/723,886, filed concurrently herewith, entitled "APPLICATION PROGRAMMING INTERFACE TO GENERATE A SOFTWARE KERNEL".

FIELD

At least one embodiment pertains to processing resources used to execute one or more CUDA programs. For example, at least one embodiment pertains to processing resources used to execute one or more CUDA programs that generate software kernels to perform image processing operations.

BACKGROUND

Performing computational operations can use significant memory, time, or computing resources. For example, a graphics processing unit (GPU) can be used to perform image processing operations such as, for example, convolution filters and reduction operations to extract image information. Often, performing such image processing operations involves building custom graphics pipelines that require human expertise and that do not make efficient use of GPU resources. An amount of human expertise, computer memory, time, or computing resources used to perform such operations can be improved.

BRIEF DESCRIPTION OF THE DRAWINGS

FIG. 1 illustrates an example computer system where software kernels are to be generated, in accordance with at least one embodiment;

FIG. 3 illustrates three example algorithms where image convolution is to be performed, in accordance with at least one embodiment;

FIG. 4 illustrates an example data flow where a software kernel of a convolution operation is to be generated, in accordance with at least one embodiment;

FIG. 6 illustrates an example data flow where general matrix multiplication representations of tensors are to be generated, in accordance with at least one embodiment;

FIG. 8 illustrates an example data flow where a convolution operation using tensors is to be performed, in accordance with at least one embodiment;

FIG. 12 illustrates an example data flow where an addition operation and a convolution operation using tensors are to be performed, in accordance with at least one embodiment;

FIG. 14 illustrates an example data flow where a convolution operation and a reduction using general matrix multiplication are to be performed, in accordance with at least one embodiment;

FIG. 17 illustrates an exemplary data center, in accordance with at least one embodiment;

FIG. 45 illustrates an exemplary kernel translated by CUDA-to-HIP translation tool of FIG. 44C, in accordance with at least one embodiment;

DETAILED DESCRIPTION

Figure 2:
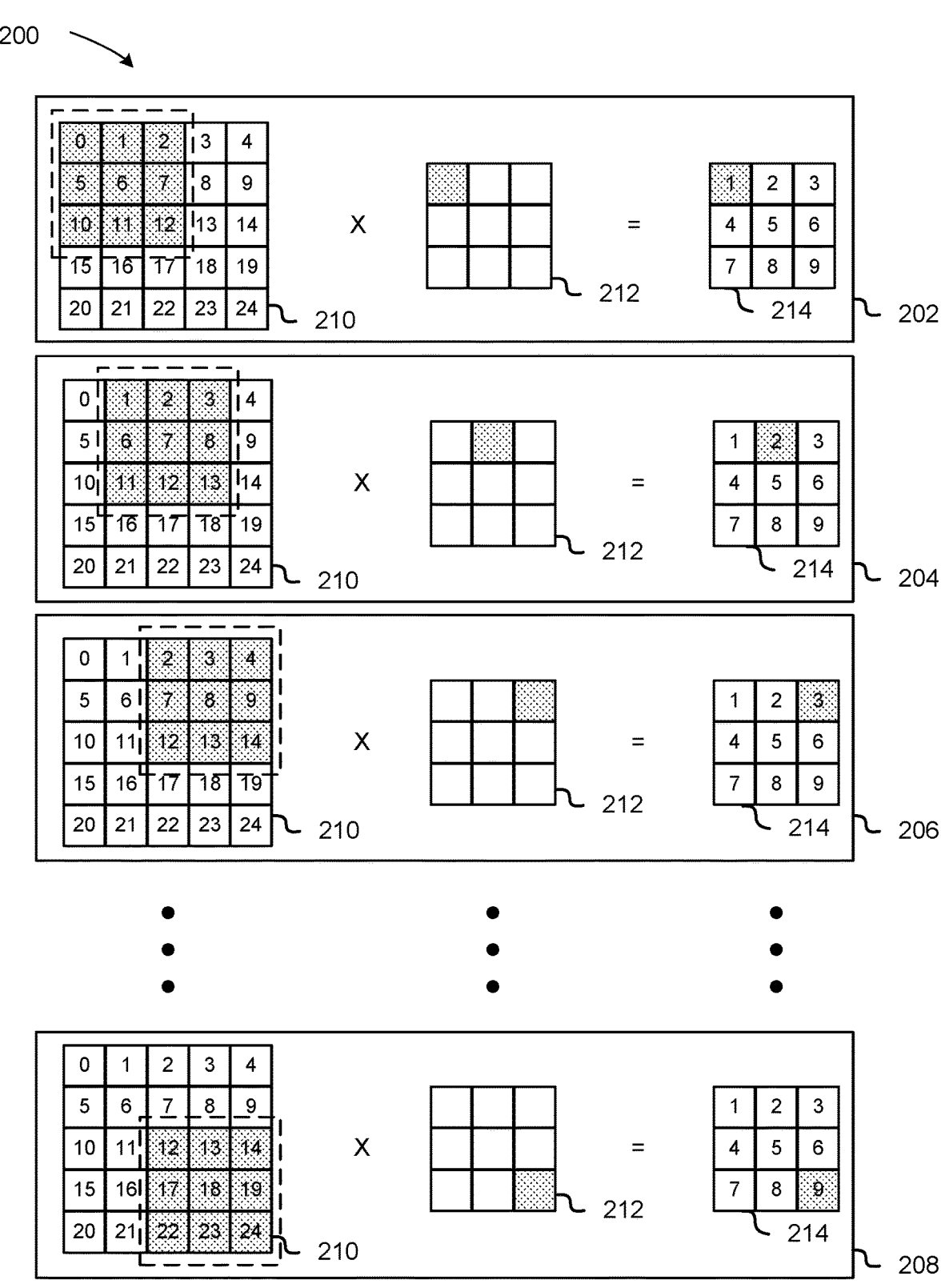
FIG. 2 illustrates an example data structure where image processing operations are to be performed, in accordance with at least one embodiment.

FIG. 1 illustrates an example computer system 100 where software kernels are to be generated, in accordance with at least one embodiment. In at least one embodiment, a processor 104 is to receive a specification 102. In at least one embodiment, specification 102 is a description of one or more operations such as, for example, image processing operations that are to be compiled to produce a software kernel, as described herein. In at least one embodiment, specification 102 is a description of one or more image processing operations that are to be performed by a graphics processor 114. In at least one embodiment, processor 104 is a single-core processor, a multicore processor, a graphics processor, a parallel processor, a general purpose graphics processor, and/or some other processor such as those described herein in connection with FIGS. 17 to 48. In at least one embodiment, graphics processor 114 is a single-core graphics processor, a multicore graphics processor, a parallel graphics processor, a general purpose graphics processor, and/or some other processor such as those described herein in connection with FIGS. 17 to 48. In at least one embodiment, processor 104 has associated processor memory 110. In at least one embodiment, processor memory 110 may be used to, for example, store specification 102. In at least one embodiment, graphics processor 114 has associated graphics processor memory 116. In at least one embodiment, graphics processor memory 116 may be used to, for example, store software kernel 112.

In at least one embodiment, specification 102 describes one or more image processing operations that are to be performed by graphics processor 114 such as, for example, convolution, tensor addition, tensor reduction, and/or other such operations including, but not limited to, those described herein. In at least one embodiment, specification 102 is a plain language description of image processing operations that are to be performed by graphics processor 114. In at least one embodiment, specification 102 is a pseudocode description of image processing operations that are to be performed by graphics processor 114. In at least one embodiment, specification 102 is a graphical description of image processing operations that are to be performed by graphics processor 114 such as, for example, a directed acyclical graph (DAG). In at least one embodiment, specification 102 is source code that specifies image processing operations that are to be performed by graphics processor 114 using, for example, a programming language such as those described herein.

In at least one embodiment, when processor 104 receives specification 102, a compiler 106 executing on processor 104 is to generate one or more software kernels such as those described herein, using specification 102. In at least one embodiment, compiler 106 is to generate a software kernel 112 using a library of software kernel elements. In at least one embodiment, for example, compiler 106 is to generate a software kernel 112 of a convolution operation and an addition operation by combining a software kernel element of a convolution with a software kernel element of an addition operation. In at least one embodiment, compiler 106 is to generate a software kernel 112 without using a library of software kernel elements. In at least one embodiment, software kernel elements are to be generated automatically from specification 102.

In at least one embodiment, output of compiler 106 is a first software kernel that is to be provided to a kernel optimizer 108. In at least one embodiment, kernel optimizer 108 is to receive output of compiler 106 and is to generate an optimized software kernel 112. In at least one embodiment, optimized software kernel 112 is optimized to execute using graphics processor 114, as described herein. In at least one embodiment, software kernel 112 is to be provided to graphics processor 114. In at least one embodiment, graphics processor 114 executes software kernel 112. In at least one embodiment, not shown in FIG. 1, one or more results from graphics processor 114 executing software kernel 112 are to be returned to a process executing on processor 104, as described herein. In at least one embodiment, not shown in FIG. 1, compiler 106 provides software kernel 112 to graphics processor 114, without processing by kernel optimizer 108.

In at least one embodiment, a processor such as processor 104 comprises one or more circuits to perform an API to cause a software kernel to be generated to perform an implicit matrix multiplication operation. In at least one embodiment, a processor such as processor 104 comprises

Figure 16:
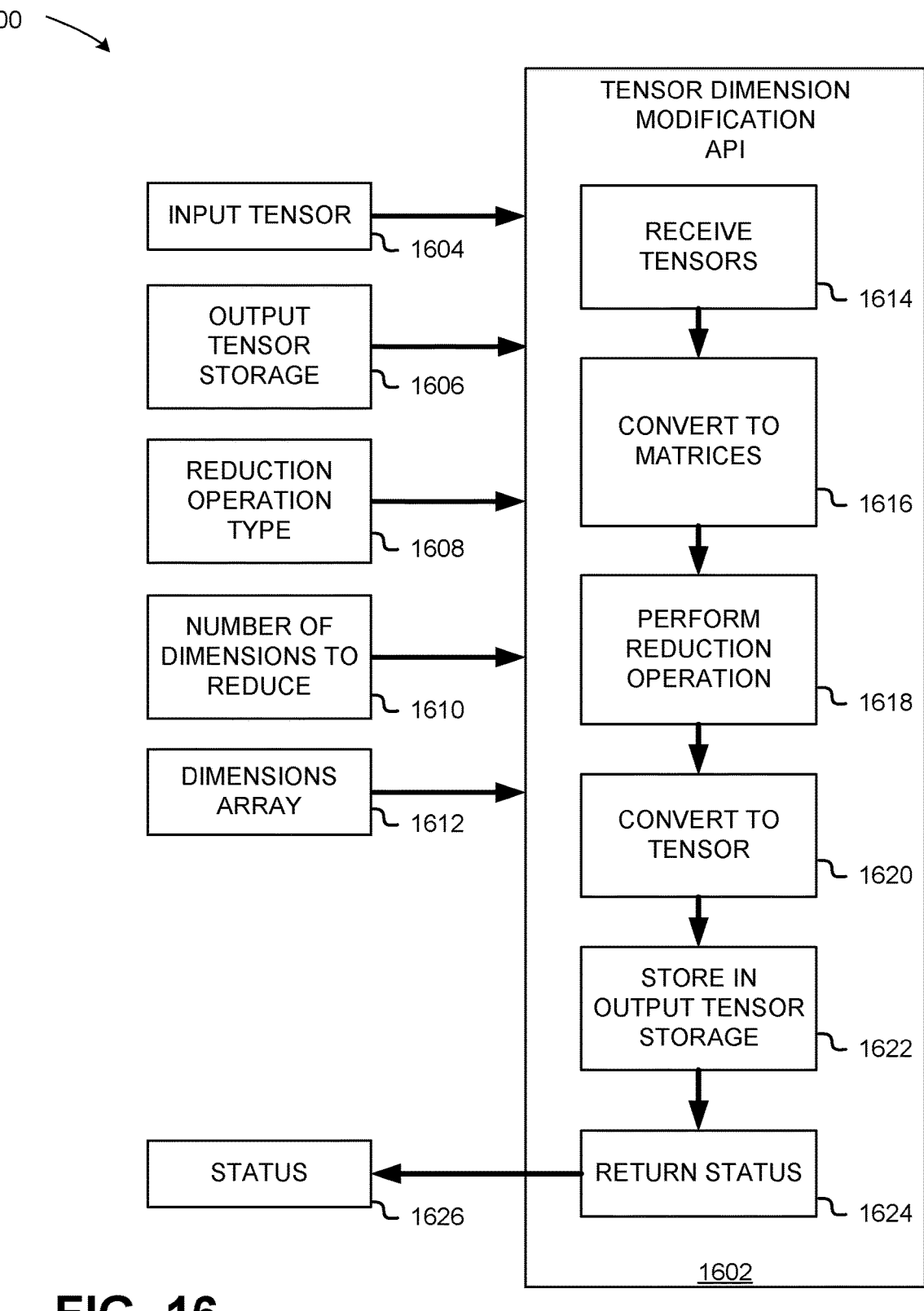
FIG. 16 illustrates an example application programming interface to cause one or more dimensions of a tensor to be modified, in accordance with at least one embodiment.

5 one or more circuits to perform an API to cause a software kernel to be generated to perform an implicit matrix multiplication operation such as, for example, implicit matrix multiplication API 1602, described herein at least in connection with FIG. 16. In at least one embodiment, a processor such as processor 104 comprises one or more circuits to perform an API to cause one or more dimensions of a tensor to be modified. In at least one embodiment, a processor such as processor 104 comprises one or more circuits to perform an API to cause one or more dimensions of a tensor to be modified such as, for example, tensor dimension modification API 1702, described herein at least in connection with FIG. 17.

In at least one embodiment, a processor such as processor 104 comprises one or more circuits to perform an API to cause a convolution operation to be performed as a matrix multiplication operation without storing one or more operands of a matrix operation. In at least one embodiment, a processor such as processor 104 comprises one or more circuits to perform an API to cause a convolution operation and a tensor reduction operation to be combined into a software kernel.

In at least one embodiment, deep-learning (DL) models use convolution operations, where a convolution can involve many individual matrix multiplication operations. In at least one embodiment, a technique to make a convolution more efficient is to perform a convolution as a single GEMM operation that involves generating two matrices that, when multiplied together provide a same result as a tensor convolution, as described herein. In at least one embodiment, matrices of a GEMM replicate individual elements of tensor input data into a plurality of different locations in matrices of a GEMM, as described herein. In at least one embodiment, a single element from a convolution operand might be stored multiple times in a GEMM. In at least one embodiment, DL models use a reduction of tensor dimension operations. In at least one embodiment, matrix multiplication of a tensor includes matrix multiplication of two-dimensional (2D) tensors, three-dimensional (3D) tensors, four-dimensional (4D) tensors, and higher dimensional tensors. In at least one embodiment, matrix multiplication of a tensor includes 2D convolutions, 3D convolutions, and higher dimensional convolutions. In at least one embodiment, matrix multiplication of a tensor may be referred to as a primitive to perform a matrix multiplication of a tensor including, but not limited to, 2D tensors, 3D tensors, etc. In at least one embodiment, matrix multiplication of a tensor includes one or more instructions to perform a matrix multiplication and/or one or more instructions to convert a tensor to a matrix. In at least one embodiment, matrix multiplication of a tensor receives tensors as operands. In at least one embodiment, for example, matrix multiplication of a 2D tensor may receive one or more 2D tensors as operands. In at least one embodiment, for example, matrix multiplication of a 3D tensor may receive one or more 3D tensors as operands.

Figure 15:
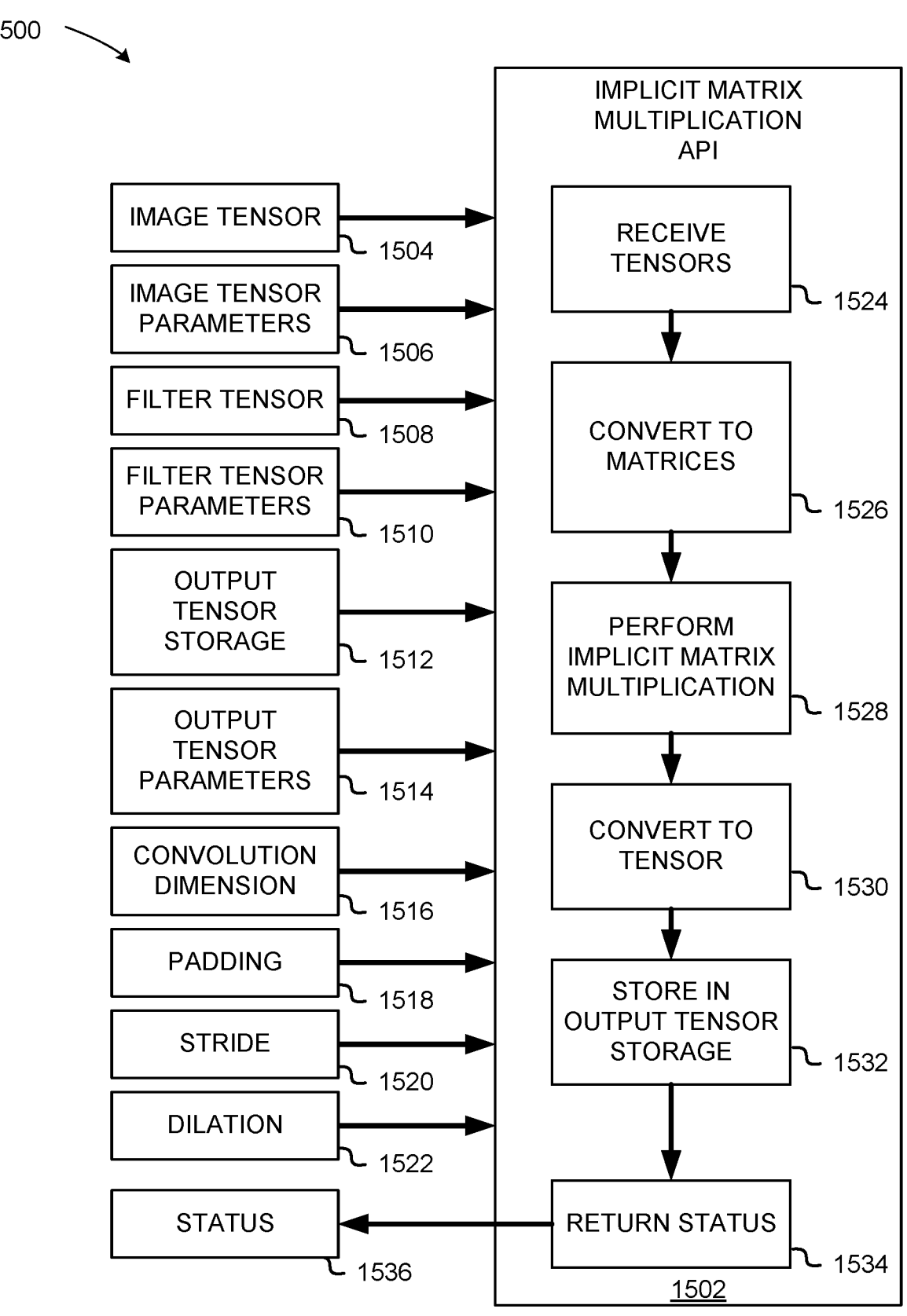
FIG. 15 illustrates an example application programming interface to cause a software kernel to be generated to perform an implicit matrix multiplication operation, in accordance with at least one embodiment.

In at least one embodiment, an API such as implicit matrix multiplication API 1502 described herein at least in connection with FIG. 15 is to cause a compiler to generate a software kernel to perform a convolution operation as an implicit GEMM. In at least one embodiment, an implicit GEMM is a way of performing a convolution as a GEMM without storing operands as matrices in memory, as described herein. In at least one embodiment, threads to perform computations of an implicit GEMM are configured to read data from convolution operands in memory in sequence. In at least one embodiment, elements of GEMM operands are replicated in memory such as global memory. In at least one embodiment, inputs to an API such as implicit matrix multiplication API 1502 include parameters of input tensor and filter tensor of a convolution, where said parameters describe dimensions, layout in memory, etc. of input tensors. In at least one embodiment, when API an API such as implicit matrix multiplication API 1502 is included in source code, a compiler detects it and generates a software kernel to perform convolution as an implicit GEMM (i.e., as a GEMM where matrix operands are not replicated in global memory).

In at least one embodiment, an API such as tensor dimension modification API 1602 is to perform a tensor operation that first reduces multiple dimensions of a tensor (referred to as a reduction operation) before performing said operation. In at least one embodiment, for example, a multidimensional reduction operation may include converting a 4D tensor to a 2D matrix (4D to 2D) or summing elements of a tensor to obtain a scalar value (4D to 1D). In at least one embodiment, an API such as tensor dimension modification API 1602 is to perform a tensor operation that increases multiple dimensions of a tensor. In at least one embodiment, for example, an API such as tensor dimension modification API 1602 adds one or more dimensions to a tensor to convert a 2D matrix to a 4D tensor or to convert a 4D tensor to a 6D tensor using, for example, data replication as described herein. In at least one embodiment, an API such as tensor dimension modification API 1602 is to allow a reduction operation to be combined with a convolution operation when dimensions of a converted tensor of an operation are identical to dimensions of a GEMM used of a convolution. In at least one embodiment, inputs of an API such as tensor dimension modification API 1602 include a descriptor of an input tensor, an operation to be performed (which can be a null operation, for a simple conversion), an array of dimensions of an input tensor that will be reduced in a reduction operation (for example, reducing first, second, and fourth dimensions), and a memory location to store a result tensor. In at least one embodiment, an API such as tensor dimension modification API 1602 returns a status indicator of success or failure and stores a result in a provided memory location.

In at least one embodiment, an API such as tensor dimension modification API 1602 performs instructions to reduce a rank of a tensor so that, for example, a rank 4 tensor (4D tensor) may be reduced to a rank 2 tensor (a 2D matrix), or a rank 4 tensor (4D tensor) may be reduced to a rank 1 tensor (a 1D vector), or a rank 4 tensor (4D tensor) may be reduced to a rank 0 tensor (a scalar value), as described herein. In at least one embodiment, an API such as tensor dimension modification API 1602 performs instructions to increase a rank of a tensor so that, for example, a rank 2 tensor (2D matrix) may be increased to a rank 4 tensor (4D tensor) or a rank 4 tensor may be increased to a rank 6 tensor (6D tensor), using systems and methods such as those described herein. In at least one embodiment, when an API such as tensor dimension modification API 1602 is included in source code, a compiler will detect when a reduction operation can be combined with a result of a convolution and, when possible, generate a software kernel that has both convolution and reduction operations.

FIG. 2 illustrates an example data structure 200 where image processing operations are to be performed, in accordance with at least one embodiment. In at least one embodiment, example data structure is a data structure used to perform a convolution operation, as described herein. In at least one embodiment, a first step 202 of a convolution operation is performed. In at least one embodiment, at first step 202, an image 210 is processed using a filter 212 so that a first section of image 210 (pixels 0, 1, 2, 5, 6, 7, 10, 11, and 12) are processed using filter 212 to produce a first part of output 214 (pixel 1). In at least one embodiment, a second step 204 of a convolution operation is performed. In at least one embodiment, at second step 204, image 210 is processed using filter 212 so that a second section of image 210 (pixels 1, 2, 3, 6, 7, 8, 11, 12, and 13) are processed using filter 212 to produce a second part of output 214 (pixel 2). In at least one embodiment, a third step 206 of a convolution operation is performed. In at least one embodiment, at third step 206, image 210 is processed using filter 212 so that a third section of image 210 (pixels 2, 3, 4, 7, 8, 9, 12, 13, and 14) are processed using filter 212 to produce a third part of output 214 (pixel 3). In at least one embodiment, at last step 208, image 210 is processed using filter 212 so that a last section of image 210 (pixels 12, 13, 14, 17, 18, 19, 22, 23, and 24) are processed using filter 212 to produce a last part of output 214 (pixel 9).

In at least one embodiment, one or more parameters of image processing operations such as convolution operations such as those described herein may be provided. In at least one embodiment, for example, a stride, padding, and/or dilation parameter may be provided. In at least one embodiment, for example, a stride parameter may be provided that is used to specify how far to move a filter such as filter 212 at each iteration. In at least one embodiment, as illustrated in FIG. 2, a stride is 1. In at least one embodiment, with a stride of 2, a first iteration may process a first section of image 210 (pixels 0, 1, 2, 5, 6, 7, 10, 11, and 12) and a second iteration may process a third section of image 210 (pixels 2, 3, 4, 7, 8, 9, 12, 13, and 14) rather than second section of image 210 (pixels 1, 2, 3, 6, 7, 8, 11, 12, and 13), as described above. In such an embodiment, output 214 may be 3×2 rather than 3×3 as illustrated above. In at least one embodiment, a padding parameter may be provided that pads each edge of image 210 with one or more additional rows or columns. In at least one embodiment, as illustrated in FIG. 2, a padding is 0, indicating no padding. In at least one embodiment, with a padding of 1, image 210 has seven rows and seven columns rather being 5×5 and output 214 may be 5×5 rather than 3×3. In at least one embodiment, a plurality of parameters may be provided that, for example, combines stride and padding.

FIG. 3 illustrates three example algorithms 300 where image convolution is to be performed, in accordance with at least one embodiment. In at least one embodiment, a first algorithm 302 receives an image tensor and a filter tensor and generates an output tensor. In at least one embodiment, image tensor, filter tensor, and output tensor are four-dimensional (4D) tensors. In at least one embodiment, first algorithm 302 is implemented as seven nested loops that loop through image tensor and filter tensor using multiplication to implement a convolution operation, as described herein. In at least one embodiment, a second algorithm 304 is identical to first algorithm 302 with loop control value "N" corresponding to "BATCH_SIZE," loop control value "P" corresponding to "IMAGE_HEIGHT," loop control value "Q" corresponding to "IMAGE_WIDTH," loop control value "K" corresponding to "OUTPUT_CHANNELS," loop control value "R" corresponding to "FILTER_HEIGHT," and loop control value "S" corresponding to "FILTER_WIDTH."

In at least one embodiment, a third algorithm 306 implements second algorithm 304 as a matrix multiplication of a two-dimensional (2D) image matrix and a 2D filter to generate a 2D output. In at least one embodiment, third algorithm 306 implements convolution by converting a 4D tensor to a 2D matrix using systems and methods such as those described herein. In at least one embodiment, matrix multiplication of a two-dimensional (2D) image matrix and a 2D filter to generate a 2D output is implemented as a general matrix multiplication or a GEMM on a graphics processor such as those described herein. In at least one embodiment, an image matrix is a three-dimension (3D) image matrix. In at least one embodiment, a filter is a 3D filter. In at least one embodiment, an image matrix is a four or more dimensional image matrix (e.g., four dimensional, five dimensional, etc.). In at least one embodiment, four or more dimensional image matrix.

FIG. 4 illustrates an example data flow 400 where a software kernel of a convolution operation is to be generated, in accordance with at least one embodiment. In at least one embodiment, a data flow such as example data flow 400 illustrates processing of one or more 4D tensors to generate a GEMM and using a resulting GEMM to generate a software kernel. In at least one embodiment, a 4D image tensor 402 with dimensions N×C×P×Q is converted to a 2D image matrix 404 with dimensions NPQ×CRS (where R and S are dimensions from filter tensor 406, described herein).

In at least one embodiment, 4D image tensor 402 is converted to 2D image matrix 404 using data replication so that, for example, elements of 4D image tensor 402 may be copied to multiple entries of 2D image matrix 404. In at least one embodiment, for example, if N=1, C=3, P=5, Q=5, K=3, R=3, and S=3 (as illustrated in FIG. 2), 4D image tensor 402 with dimensions N×C×P×Q has 75 entries (1*3*5*5) and 2D image matrix 404 with dimensions NPQ×CRS has 675 entries ((1*5*5)*(3*3*3)), with additional entries being produced using data replication to copy elements of 4D image tensor 402 to multiple entries of 2D image matrix 404.

In at least one embodiment, 4D filter tensor 406 is converted to a 2D filter matrix 408. In at least one embodiment, 4D filter tensor 406 is converted to a 2D filter matrix 408 using index remapping, where indices of memory locations of 4D filter tensor 406 are remapped to generate a 2D filter matrix representation. In at least one embodiment, 4D filter tensor 406 is converted to a 2D filter matrix 408 using data replication. In at least one embodiment, a 4D filter tensor with dimensions K×C×R×S has 81 elements (3*3*3*3) and 2D filter matrix 408 with dimensions CRS×K also has 81 entries ((3*3*3)*3).

In at least one embodiment, a convolution GEMM 410 is to multiply 2D image matrix 404 (with dimensions 25×27) by 2D filter matrix 408 (with dimensions 27×3) so that GEMM 410 is to generate a 25×3 output 2D matrix (not illustrated in FIG. 4). In at least one embodiment, convolution GEMM 410 is processed by a kernel optimizer 412 (which is a kernel optimizer such as kernel optimizer 108, described herein at least in connection with FIG. 1) to generate a software kernel 414 (which is a software kernel such as software kernel 112, also described herein at least in connection with FIG. 1). In at least one embodiment, software kernel is provided to a graphics processor using systems and methods such as those described herein.

Figure 5:
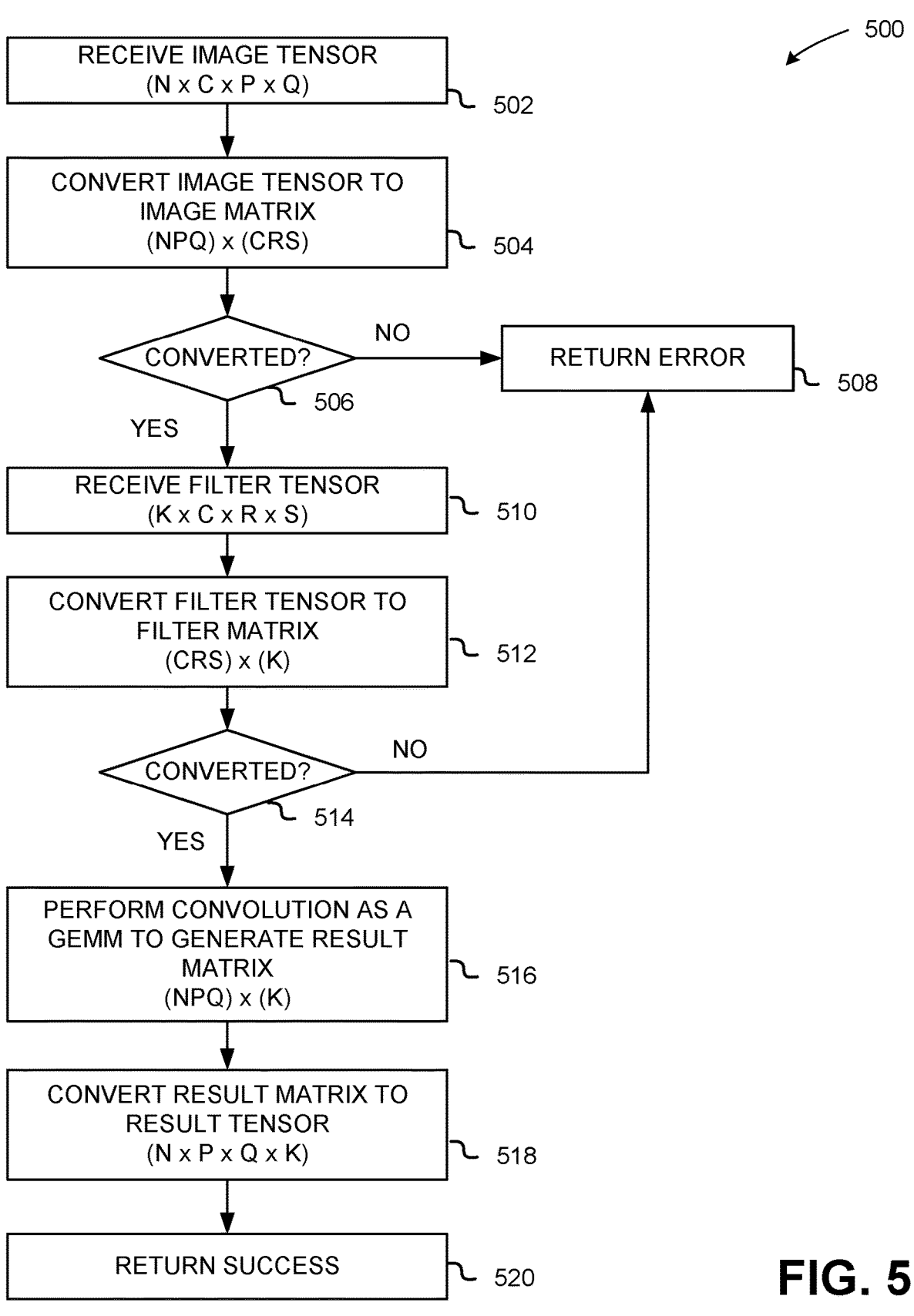
FIG. 5 illustrates an example process for generating a software kernel of a convolution operation, in accordance with at least one embodiment.

FIG. 5 illustrates an example process 500 for generating a software kernel of a convolution operation, in accordance with at least one embodiment. In at least one embodiment, a processor such as processor 104, described herein at least in connection with FIG. 1 executes instructions to perform at least a portion of example process 500. In at least one embodiment, a graphics processor such as graphics processor 114, described herein at least in connection with FIG. 1 executes instruction to perform at least a portion of example process 500. In at least one embodiment, a processor such as those described herein at least in connection with FIGS. 17 to 48 executes instructions to perform at least a portion of example process 500.

In at least one embodiment, at step 502 of example process 500, an image tensor is received, as described herein. In at least one embodiment, after step 502, example process 500 advances to step 504.

In at least one embodiment, at step 504 of example process 500, an image tensor received at step 502 is converted to an image matrix using systems and methods such as those described herein. In at least one embodiment, for example, at step 504, an image tensor received at step 502 is converted to an image matrix using data replication, as described herein. In at least one embodiment, after step 504, example process 500 advances to step 506.

In at least one embodiment, at step 506 of example process 500, it is determined whether an image tensor received at step 502 was converted to an image matrix. In at least one embodiment, at step 506, if it is determined that an image tensor received at step 502 was not converted to an image matrix ("NO" branch), example process 500 advances to step 508. In at least one embodiment, at step 506, if it is determined that an image tensor received at step 502 was converted to an image matrix ("YES" branch), example process 500 advances to step 510.

In at least one embodiment, at step 508 of example process 500, an error is returned using, for example, a status indicator such as status indicator 1536 described herein at least in connection with FIG. 15. In at least one embodiment, after step 508, example process 500 terminates. In at least one embodiment, not illustrated in FIG. 5, after step 508, example process 500 continues at step 502 to receive another image tensor.

In at least one embodiment, at step 510 of example process 500, receives a filter tensor, as described herein. In at least one embodiment, after step 510, example process 500 advances to step 512.

In at least one embodiment, at step 512 of example process 500, a filter tensor received at step 510 is converted to a filter matrix using systems and methods such as those described herein. In at least one embodiment, for example, at step 512, a filter tensor received at step 510 is converted to a filter matrix using index remapping, as described herein. In at least one embodiment, after step 512, example process 500 advances to step 514.

In at least one embodiment, at step 514 of example process 500, it is determined whether a filter tensor received at step 510 was converted to a filter matrix. In at least one embodiment, at step 514, if it is determined that a filter tensor received at step 510 was not converted to a filter matrix ("NO" branch), example process 500 continues at step 508. In at least one embodiment, at step 514, if it is determined that a filter tensor received at step 510 was converted to a filter matrix ("YES" branch), example process 500 advances to step 516.

In at least one embodiment, at step 516 of example process 500, a convolution is performed as a GEMM to generate a result matrix using systems and methods such as those described herein. In at least one embodiment, after step 516, example process 500 advances to step 518.

In at least one embodiment, at step 518 of example process 500, a result matrix of a convolution performed at step 516 is converted to a tensor, as described herein. In at least one embodiment, after step 518, example process 500 advances to step 520.

In at least one embodiment, at step 520 of example process 500, an indication of success is returned using, for example, a status indicator such as status indicator 1536 described herein at least in connection with FIG. 1. In at least one embodiment, after step 520, example process 500 terminates. In at least one embodiment, not illustrated in FIG. 5, after step 520, example process 500 continues at step 502 to receive another image tensor.

In at least one embodiment, operations of example process 500 illustrated in FIG. 5 are performed in a different order than illustrated in FIG. 5. In at least one embodiment, operations of example process 500 illustrated in FIG. 5 are performed simultaneously (or in parallel). In at least one embodiment, operations of example process 500 illustrated in FIG. 5 are performed by a plurality of threads executing on a processor such as one or more processors described herein in connection with FIGS. 1 to 48.

FIG. 6 illustrates an example data flow 600 where general matrix multiplication (GEMM) representations of tensors are to be generated, in accordance with at least one embodiment. In at least one embodiment, example data flow 600 is used to generate GEMM representations of tensors are generated that may be perform one or more operations including, but not limited to, convolution, addition, reduction, and/or other such operations such as those described herein. In at least one embodiment, a 4D image tensor 602 with dimensions N×C×P×Q and a 4D filter tensor 610 with dimensions K×C×R×S are provided to a process that executes one or more instructions to generate a GEMM representation of tensors of a convolution operation, using systems and methods such as those described herein. In at least one embodiment, 4D image tensor 602 is processed with data replication operations 604 to generate a 6D image tensor with data replication 606. In at least one embodiment, 6D image tensor with data replication 606 has dimensions N×P×Q×C×R×S. In at least one embodiment, 6D image tensor with data replication 606 has (R*S) times as many entries as 4D image tensor 602, with extra entries being produced by data replication operations, as described herein at least in connection with FIG. 4. In at least one embodiment, 6D image tensor with data replication 606 is then used to generate a 2D image matrix with data replication 608. In at least one embodiment, 2D image matrix with data replication 608 has dimensions (N*P*Q)×(C*R*S), as described herein at least in connection with FIG. 4. In at least one embodiment, conversion of 4D image tensor 602 to 2D image matrix with data replication 608 corresponds to step 504 of example process 500, described herein at least in connection with FIG. 5.

In at least one embodiment, 4D filter tensor 610 is to be processed with index remapping operations 612 to generate a 2D filter matrix 614 with dimensions (K×(C*R*S)), as described herein at least in connection with FIG. 4. In at least one embodiment, 2D filter matrix 614 is then to be transposed 616 to generate a 2D filter matrix 618 with dimensions ((C*R*S)×K). In at least one embodiment, transposing 2D filter matrix 614 with dimensions (K×(C*R*S)) to 2D filter matrix 618 with dimensions ((C*R*S)×K) enables matrix multiplication of 2D image matrix with data replication 608 with dimensions (N*P*Q)×(C*R*S) by 2D filter matrix 618 with dimensions ((C*R*S)×K) to generate an output matrix with dimensions (N*P*Q)×K, as described herein. In at least one embodiment, conversion of 4D filter tensor 610 to 2D filter matrix

618 corresponds to step 512 of example process 500, described herein at least in connection with FIG. 5.

Figure 7:
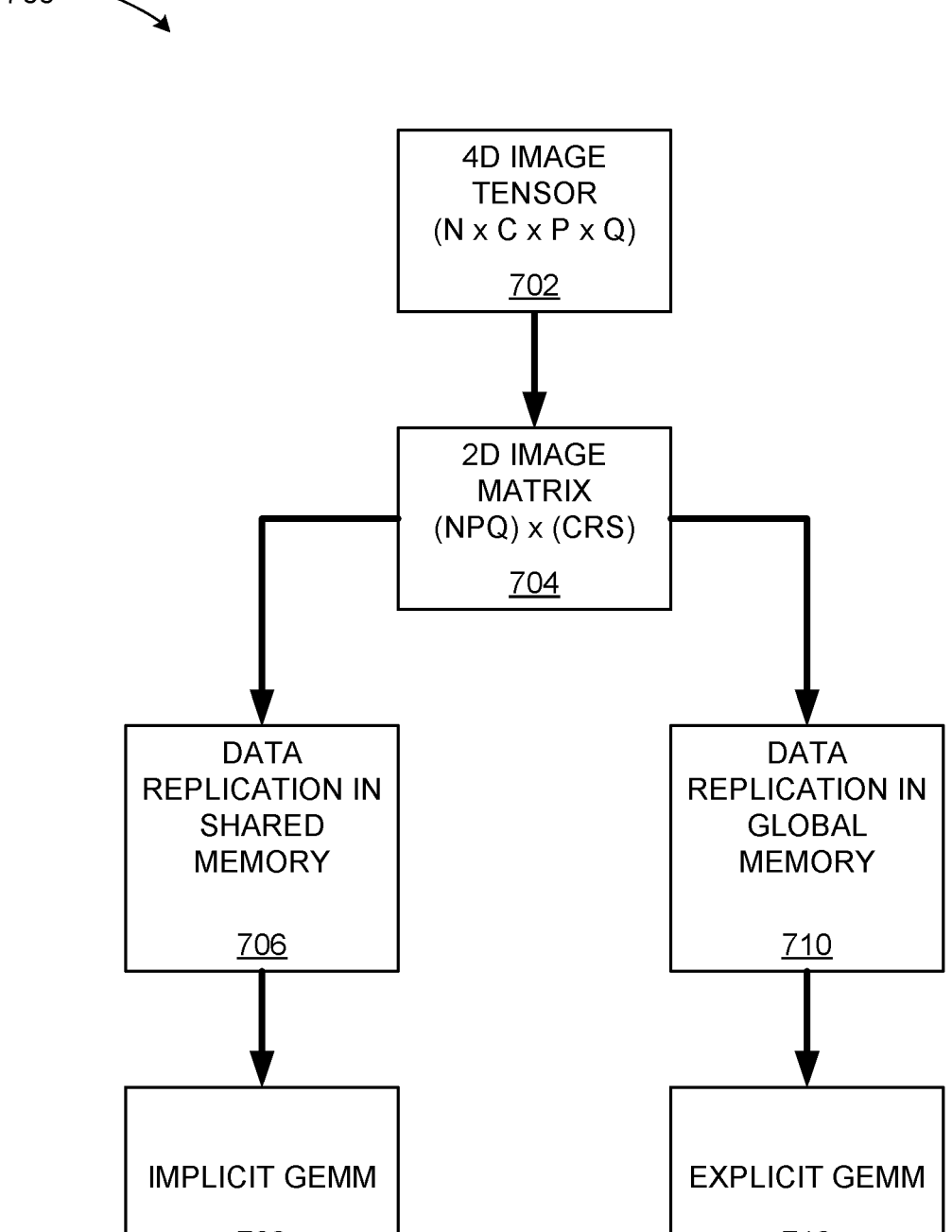
FIG. 7 illustrates an example data flow where explicit and implicit general matrix multiplication representations of tensors are to be generated, in accordance with at least one embodiment.

FIG. 7 illustrates an example data flow 700 where general matrix multiplication (GEMM) representations of tensors are to be generated, in accordance with at least one embodiment. In at least one embodiment, a 4D image tensor 702 with dimensions N×C×P×Q is provided to a process that executes one or more instructions to generate explicit and implicit general matrix multiplication representations of tensors, using systems and methods such as those described herein. In at least one embodiment, a 4D image tensor 702 with dimensions N×C×P×Q is to be converted to a 2D image matrix 704 with dimensions (N*P*Q)×(C*R*S), as described herein at least in connection with FIGS. 5 and 6. In at least one embodiment, 4D image tensor 702 corresponds to 4D image tensor 602, as described herein at least in connection with FIG. 6. In at least one embodiment, 2D image matrix 704 corresponds to 2D image matrix with data replication 608, as described herein at least in connection with FIG. 6. In at least one embodiment, as described herein, 4D image tensor 702 is converted to 2D image matrix 704 using data replication to generate additional entries in 2D image matrix 704.

In at least one embodiment, when data replication that is used to generate additional entries in 2D image matrix 704 when converting 4D image tensor 702 to 2D image matrix 704 is data replication in shared memory 706, an implicit matrix multiplication or implicit GEMM 708 can be performed. In at least one embodiment, when data replication that is used to generate additional entries in 2D image matrix 704 when converting 4D image tensor 702 to 2D image matrix 704 is data replication in shared memory 706, said data replication is performed without copying data entries into global memory.

In at least one embodiment, when data replication that is used to generate additional entries in 2D image matrix 704 when converting 4D image tensor 702 to 2D image matrix 704 is data replication in global memory 710, an explicit matrix multiplication or explicit GEMM 712 can be performed. In at least one embodiment, when data replication that is used to generate additional entries in 2D image matrix 704 when converting 4D image tensor 702 to 2D image matrix 704 is data replication in global memory 710, said data replication is performed by first copying data entries into global memory before performing data replication.

FIG. 8 illustrates an example data flow 800 where a convolution operation using tensors is to be performed, in accordance with at least one embodiment. In at least one embodiment, an image tensor 802 with dimensions N×C×P×Q and a filter tensor 804 with dimensions K×C×R×S are to be provided to a process that executes one or more instructions to perform a convolution operation using tensors, using systems and methods such as those described herein. In at least one embodiment, a convolution operation 806 is performed using image tensor 802 with dimensions N×C×P×Q and filter tensor 804 with dimensions K×C×R×S to generate an output tensor 808 with dimensions N×K×P×Q, as described herein. In at least one embodiment, convolution operation 806 is performed using second algorithm 304, described herein at least in connection with FIG. 3.

Figure 9:
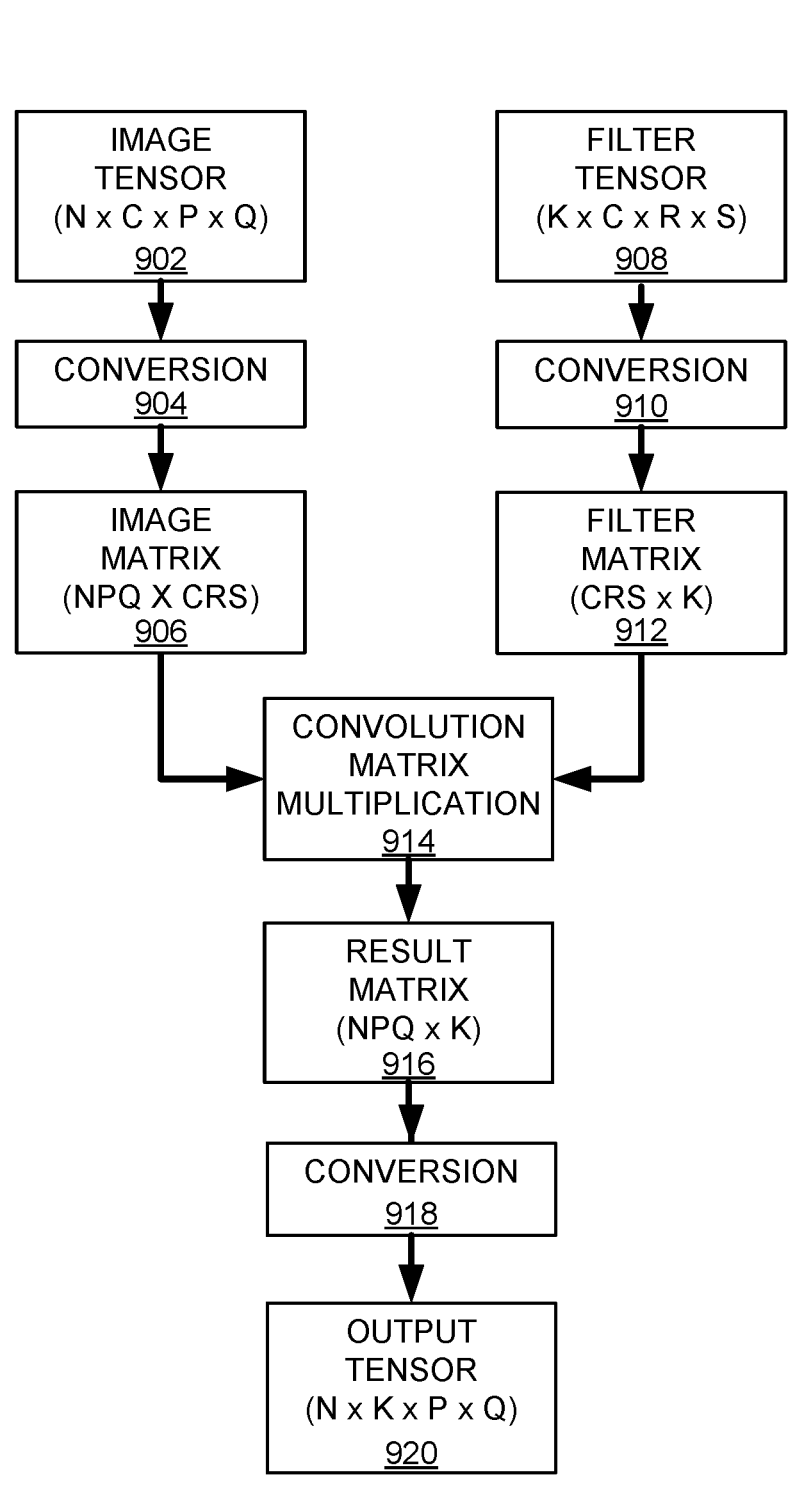
FIG. 9 illustrates an example data flow where a convolution operation using general matrix multiplication is to be performed, in accordance with at least one embodiment.

FIG. 9 illustrates an example data flow 900 where a convolution operation using general matrix multiplication (GEMM) is to be performed, in accordance with at least one embodiment. In at least one embodiment, example data flow 900 illustrates similar functionality as that illustrated in example data flow 800, as described herein at least in connection with FIG. 8. In at least one embodiment, an image tensor 902 with dimensions N×C×P×Q and a filter tensor 908 with dimensions K×C×R×S are to be provided to a process that executes one or more instructions to perform a convolution operation using GEMM, using systems and methods such as those described herein. In at least one embodiment, one or more conversion operations 904 are used to generate an image matrix 906 with dimensions (N*P*Q)×(C*R*S), as described herein at least in connection with FIGS. 5 and 6. In at least one embodiment, one or more conversion operations 910 are used to generate a filter matrix 912 with dimensions (C*R*S)×K, also as described herein at least in connection with FIGS. 5 and 6. In at least one embodiment, conversion operations 910 are index remapping operations such as index remapping operations 612, described herein at least in connection with FIG. 6.

In at least one embodiment, a convolution matrix multiplication operation 914 is used to generate a result matrix 916 with dimensions (N*P*Q)×K, as described herein at least in connection with FIGS. 5 and 6. In at least one embodiment, convolution matrix multiplication operation 914 is performed as a general matrix multiplication (GEMM). In at least one embodiment, convolution matrix multiplication operation 914 is a general matrix multiplication (GEMM). In at least one embodiment, convolution matrix multiplication operation 914 is an implicit GEMM when, for example, data replication is performed in shared memory, as described herein at least in connection with FIG. 7. In at least one embodiment, an implicit GEMM is referred to as an implicit matrix multiplication. In at least one embodiment, convolution matrix multiplication operation 914 is an explicit GEMM when, for example, data replication is performed in global memory, as described herein at least in connection with FIG. 7. In at least one embodiment, an explicit GEMM is referred to as an explicit matrix multiplication. In at least one embodiment, convolution matrix multiplication operation 914 is performed using third algorithm 306, described herein at least in connection with FIG. 3.

In at least one embodiment, one or more conversion operations 918 are used to generate an output tensor 920 with dimensions N×K×P×Q from result matrix 916, as described herein at least in connection with FIG. 5. In at least one embodiment, conversion operations 918 correspond to step 518 of example process 500. In at least one embodiment, conversion operations 918 include index remapping operations such as those described herein to generate an output tensor 920 with dimensions N×K×P×Q, as described herein. In at least one embodiment, one or more operations illustrated and described with respect to example data flow 900 are implemented as a software kernel, using systems and methods such as those described herein.

Figure 10:
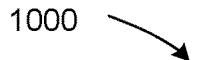
FIG. 10 illustrates an example data flow where a convolution operation with an addition operation using tensors is to be performed, in accordance with at least one embodiment.

FIG. 10 illustrates an example data flow 1000 where a convolution operation with an addition operation using tensors is to be performed, in accordance with at least one embodiment. In at least one embodiment, an image tensor 1002 with dimensions N×C×P×Q, a filter tensor 1004 with dimensions K×C×R×S, and an operand tensor 1010 with dimensions N×K×P×Q are to be provided to a process that executes one or more instructions to perform a convolution operation with an addition operation using tensors, using systems and methods such as those described herein. In at least one embodiment, a convolution operation 1006 is used to generate a result tensor 1008 with dimensions N×K×P×Q, using systems and methods such as those described herein. In at least one embodiment, convolution operation 1006 is used to generate a result tensor 1008 using tensor operations such as those described herein at least with respect to FIG.

8. In at least one embodiment, convolution operation 1006 is used to generate a result tensor 1008 using GEMM operations such as those described herein at least with respect to FIG. 9.

In at least one embodiment, an addition operation 1012 is used to add operand tensor 1010 to result tensor 1008 to generate output tensor 1014 with dimensions N×K×P×Q. In at least one embodiment, addition operation 1012 is an element by element addition operation that adds each element of operand tensor 1010 to each corresponding element of result tensor 1008. In at least one embodiment, an addition operation such as addition operation 1010 that occurs after convolution operation 1006 is referred to as an epilogue operation. In at least one embodiment, not illustrated in FIG. 10, addition operation 1012 may be some other operation such as, for example, an elementwise or pointwise operation such as addition, multiplication, addition, etc. In at least one embodiment, an elementwise or pointwise operation does not alter shape or dimensions of an input tensor or matrix.

Figure 11:
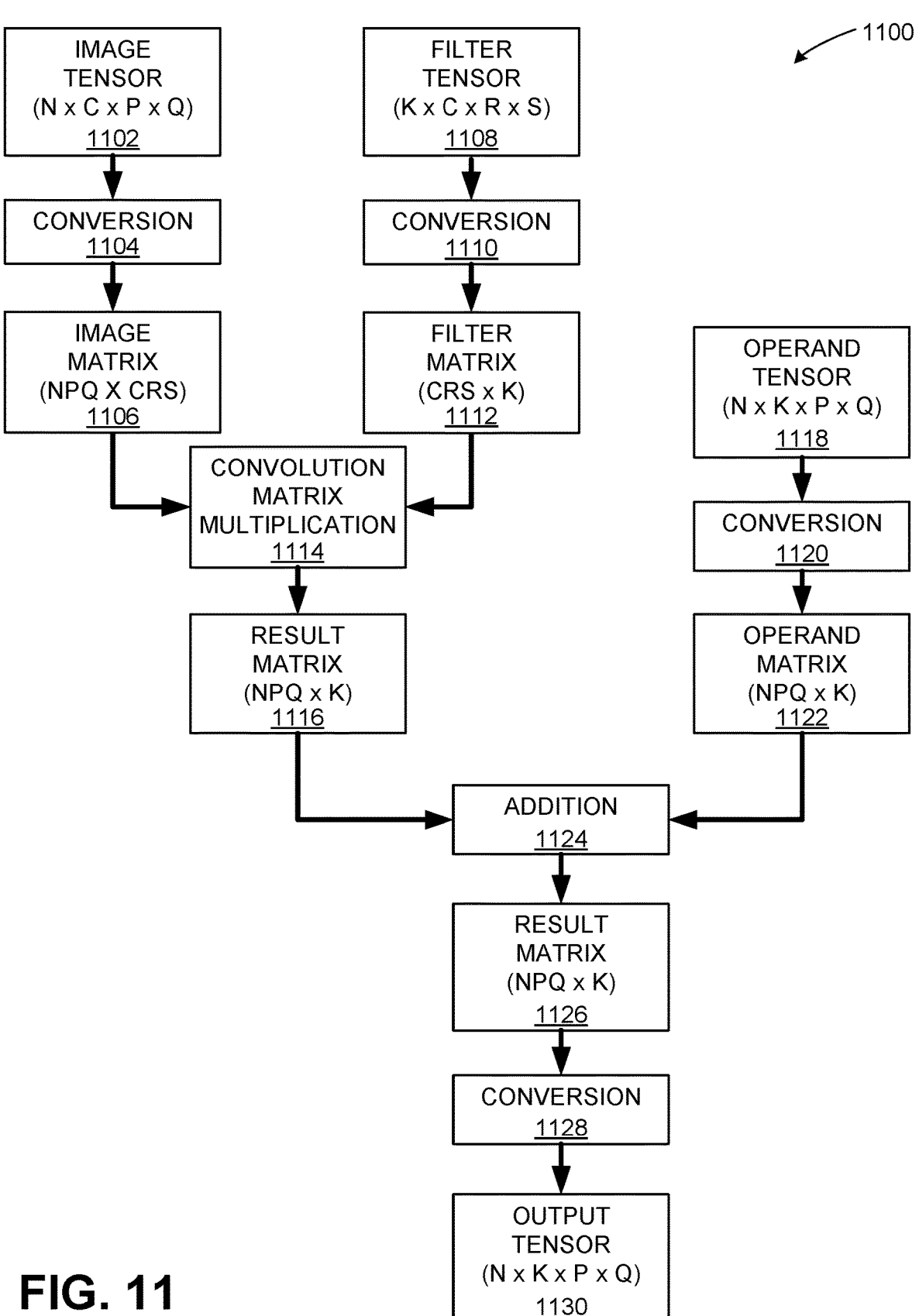
FIG. 11 illustrates an example data flow where a convolution operation with an addition operation using general matrix multiplication is to be performed, in accordance with at least one embodiment.

FIG. 11 illustrates an example data flow 1100 where a convolution operation with an addition operation using general matrix multiplication (GEMM) is to be performed, in accordance with at least one embodiment. In at least one embodiment, example data flow 1100 illustrates similar functionality as that illustrated in example data flow 1000, as described herein at least in connection with FIG. 10. In at least one embodiment, an image tensor 1102 with dimensions N×C×P×Q, a filter tensor 1108 with dimensions K×C×R×S, and an operand tensor 1118 with dimensions N×K×P×Q are to be provided to a process that executes one or more instructions to perform a convolution operation with an addition operation using GEMM, using systems and methods such as those described herein.

In at least one embodiment, one or more conversion operations 1104 are used to generate an image matrix 1106 with dimensions (N*P*Q)×(C*R*S) and one or more conversion operations 1110 are used to generate a filter matrix 1112 with dimensions (C*R*S)×K, as described herein at least with respect to FIGS. 5, 6, and 9. In at least one embodiment, one or more conversion operations 1120 are used to generate an operand matrix 1122 with dimensions (N*P*Q)×K. In at least one embodiment, conversion operations 1120 are index remapping operations such as index remapping operations 612, described herein at least in connection with FIG. 6. In at least one embodiment, a convolution matrix multiplication operation 1114 is used to generate a result matrix 1116 with dimensions (N*P*Q)×K, as described herein at least in connection with FIGS. 5, 6, and 9. In at least one embodiment, convolution matrix multiplication operation 1114 is a convolution matrix multiplication operation such as convolution matrix multiplication operation 914, described herein at least in connection with FIG. 9.

In at least one embodiment, an addition operation 1124 is used to add operand matrix 1122 to result matrix 1116 to generate result matrix 1126 with dimensions (N*P*Q)×K. In at least one embodiment, addition operation 1124 is an element by element addition operation that adds each element of operand matrix 1122 to each corresponding element of result matrix 1116. In at least one embodiment, an addition operation such as addition operation 1122 that occurs after convolution matrix multiplication operation 1114 is referred to as an epilogue operation. In at least one embodiment, one or more conversion operations 1128 is used to convert result matrix 1126 to an output tensor 1130 with dimensions N×K×P×Q. In at least one embodiment, conversion operations 1128 are index remapping operations such as those described herein. In at least one embodiment, one or more operations illustrated and described with respect to example data flow 1100 are implemented as a software kernel, using systems and methods such as those described herein.

FIG. 12 illustrates an example data flow 1200 where an addition operation and a convolution operation using tensors are to be performed, in accordance with at least one embodiment. In at least one embodiment, an image tensor 1202 with dimensions N×C×P×Q, a filter tensor 1210 with dimensions K×C×R×S, and an operand tensor 1204 with dimensions N×C×P×Q are to be provided to a process that executes one or more instructions to perform an addition operation and a convolution operation using tensors, using systems and methods such as those described herein.

In at least one embodiment, an addition operation 1206 is used to add operand tensor 1204 to image tensor 1202 to generate result tensor 1208 with dimensions N×C×P×Q. In at least one embodiment, addition operation 1206 is an element by element addition operation that adds each element of operand tensor 1204 to each corresponding element of image tensor 1202. In at least one embodiment, a convolution operation 1212 is used to generate an output tensor 1214 with dimensions N×K×P×Q, using systems and methods such as those described herein. In at least one embodiment, convolution operation 1212 is used to generate output tensor 1214 using tensor operations such as those described herein at least with respect to FIG. 8. In at least one embodiment, convolution operation 1212 is used to generate output tensor 1214 using GEMM operations such as those described herein at least with respect to FIG. 9. In at least one embodiment, an addition operation such as addition operation 1206 that occurs before convolution operation 1212 is referred to as an prologue operation.

In at least one embodiment, not illustrated in FIG. 12, an addition operation and a convolution operation may be at least partially performed using a GEMM, using systems and methods such as those described here. In at least one embodiment, for example, convolution operation 1212 may be performed using a convolution matrix multiplication such as convolution matrix multiplication 914, described herein at least in connection with FIG. 9. In at least one embodiment, not illustrated in FIG. 12, addition operation 1206 may be some other operation such as, for example, an elementwise or pointwise operation such as addition, multiplication, addition, etc. In at least one embodiment, an elementwise or pointwise operation does not alter shape or dimensions of an input tensor or matrix.

Figure 13:
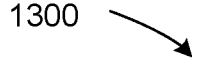
FIG. 13 illustrates an example data flow where a convolution operation and a reduction using tensors are to be performed, in accordance with at least one embodiment.

FIG. 13 illustrates an example data flow 1300 where a convolution operation and a reduction using tensors are to be performed, in accordance with at least one embodiment. In at least one embodiment, an image tensor 1302 with dimensions N×C×P×Q and a filter tensor 1304 with dimensions K×C×R×S are provided to a process that executes one or more instructions to perform a convolution operation and a reduction operation using tensors, using systems and methods such as those described herein. In at least one embodiment, a convolution operation 1306 is used to generate a result tensor 1308 with dimensions N×K×P×Q, using systems and methods such as those described herein. In at least one embodiment, convolution operation 1306 is used to generate a result tensor 1308 using tensor operations such as those described herein at least with respect to FIG. 8. In at least one embodiment, convolution operation 1306 is used to generate a result tensor 1308 using GEMM operations such as those described herein at least with respect to FIG. 9.

In at least one embodiment, a reduction 1312 is used to generate output tensor 1314. In at least one embodiment, a reduction operation 1310 is provided to reduction 1312. In at least one embodiment, not shown in FIG. 13, one or more operands associated with reduction operation 1310 are provided to reduction 1312. In at least one embodiment, reduction 1312 is to reduce one or more dimensions of a tensor such as result tensor 1308. In at least one embodiment, for example, reduction 1312 may reduce dimensions of result tensor 1308 by adding elements across one or more dimensions of result tensor 1308 using reduction operation 1310 that specifies addition. In at least one embodiment, for example, reduction 1312 may reduce dimension N of result tensor 1308 by summing each K×P×Q portion of result tensor 1308 to generate an output tensor 1314 with dimensions 1×K×P×Q. In at least one embodiment, for example, reduction 1312 may reduce dimensions N, P, and Q of result tensor 1308 by summing each K portion of result tensor 1308 to generate an output tensor 1314 with dimensions 1×K×1×1. In at least one embodiment, reduction such as reduction 1312 that occurs after convolution operation 1306 is referred to as an epilogue operation. In at least one embodiment, not shown in FIG. 13, a reduction such as reduction 1312 that occurs before convolution operation 1306 is referred to as a prologue operation. In at least one embodiment, a reduction such as reduction 1312 is executed without a convolution on, for example, image tensor 1302.

FIG. 14 illustrates an example data flow 1400 where a convolution operation and a reduction using general matrix multiplication (GEMM) are to be performed, in accordance with at least one embodiment. In at least one embodiment, example data flow 1400 illustrates similar functionality as that illustrated in example data flow 1300, as described herein at least in connection with FIG. 13. In at least one embodiment, an image tensor 1402 with dimensions N×C× P×Q and a filter tensor 1408 with dimensions K×C×R×S are to be provided to a process that executes one or more instructions to perform a convolution operation and a reduction using GEMM, using systems and methods such as those described herein.

In at least one embodiment, one or more conversion operations 1404 are used to generate an image matrix 1406 with dimensions (N*P*Q)×(C*R*S) and one or more conversion operations 1410 are used to generate a filter matrix 1412 with dimensions (C*R*S)×K, as described herein at least with respect to FIGS. 5, 6, and 9. In at least one embodiment, a convolution matrix multiplication operation 1414 is used to generate a result matrix 1416 with dimensions (N*P*Q)×K, as described herein at least in connection with FIGS. 5, 6, and 9. In at least one embodiment, convolution matrix multiplication operation 1414 is a convolution matrix multiplication operation such as convolution matrix multiplication operation 914, described herein at least in connection with FIG. 9.

In at least one embodiment, a reduction 1420 is used to generate a result matrix 1422. In at least one embodiment, reduction 1420 receives a reduction operation 1418. In at least one embodiment, reduction 1420 receives one or more reduction operands associated with reduction operation 1418. In at least one embodiment, reduction such as reduction 1420 that occurs after convolution matrix multiplication operation 1414 is referred to as an epilogue operation. In at least one embodiment, not illustrated in FIG. 14, a reduction operation such as reduction 1420 that occurs before a convolution operation such as convolution matrix multiplication operation 1414 is referred to as a prologue operation. In at least one embodiment, not illustrated in FIG. 14, a reduction such as reduction 1420 is executed without a convolution on, for example, image matrix 1406.

In at least one embodiment, as described herein at least in connection with FIG. 13, a reduction such as reduction 1420 is to reduce one or more dimensions of a matrix such as result matrix 1416. In at least one embodiment, for example, reduction 1420 may reduce dimensions of result matrix 1416 by adding elements across one or more dimensions of result matrix 1416 using reduction operation 1418 that specifies addition. In at least one embodiment, for example, reduction 1420 may reduce dimension NPQ of result matrix 1416 to generate a result matrix 1422 with dimensions 1×K. In at least one embodiment, one or more conversion operations 1424 are used to convert result matrix 1422 to an output tensor 1426 with dimensions that are based on those of result matrix 1422. In at least one embodiment, conversion operations 1424 are index remapping operations such as those described herein. In at least one embodiment, one or more operations illustrated and described with respect to example data flow 1400 are implemented as a software kernel, using systems and methods such as those described herein.

FIG. 15 illustrates an example application programming interface (API) 1500 to cause a software kernel to be generated to perform an implicit matrix multiplication operation, in accordance with at least one embodiment. In at least one embodiment, an implicit matrix multiplication API 1502 is an API to cause a software kernel to be generated to perform an implicit matrix multiplication operation, using systems and methods such as those described herein. In at least one embodiment, implicit matrix multiplication API 1502 receives one or more parameters including, but not limited to, an image tensor descriptor 1504, one or more image tensor parameters 1506, a filter tensor descriptor 1508, one or more filter tensor parameters 1510, a memory location to store an output tensor 1512, one or more output tensor parameters 1514, a specification of convolution dimensions 1516, a padding parameter 1518, a stride parameter 1520, and/or a dilation parameter 1522. In at least one embodiment, implicit matrix multiplication API 1502 returns a status 1534 using a status indicator 1536, to a calling process as described herein.

In at least one embodiment, implicit matrix multiplication API 1502 executes one or more commands to receive tensors 1524. In at least one embodiment, implicit matrix multiplication API 1502 executes one or more commands to convert 1526 received tensors to matrices, as described herein. In at least one embodiment, implicit matrix multiplication API 1502 executes one or more commands to perform implicit matrix multiplication 1528, using systems and methods such as those described herein. In at least one embodiment, implicit matrix multiplication API 1502 executes one or more commands to convert 1530 a result matrix back to a tensor. In at least one embodiment, implicit matrix multiplication API 1502 executes one or more commands to store 1532 a result tensor back in output tensor storage 1512. In at least one embodiment, not illustrated in FIG. 15, implicit matrix multiplication API 1502 executes one or more commands to update output tensor parameters 1514. In at least one embodiment, implicit matrix multiplication API 1502 returns a status 1534 using status indicator 1536. In at least one embodiment, status indicator 1536 is returned to a calling process using an integer value, or using a Boolean value, or using an enumerated value, or using a flag, or using a signal, or using a semaphore, or using an event, or using a combination of these and/or other such return value types.

FIG. 16 illustrates an example application programming interface (API) 1600 to cause one or more dimensions of a tensor to be modified, in accordance with at least one embodiment. In at least one embodiment, a tensor dimension modification API 1602 is an API to cause one or more dimensions of a tensor to be modified, using systems and methods such as those described herein. In at least one embodiment, tensor dimension modification API 1602 receives one or more parameters including, but not limited to, an input tensor descriptor 1604, a memory location to store an output tensor 1606, a reduction operation type 1608, a number of dimensions to reduce 1610, and/or an array that specifies dimensions to reduce 1612. In at least one embodiment, tensor dimension modification API 1602 returns a status indicator 1624 using a status indicator 1626, to a calling process as described herein. In at least one embodiment, number of dimensions to reduce 1610 is received as a specification of dimensions to reduce that at least includes a number of dimensions to reduce. In at least one embodiment, number of dimensions to reduce 1610 and dimensions array 1612 are combined into a single parameter so that, for example, dimensions array 1612 includes number of dimensions to reduce 1610.

In at least one embodiment, tensor dimension modification API 1602 executes one or more commands to receive tensors 1614. In at least one embodiment, tensor dimension modification API 1602 executes one or more commands to convert 1616 received tensors to matrices, as described herein. In at least one embodiment, tensor dimension modification API 1602 executes one or more commands to perform reduction 1618, using systems and methods such as those described herein. In at least one embodiment, tensor dimension modification API 1602 executes one or more commands to convert 1620 a result matrix back to a tensor. In at least one embodiment, tensor dimension modification API 1602 executes one or more commands to store 1622 a result tensor back in output tensor storage 1606. In at least one embodiment, tensor dimension modification API 1602 returns a status 1624 using status indicator 1626. In at least one embodiment, status indicator 1626 is returned to a calling process using an integer value, or using a Boolean value, or using an enumerated value, or using a flag, or using a signal, or using a semaphore, or using an event, or using a combination of these and/or other such return value types.

In the following description, numerous specific details are set forth to provide a more thorough understanding of at least one embodiment. However, it will be apparent to one skilled in the art that the inventive concepts may be practiced without one or more of these specific details.

Data Center

FIG. 17 illustrates an exemplary data center 1700, in accordance with at least one embodiment. In at least one embodiment, data center 1700 includes, without limitation, a data center infrastructure layer 1710, a framework layer 1720, a software layer 1730 and an application layer 1740.

In at least one embodiment, as shown in FIG. 17, data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/ output ("NW I/O") devices, network switches, virtual machines ("VMs"), power modules, and cooling modules, etc. In at least one embodiment, one or more node C.R.s from among node C.R.s 1716(1)-1716(N) may be a server having one or more of above-mentioned computing resources.

In at least one embodiment, grouped computing resources 1714 may include separate groupings of node C.R.s housed within one or more racks (not shown), or many racks housed in data centers at various geographical locations (also not shown). Separate groupings of node C.R.s within grouped computing resources 1714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1712 may configure or otherwise control one or more node C.R.s 1716(1)-1716(N) and/or grouped computing resources 1714. In at least one embodiment, resource orchestrator 1712 may include a software design infrastructure ("SDI") management entity for data center 1700. In at least one embodiment, resource orchestrator 1712 may include hardware, software or some combination thereof.

In at least one embodiment, as shown in FIG. 17, framework layer 1720 includes, without limitation, a job scheduler 1732, a configuration manager 1734, a resource manager 1736 and a distributed file system 1738. In at least one embodiment, framework layer 1720 may include a framework to support software 1752 of software layer 1730 and/or one or more application(s) 1742 of application layer 1740. In at least one embodiment, software 1752 or application(s) 1742 may respectively include web-based service software or applications, such as those provided by Amazon Web Services, Google Cloud and Microsoft Azure. In at least one embodiment, framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1732 may include a Spark driver to facilitate scheduling of workloads supported by various layers of data center 1700. In at least one embodiment, configuration manager 1734 may be capable of configuring different layers such as software layer 1730 and framework layer 1720, including Spark and distributed file system 1738 for supporting large-scale data processing. In at least one embodiment, resource manager 1736 may be capable of managing clustered or grouped computing resources mapped to or allocated for support of distributed file system 1738 and job scheduler 1732. In at least one embodiment, clustered or grouped computing resources may include grouped computing resource 1714 at data center infrastructure layer 1710. In at least one embodiment, resource manager 1736 may coordinate with resource orchestrator 1712 to manage these mapped or allocated computing resources.

In at least one embodiment, software 1752 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716 (1)-1716(N), grouped computing resources 1714, and/or distributed file system 1738 of framework layer 1720. In at least one or more types of applications may include, without limitation, CUDA applications.

In at least one embodiment, any of configuration manager 1734, resource manager 1736, and resource orchestrator 1712 may implement any number and type of self-modifying actions based on any amount and type of data acquired in any technically feasible fashion. In at least one embodiment, self-modifying actions may relieve a data center operator of data center 1700 from making possibly bad configuration decisions and possibly avoiding underutilized and/or poor performing portions of a data center.

In at least one embodiment, at least one component shown or described with respect to FIG. 17 is used to implement techniques and/or functions described in connection with FIGS. 1-16. In at least one embodiment, at least one of grouped computing resources 1714 and nodes C.R. 1716(1-N) is used to perform an API to cause a software kernel to be generated to perform an implicit matrix multiplication. In at least one embodiment, at least one of grouped computing resources 1714 and node C.R. 1716(1-N) is used to perform an API to cause one or more dimensions of a tensor to be modified. In at least one embodiment, at least one of grouped computing resources 1714 and node C.R. 1716(1-N) is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Computer-Based Systems

The following figures set forth, without limitation, exemplary computer-based systems that can be used to implement at least one embodiment.

Figure 18:
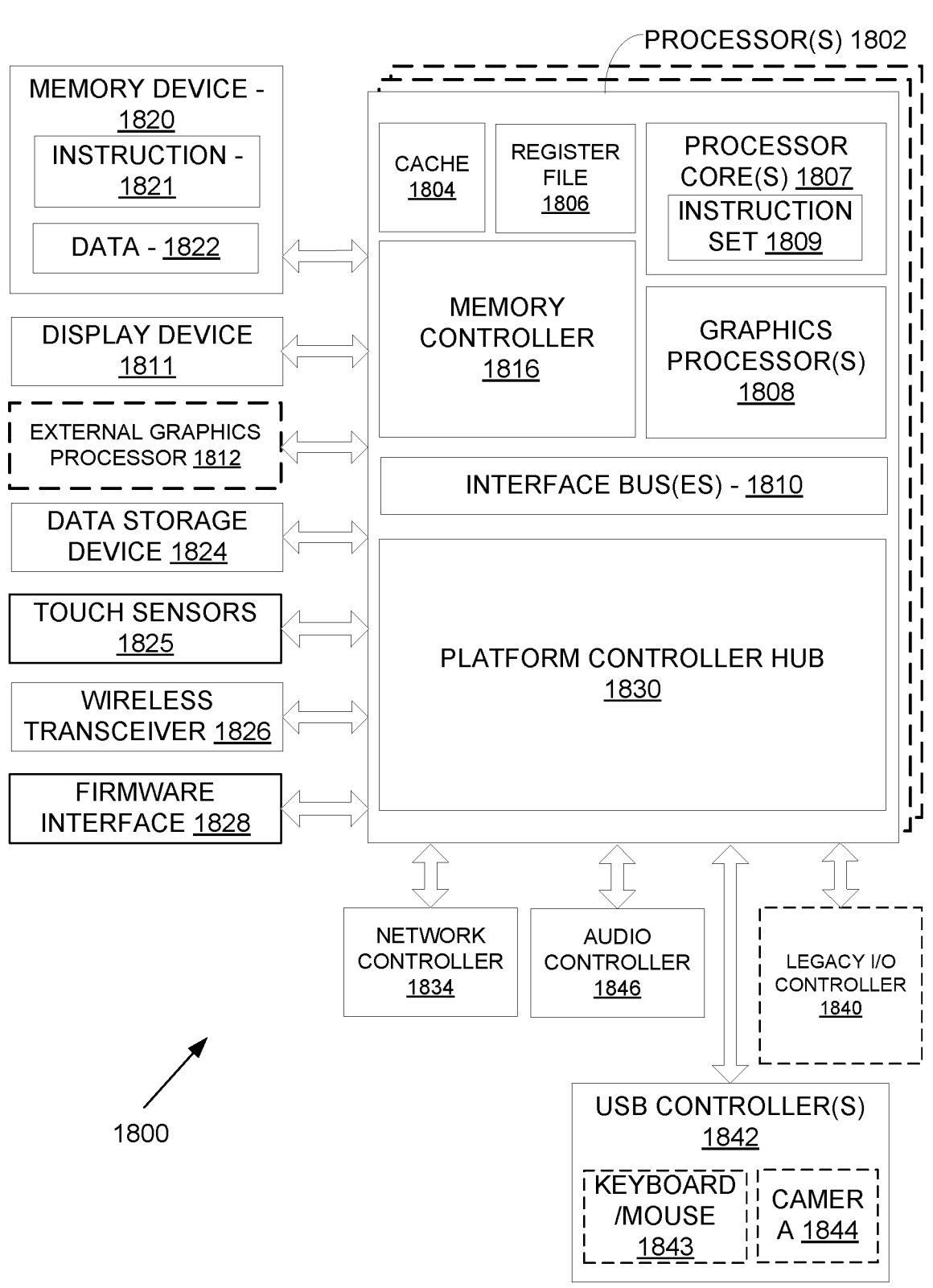
FIG. 18 illustrates a processing system, in accordance with at least one embodiment.

FIG. 18 illustrates a processing system 1800, in accordance with at least one embodiment. In at least one embodiment, processing system 1800 includes one or more processors 1802 and one or more graphics processors 1808, and may be a single processor desktop system, a multiprocessor workstation system, or a server system having a large number of processors 1802 or processor cores 1807. In at least one embodiment, processing system 1800 is a processing platform incorporated within a system-on-a-chip ("SoC") integrated circuit for use in mobile, handheld, or embedded devices.

In at least one embodiment, processing system 1800 can include, or be incorporated within a server-based gaming platform, a game console, a media console, a mobile gaming console, a handheld game console, or an online game console. In at least one embodiment, processing system 1800 is a mobile phone, smart phone, tablet computing device or mobile Internet device. In at least one embodiment, processing system 1800 can also include, couple with, or be integrated within a wearable device, such as a smart watch wearable device, smart eyewear device, augmented reality device, or virtual reality device. In at least one embodiment, processing system 1800 is a television or set top box device having one or more processors 1802 and a graphical interface generated by one or more graphics processors 1808.

In at least one embodiment, one or more processors 1802 each include one or more processor cores 1807 to process instructions which, when executed, perform operations for system and user software. In at least one embodiment, each of one or more processor cores 1807 is configured to process a specific instruction set 1809. In at least one embodiment, instruction set 1809 may facilitate Complex Instruction Set Computing ("CISC"), Reduced Instruction Set Computing ("RISC"), or computing via a Very Long Instruction Word ("VLIW"). In at least one embodiment, processor cores 1807 may each process a different instruction set 1809, which may include instructions to facilitate emulation of other instruction sets. In at least one embodiment, processor core 1807 may also include other processing devices, such as a digital signal processor ("DSP").

In at least one embodiment, processor 1802 includes cache memory ('cache") 1804. In at least one embodiment, processor 1802 can have a single internal cache or multiple levels of internal cache. In at least one embodiment, cache memory is shared among various components of processor 1802. In at least one embodiment, processor 1802 also uses an external cache (e.g., a Level 3 ("L3") cache or Last Level Cache ("LLC")) (not shown), which may be shared among processor cores 1807 using known cache coherency techniques. In at least one embodiment, register file 1806 is additionally included in processor 1802 which may include different types of registers for storing different types of data (e.g., integer registers, floating point registers, status registers, and an instruction pointer register). In at least one embodiment, register file 1806 may include general-purpose registers or other registers.

In at least one embodiment, one or more processor(s) 1802 are coupled with one or more interface bus(es) 1810 to transmit communication signals such as address, data, or control signals between processor 1802 and other components in processing system 1800. In at least one embodiment interface bus 1810, in one embodiment, can be a processor bus, such as a version of a Direct Media Interface ("DMI") bus. In at least one embodiment, interface bus 1810 is not limited to a DMI bus, and may include one or more Peripheral Component Interconnect buses (e.g., "PCI," PCI Express ("PCIe")), memory buses, or other types of interface buses. In at least one embodiment processor(s) 1802 include an integrated memory controller 1816 and a platform controller hub 1830. In at least one embodiment, memory controller 1816 facilitates communication between a memory device and other components of processing system 1800, while platform controller hub ("PCH") 1830 provides connections to Input/Output ("I/O") devices via a local I/O bus.

In at least one embodiment, memory device 1820 can be a dynamic random access memory ("DRAM") device, a static random access memory ("SRAM") device, flash memory device, phase-change memory device, or some other memory device having suitable performance to serve as processor memory. In at least one embodiment memory device 1820 can operate as system memory for processing system 1800, to store data 1822 and instructions 1821 for use when one or more processors 1802 executes an application or process. In at least one embodiment, memory controller 1816 also couples with an optional external graphics processor 1812, which may communicate with one or more graphics processors 1808 in processors 1802 to perform graphics and media operations. In at least one embodiment, a display device 1811 can connect to processor(s) 1802. In at least one embodiment display device 1811 can include one or more of an internal display device, as in a mobile electronic device or a laptop device or an external display device attached via a display interface (e.g., DisplayPort, etc.). In at least one embodiment, display device 1811 can include a head mounted display ("HMD") such as a stereoscopic display device for use in virtual reality ("VR") applications or augmented reality ("AR") applications.

In at least one embodiment, platform controller hub 1830 enables peripherals to connect to memory device 1820 and processor 1802 via a high-speed I/O bus. In at least one embodiment, I/O peripherals include, but are not limited to, an audio controller 1846, a network controller 1834, a firmware interface 1828, a wireless transceiver 1826, touch sensors 1825, a data storage device 1824 (e.g., hard disk drive, flash memory, etc.). In at least one embodiment, data storage device 1824 can connect via a storage interface (e.g., SATA) or via a peripheral bus, such as PCI, or PCIe. In at least one embodiment, touch sensors 1825 can include touch screen sensors, pressure sensors, or fingerprint sensors. In at least one embodiment, wireless transceiver 1826 can be a Wi-Fi transceiver, a Bluetooth transceiver, or a mobile network transceiver such as a 3G, 4G, or Long Term Evolution ("LTE") transceiver. In at least one embodiment, firmware interface 1828 enables communication with system firmware, and can be, for example, a unified extensible firmware interface ("UEFI"). In at least one embodiment, network controller 1834 can enable a network connection to a wired network. In at least one embodiment, a high-performance network controller (not shown) couples with interface bus 1810. In at least one embodiment, audio controller 1846 is a multi-channel high definition audio controller. In at least one embodiment, processing system 1800 includes an optional legacy I/O controller 1840 for coupling legacy (e.g., Personal System 2 ("PS/2")) devices to processing system 1800. In at least one embodiment, platform controller hub 1830 can also connect to one or more Universal Serial Bus ("USB") controllers 1842 connect input devices, such as keyboard and mouse 1843 combinations, a camera 1844, or other USB input devices.

In at least one embodiment, an instance of memory controller 1816 and platform controller hub 1830 may be integrated into a discreet external graphics processor, such as external graphics processor 1812. In at least one embodiment, platform controller hub 1830 and/or memory controller 1816 may be external to one or more processor(s) 1802. For example, in at least one embodiment, processing system 1800 can include an external memory controller 1816 and platform controller hub 1830, which may be configured as a memory controller hub and peripheral controller hub within a system chipset that is in communication with processor(s) 1802.

In at least one embodiment, at least one component shown or described with respect to FIG. 18 is used to implement techniques and/or functions described in connection with FIGS. 1-16. In at least one embodiment, at least one of processor(s) 1802 or external graphics processor 1812 is used to perform an API to cause a software kernel to be generated to perform an implicit matrix multiplication operation. In at least one embodiment, at least one of processor(s) 1802 or external graphics processor 1812 is used to perform an API to cause one or more dimensions of a tensor to be modified. In at least one embodiment, at least one of processor(s) 1802 or external graphics processor 1812 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 19:
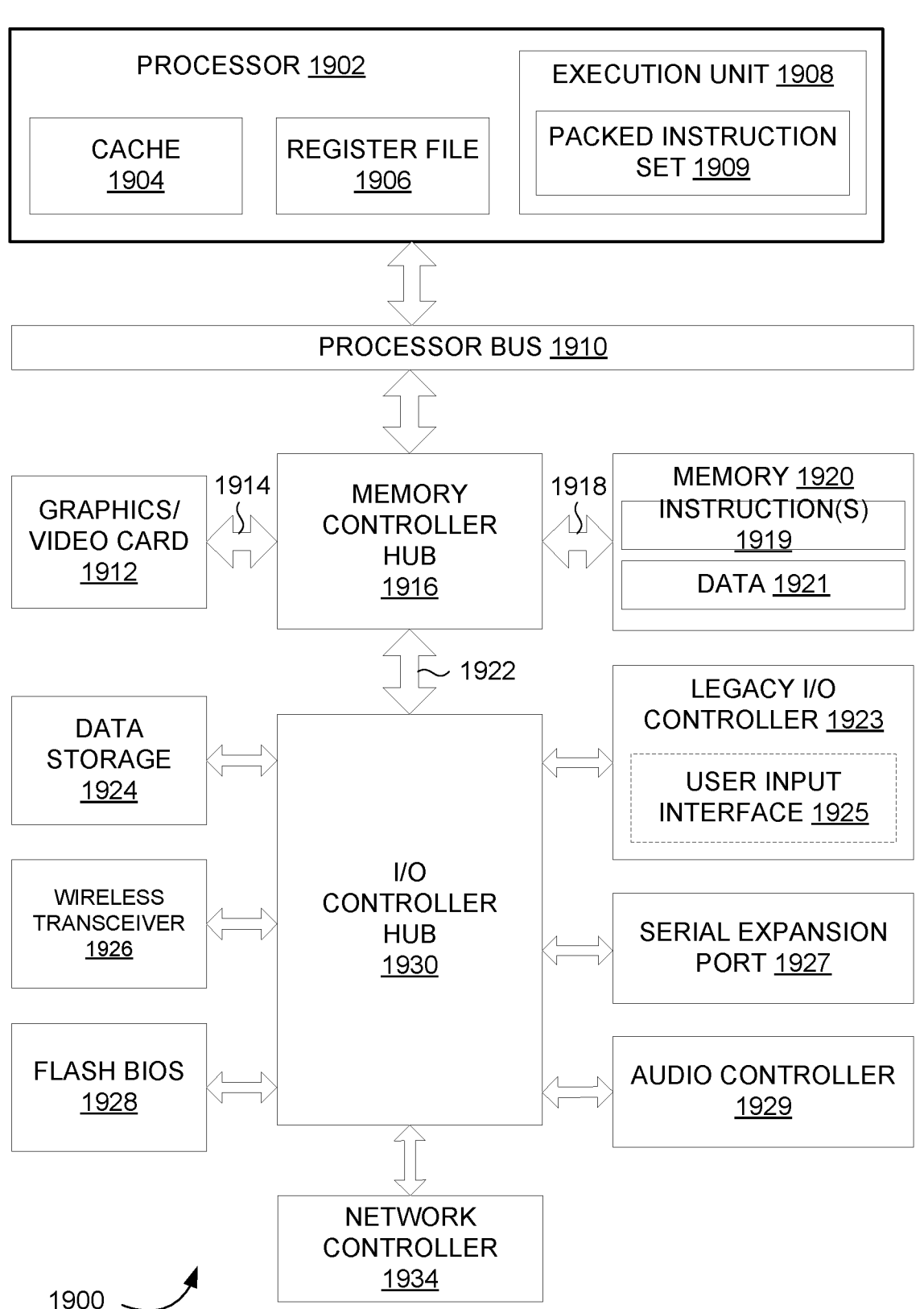
FIG. 19 illustrates a computer system, in accordance with at least one embodiment.

FIG. 19 illustrates a computer system 1900, in accordance with at least one embodiment. In at least one embodiment, computer system 1900 may be a system with interconnected devices and components, an SOC, or some combination. In at least on embodiment, computer system 1900 is formed with a processor 1902 that may include execution units to execute an instruction. In at least one embodiment, computer system 1900 may include, without limitation, a component, such as processor 1902 to employ execution units including logic to perform algorithms for processing data. In at least one embodiment, computer system 1900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1900 may include, without limitation, processor 1902 that may include, without limitation, one or more execution units 1908 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1900 is a single processor desktop or server system. In at least one embodiment, computer system 1900 may be a multiprocessor system. In at least one embodiment, processor 1902 may include, without limitation, a CISC microprocessor, a RISC microprocessor, a VLIW microprocessor, a processor implementing a combination of instruction sets, or any other processor device, such as a digital signal processor, for example. In at least one embodiment, processor 1902 may be coupled to a processor bus 1910 that may transmit data signals between processor 1902 and other components in computer system 1900.

In at least one embodiment, processor 1902 may include, without limitation, a Level 1 ("L1") internal cache memory ("cache") 1904. In at least one embodiment, processor 1902 may have a single internal cache or multiple levels of internal cache. In at least one embodiment, cache memory may reside external to processor 1902. In at least one embodiment, processor 1902 may also include a combination of both internal and external caches. In at least one embodiment, a register file 1906 may store different types of data in various registers including, without limitation, integer registers, floating point registers, status registers, and instruction pointer register.

In at least one embodiment, execution unit 1908, including, without limitation, logic to perform integer and floating point operations, also resides in processor 1902. Processor 1902 may also include a microcode ("ucode") read only memory ("ROM") that stores microcode for certain macro instructions. In at least one embodiment, execution unit 1908 may include logic to handle a packed instruction set 1909. In at least one embodiment, by including packed instruction set 1909 in an instruction set of a general-purpose processor 1902, along with associated circuitry to execute instructions, operations used by many multimedia applications may be performed using packed data in a general-purpose processor 1902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1908 may also be used in microcontrollers, embedded processors, graphics devices, DSPs, and other types of logic circuits. In at least one embodiment, computer system 1900 may include, without limitation, a memory 1920. In at least one embodiment, memory 1920 may be implemented as a DRAM device, an SRAM device, flash memory device, or other memory device. Memory 1920 may store instruction(s) 1919 and/or data 1921 represented by data signals that may be executed by processor 1902.

In at least one embodiment, a system logic chip may be coupled to processor bus 1910 and memory 1920. In at least one embodiment, the system logic chip may include, without limitation, a memory controller hub ("MCH") 1916, and processor 1902 may communicate with MCH 1916 via processor bus 1910. In at least one embodiment, MCH 1916 may provide a high bandwidth memory path 1918 to memory 1920 for instruction and data storage and for storage of graphics commands, data and textures. In at least one embodiment, MCH 1916 may direct data signals between processor 1902, memory 1920, and other components in computer system 1900 and to bridge data signals between processor bus 1910, memory 1920, and a system I/O 1922. In at least one embodiment, system logic chip may provide a graphics port for coupling to a graphics controller. In at least one embodiment, MCH 1916 may be coupled to memory 1920 through high bandwidth memory path 1918 and graphics/video card 1912 may be coupled to MCH 1916 through an Accelerated Graphics Port ("AGP") interconnect 1914.

In at least one embodiment, computer system 1900 may use system I/O 1922 that is a proprietary hub interface bus to couple MCH 1916 to I/O controller hub ("ICH") 1930. In at least one embodiment, ICH 1930 may provide direct connections to some I/O devices via a local I/O bus. In at least one embodiment, local I/O bus may include, without limitation, a high-speed I/O bus for connecting peripherals to memory 1920, a chipset, and processor 1902. Examples may include, without limitation, an audio controller 1929, a firmware hub ("flash BIOS") 1928, a wireless transceiver 1926, a data storage 1924, a legacy I/O controller 1923 containing a user input interface 1925 and a keyboard interface, a serial expansion port 1927, such as a USB, and a network controller 1934. Data storage 1924 may comprise a hard disk drive, a floppy disk drive, a CD-ROM device, a flash memory device, or other mass storage device.

In at least one embodiment, FIG. 19 illustrates a system, which includes interconnected hardware devices or "chips." In at least one embodiment, FIG. 19 may illustrate an exemplary SoC. In at least one embodiment, devices illustrated in FIG. 19 may be interconnected with proprietary interconnects, standardized interconnects (e.g., PCIe), or some combination thereof. In at least one embodiment, one or more components of system 1900 are interconnected using compute express link ("CXL") interconnects.

In at least one embodiment, at least one component shown or described with respect to FIG. 19 is used to implement techniques and/or functions described in connection with FIGS. 1-16. In at least one embodiment, processor 1902 is used to perform an API to cause a software kernel to be generated to perform an implicit matrix multiplication operation. In at least one embodiment, processor 1902 is used to perform an API to cause one or more dimensions of a tensor to be modified. In at least one embodiment, processor 1902 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 20:
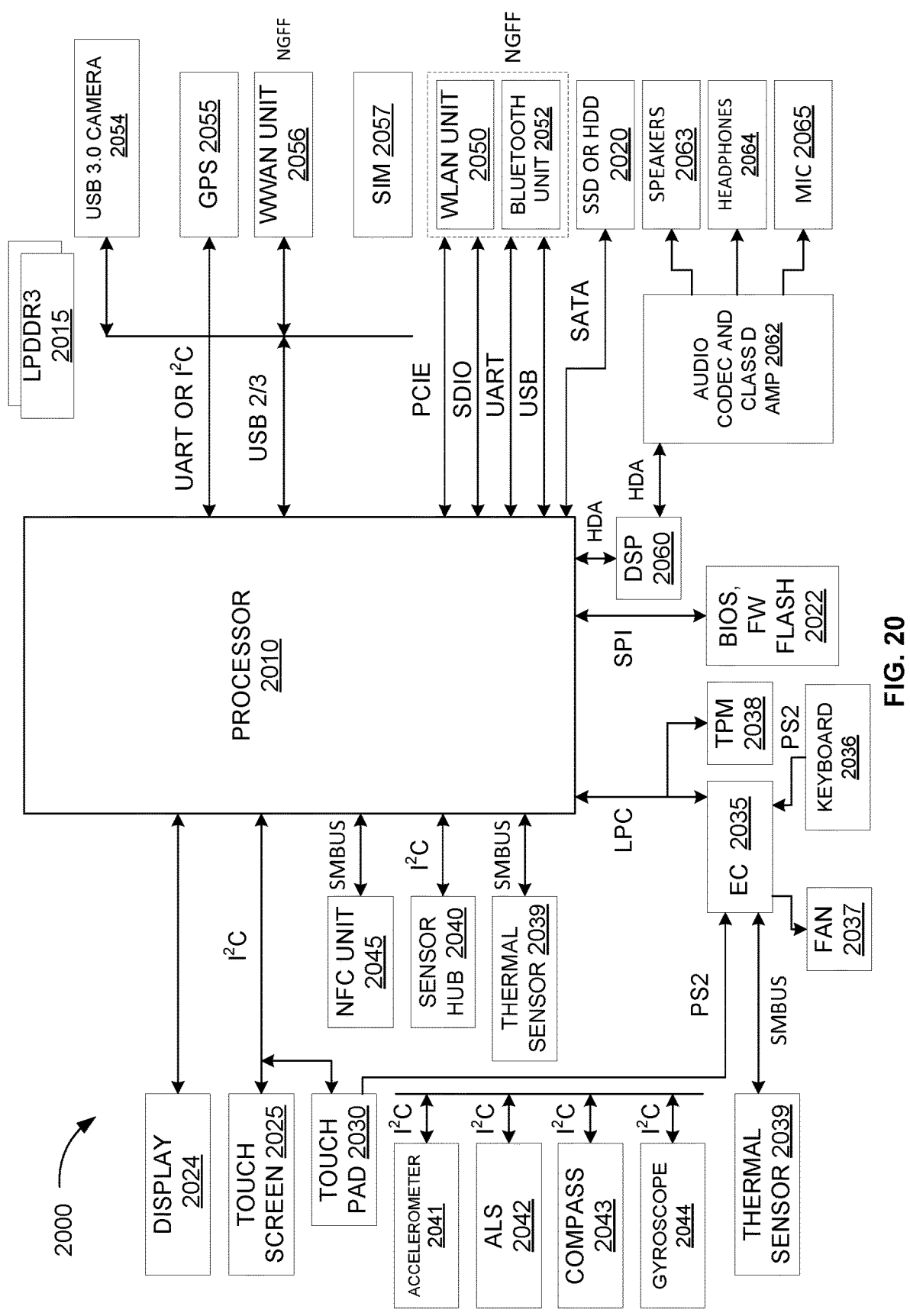
FIG. 20 illustrates a system, in accordance with at least one embodiment.

FIG. 20 illustrates a system 2000, in accordance with at least one embodiment. In at least one embodiment, system 2000 is an electronic device that utilizes a processor 2010. In at least one embodiment, system 2000 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 2000 may include, without limitation, processor 2010 communicatively coupled to any suitable number or kind of components, peripherals, modules, or devices. In at least one embodiment, processor 2010 is coupled using a bus or interface, such as an I2C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 20 illustrates a system which includes interconnected hardware devices or "chips." In at least one embodiment, FIG. 20 may illustrate an exemplary SoC. In at least one embodiment, devices illustrated in FIG. 20 may be interconnected with proprietary interconnects, standardized interconnects (e.g., PCIe) or some combination thereof. In at least one embodiment, one or more components of FIG. 20 are interconnected using CXL interconnects.

In at least one embodiment, FIG. 20 may include a display 2024, a touch screen 2025, a touch pad 2030, a Near Field Communications unit ("NFC") 2045, a sensor hub 2040, a thermal sensor 2046, an Express Chipset ("EC") 2035, a Trusted Platform Module ("TPM") 2038, BIOS/firmware/flash memory ("BIOS, FW Flash") 2022, a DSP 2060, a Solid State Disk ("SSD") or Hard Disk Drive ("HDD") 2020, a wireless local area network unit ("WLAN") 2050, a Bluetooth unit 2052, a Wireless Wide Area Network unit ("WWAN") 2056, a Global Positioning System ("GPS") 2055, a camera ("USB 3.0 camera") 2054 such as a USB 3.0 camera, or a Low Power Double Data Rate ("LPDDR") memory unit ("LPDDR3") 2015 implemented in, for example, LPDDR3 standard. These components may each be implemented in any suitable manner.

In at least one embodiment, other components may be communicatively coupled to processor 2010 through components discussed above. In at least one embodiment, an accelerometer 2041, an Ambient Light Sensor ("ALS") 2042, a compass 2043, and a gyroscope 2044 may be communicatively coupled to sensor hub 2040. In at least one embodiment, a thermal sensor 2039, a fan 2037, a keyboard 2036, and a touch pad 2030 may be communicatively coupled to EC 2035. In at least one embodiment, a speaker 2063, a headphones 2064, and a microphone ("mic") 2065 may be communicatively coupled to an audio unit ("audio codec and class d amp") 2062, which may in turn be communicatively coupled to DSP 2060. In at least one embodiment, audio unit 2062 may include, for example and without limitation, an audio coder/decoder ("codec") and a class D amplifier. In at least one embodiment, a SIM card ("SIM") 2057 may be communicatively coupled to WWAN unit 2056. In at least one embodiment, components such as WLAN unit 2050 and Bluetooth unit 2052, as well as WWAN unit 2056 may be implemented in a Next Generation Form Factor ("NGFF").

In at least one embodiment, at least one component shown or described with respect to FIG. 20 is used to implement techniques and/or functions described in connection with FIGS. 1-16. In at least one embodiment, processor 2010 is used to perform an API to cause a software kernel to be generated to perform an implicit matrix multiplication operation. In at least one embodiment, processor 2010 is used to perform an API to cause one or more dimensions of a tensor to be modified. In at least one embodiment, processor 2010 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 21:
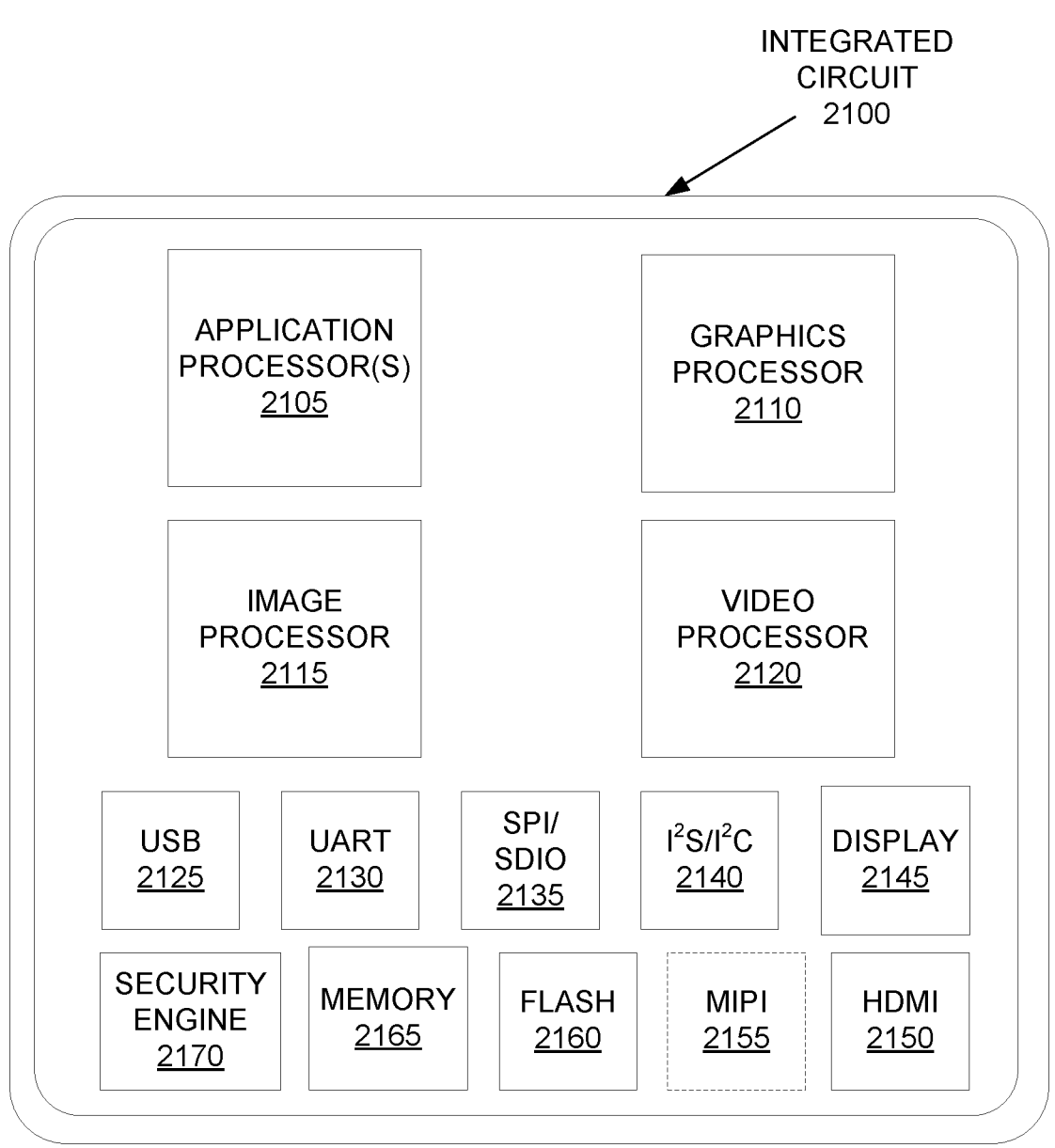
FIG. 21 illustrates an exemplary integrated circuit, in accordance with at least one embodiment.

FIG. 21 illustrates an exemplary integrated circuit 2100, in accordance with at least one embodiment. In at least one embodiment, exemplary integrated circuit 2100 is an SoC that may be fabricated using one or more IP cores. In at least one embodiment, integrated circuit 2100 includes one or more application processor(s) 2105 (e.g., CPUs, DPUs), at least one graphics processor 2110, and may additionally include an image processor 2115 and/or a video processor 2120, any of which may be a modular IP core. In at least one embodiment, integrated circuit 2100 includes peripheral or bus logic including a USB controller 2125, a UART controller 2130, an SPI/SDIO controller 2135, and an I2S/I2C controller 2140. In at least one embodiment, integrated circuit 2100 can include a display device 2145 coupled to one or more of a high-definition multimedia interface ("HDMI") controller 2150 and a mobile industry processor interface ("MIPI") display interface 2155. In at least one embodiment, storage may be provided by a flash memory subsystem 2160 including flash memory and a flash memory controller. In at least one embodiment, a memory interface may be provided via a memory controller 2165 for access to SDRAM or SRAM memory devices. In at least one embodiment, some integrated circuits additionally include an embedded security engine 2170.

In at least one embodiment, at least one component shown or described with respect to FIG. 21 is used to implement techniques and/or functions described in connection with FIGS. 1-16. In at least one embodiment, at least one of application processor 2105, graphics processor 2110, image processor 2115, or video processor 2120 is used to perform an API to cause a software kernel to be generated to perform an implicit matrix multiplication operation. In at least one embodiment, at least one of application processor 2105, graphics processor 2110, image processor 2115, or video processor 2120 is used to perform an API to cause one or more dimensions of a tensor to be modified. In at least one embodiment, at least one of application processor 2105, graphics processor 2110, image processor 2115, or video processor 2120 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 22:
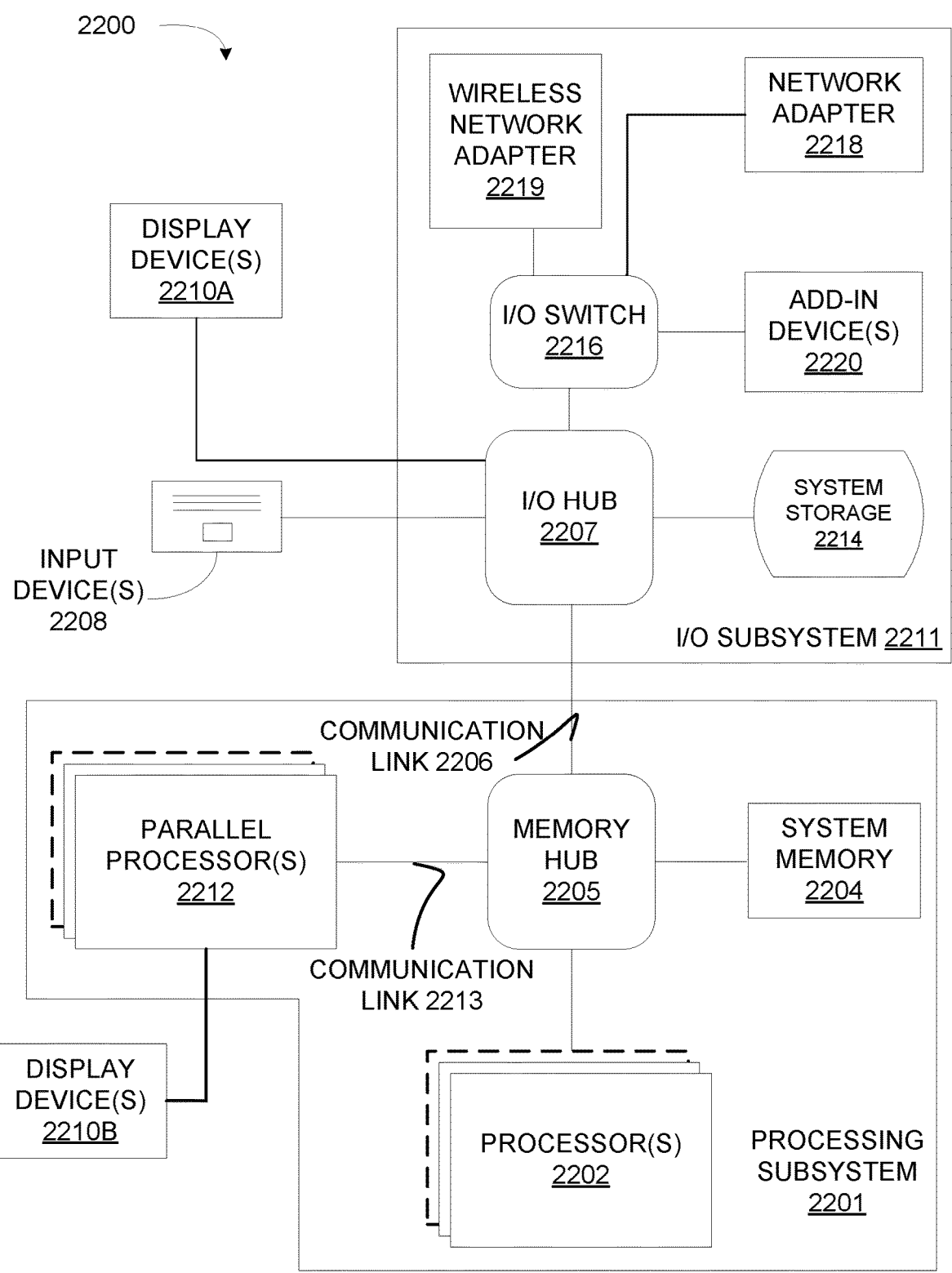
FIG. 22 illustrates a computing system, according to at least one embodiment.

FIG. 22 illustrates a computing system 2200, according to at least one embodiment; In at least one embodiment, computing system 2200 includes a processing subsystem 2201 having one or more processor(s) 2202 and a system memory 2204 communicating via an interconnection path that may include a memory hub 2205. In at least one embodiment, memory hub 2205 may be a separate component within a chipset component or may be integrated within one or more processor(s) 2202. In at least one embodiment, memory hub 2205 couples with an I/O subsystem 2211 via a communication link 2206. In at least one embodiment, I/O subsystem 2211 includes an I/O hub 2207 that can enable computing system 2200 to receive input from one or more input device(s) 2208. In at least one embodiment, I/O hub 2207 can enable a display controller, which may be included in one or more processor(s) 2202, to provide outputs to one or more display device(s) 2210A. In at least one embodiment, one or more display device(s) 2210A coupled with I/O hub 2207 can include a local, internal, or embedded display device.

In at least one embodiment, processing subsystem 2201 includes one or more parallel processor(s) 2212 coupled to memory hub 2205 via a bus or other communication link 2213. In at least one embodiment, communication link 2213 may be one of any number of standards based communication link technologies or protocols, such as, but not limited to PCIe, or may be a vendor specific communications interface or communications fabric. In at least one embodiment, one or more parallel processor(s) 2212 form a computationally focused parallel or vector processing system that can include a large number of processing cores and/or processing clusters, such as a many integrated core processor. In at least one embodiment, one or more parallel processor(s) 2212 form a graphics processing subsystem that can output pixels to one of one or more display device(s) 2210A coupled via I/O Hub 2207. In at least one embodiment, one or more parallel processor(s) 2212 can also include a display controller and display interface (not shown) to enable a direct connection to one or more display device(s) 2210B.

In at least one embodiment, a system storage unit 2214 can connect to I/O hub 2207 to provide a storage mechanism for computing system 2200. In at least one embodiment, an I/O switch 2216 can be used to provide an interface mechanism to enable connections between I/O hub 2207 and other components, such as a network adapter 2218 and/or wireless network adapter 2219 that may be integrated into a platform, and various other devices that can be added via one or more add-in device(s) 2220. In at least one embodiment, network adapter 2218 can be an Ethernet adapter or another wired network adapter. In at least one embodiment, wireless network adapter 2219 can include one or more of a Wi-Fi, Bluetooth, NFC, or other network device that includes one or more wireless radios.

In at least one embodiment, computing system 2200 can include other components not explicitly shown, including USB or other port connections, optical storage drives, video capture devices, and the like, that may also be connected to I/O hub 2207. In at least one embodiment, communication paths interconnecting various components in FIG. 22 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 2212 incorporate circuitry optimized for graphics and video processing, including, for example, video output circuitry, and constitutes a graphics processing unit ("GPU"). In at least one embodiment, one or more parallel processor(s) 2212 incorporate circuitry optimized for general purpose processing. In at least embodiment, components of computing system 2200 may be integrated with one or more other system elements on a single integrated circuit. For example, in at least one embodiment, one or more parallel processor(s) 2212, memory hub 2205, processor(s) 2202, and I/O hub 2207 can be integrated into an SoC integrated circuit. In at least one embodiment, components of computing system 2200 can be integrated into a single package to form a system in package ("SIP") configuration. In at least one embodiment, at least a portion of the components of computing system 2200 can be integrated into a multi-chip module ("MCM"), which can be interconnected with other multi-chip modules into a modular computing system. In at least one embodiment, I/O subsystem 2211 and display devices 2210B are omitted from computing system 2200.

In at least one embodiment, at least one component shown or described with respect to FIG. 22 is used to implement techniques and/or functions described in connection with FIGS. 1-16. In at least one embodiment, at least one of processor(s) 2202 or parallel processor(s) 2212 is used to perform an API to cause a software kernel to be generated to perform an implicit matrix multiplication operation. In at least one embodiment, at least one of processor(s) 2202 or parallel processor(s) 2212 is used to perform an API to cause one or more dimensions of a tensor to be modified. In at least one embodiment, at least one of processor(s) 2202 or parallel processor(s) 2212 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Processing Systems

The following figures set forth, without limitation, exemplary processing systems that can be used to implement at least one embodiment.

Figure 23:
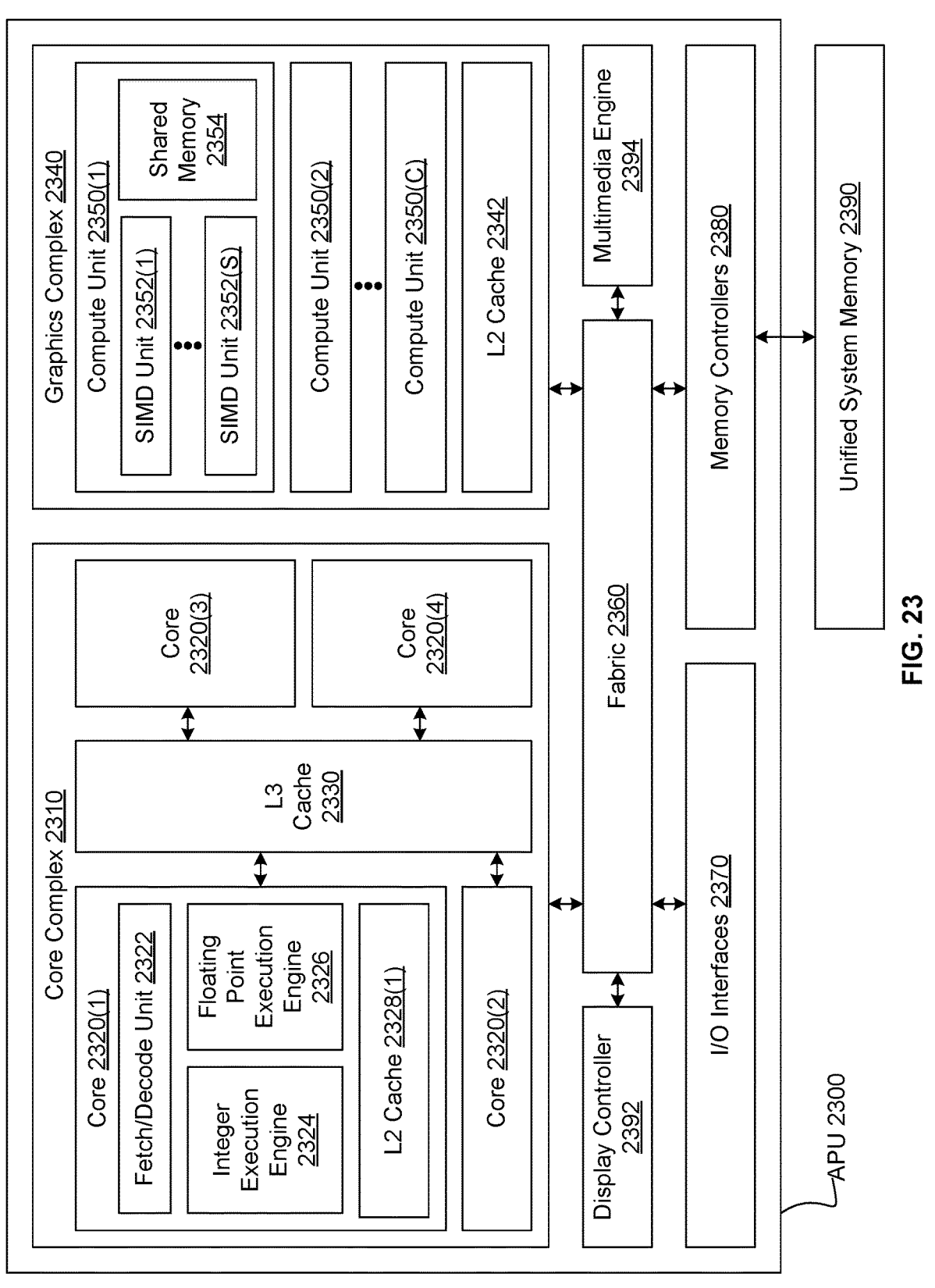
FIG. 23 illustrates an APU, in accordance with at least one embodiment.

FIG. 23 illustrates an accelerated processing unit ("APU") 2300, in accordance with at least one embodiment. In at least one embodiment, APU 2300 is developed by AMD Corporation of Santa Clara, CA. In at least one embodiment, APU 2300 can be configured to execute an application program, such as a CUDA program. In at least one embodiment, APU 2300 includes, without limitation, a core complex 2310, a graphics complex 2340, fabric 2360, I/O interfaces 2370, memory controllers 2380, a display controller 2392, and a multimedia engine 2394. In at least one embodiment, APU 2300 may include, without limitation, any number of core complexes 2310, any number of graphics complexes 2350, any number of display controllers 2392, and any number of multimedia engines 2394 in any combination. For explanatory purposes, multiple instances of like objects are denoted herein with reference numbers identifying the object and parenthetical numbers identifying the instance where needed.

In at least one embodiment, core complex 2310 is a CPU, graphics complex 2340 is a GPU, and APU 2300 is a processing unit that integrates, without limitation, 2310 and 2340 onto a single chip. In at least one embodiment, some tasks may be assigned to core complex 2310 and other tasks may be assigned to graphics complex 2340. In at least one embodiment, core complex 2310 is configured to execute main control software associated with APU 2300, such as an operating system. In at least one embodiment, core complex 2310 is the master processor of APU 2300, controlling and coordinating operations of other processors. In at least one embodiment, core complex 2310 issues commands that control the operation of graphics complex 2340. In at least one embodiment, core complex 2310 can be configured to execute host executable code derived from CUDA source code, and graphics complex 2340 can be configured to execute device executable code derived from CUDA source code.

In at least one embodiment, core complex 2310 includes, without limitation, cores 2320(1)-2320(4) and an L3 cache 2330. In at least one embodiment, core complex 2310 may include, without limitation, any number of cores 2320 and any number and type of caches in any combination. In at least one embodiment, cores 2320 are configured to execute instructions of a particular instruction set architecture ("ISA"). In at least one embodiment, each core 2320 is a CPU core.

In at least one embodiment, each core 2320 includes, without limitation, a fetch/decode unit 2322, an integer execution engine 2324, a floating point execution engine 2326, and an L2 cache 2328. In at least one embodiment, fetch/decode unit 2322 fetches instructions, decodes such instructions, generates micro-operations, and dispatches separate micro-instructions to integer execution engine 2324 and floating point execution engine 2326. In at least one embodiment, fetch/decode unit 2322 can concurrently dispatch one micro-instruction to integer execution engine 2324 and another micro-instruction to floating point execution engine 2326. In at least one embodiment, integer execution engine 2324 executes, without limitation, integer and memory operations. In at least one embodiment, floating point engine 2326 executes, without limitation, floating point and vector operations. In at least one embodiment, fetch-decode unit 2322 dispatches micro-instructions to a single execution engine that replaces both integer execution engine 2324 and floating point execution engine 2326.

In at least one embodiment, each core 2320(*i*), where i is an integer representing a particular instance of core 2320, may access L2 cache 2328(*i*) included in core 2320(*i*). In at least one embodiment, each core 2320 included in core complex 2310(*j*), where j is an integer representing a particular instance of core complex 2310, is connected to other cores 2320 included in core complex 2310(*j*) via L3 cache 2330(*j*) included in core complex 2310(*j*). In at least one embodiment, cores 2320 included in core complex 2310(*j*), where j is an integer representing a particular instance of core complex 2310, can access all of L3 cache 2330(*j*) included in core complex 2310(*j*). In at least one embodiment, L3 cache 2330 may include, without limitation, any number of slices.

In at least one embodiment, graphics complex 2340 can be configured to perform compute operations in a highly-parallel fashion. In at least one embodiment, graphics complex 2340 is configured to execute graphics pipeline operations such as draw commands, pixel operations, geometric computations, and other operations associated with rendering an image to a display. In at least one embodiment, graphics complex 2340 is configured to execute operations unrelated to graphics. In at least one embodiment, graphics complex 2340 is configured to execute both operations related to graphics and operations unrelated to graphics.

In at least one embodiment, graphics complex 2340 includes, without limitation, any number of compute units 2350 and an L2 cache 2342. In at least one embodiment, compute units 2350 share L2 cache 2342. In at least one embodiment, L2 cache 2342 is partitioned. In at least one embodiment, graphics complex 2340 includes, without limitation, any number of compute units 2350 and any number (including zero) and type of caches. In at least one embodiment, graphics complex 2340 includes, without limitation, any amount of dedicated graphics hardware.

In at least one embodiment, each compute unit 2350 includes, without limitation, any number of SIMD units 2352 and a shared memory 2354. In at least one embodiment, each SIMD unit 2352 implements a SIMD architecture and is configured to perform operations in parallel. In at least one embodiment, each compute unit 2350 may execute any number of thread blocks, but each thread block executes on a single compute unit 2350. In at least one embodiment, a thread block includes, without limitation, any number of threads of execution. In at least one embodiment, a work-group is a thread block. In at least one embodiment, each SIMD unit 2352 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 2354.

In at least one embodiment, fabric 2360 is a system interconnect that facilitates data and control transmissions across core complex 2310, graphics complex 2340, I/O interfaces 2370, memory controllers 2380, display controller 2392, and multimedia engine 2394. In at least one embodiment, APU 2300 may include, without limitation, any amount and type of system interconnect in addition to or instead of fabric 2360 that facilitates data and control transmissions across any number and type of directly or indirectly linked components that may be internal or external to APU 2300. In at least one embodiment, I/O interfaces 2370 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 2370 In at least one embodiment, peripheral devices that are coupled to I/O interfaces 2370 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 2394 includes, without limitation, any amount and type of circuitry that is related to multimedia, such as a video decoder, a video encoder, an image signal processor, etc. In at least one embodiment, memory controllers 2380 facilitate data transfers between APU 2300 and a unified system memory 2390. In at least one embodiment, core complex 2310 and graphics complex 2340 share unified system memory 2390.

In at least one embodiment, APU 2300 implements a memory subsystem that includes, without limitation, any amount and type of memory controllers 2380 and memory devices (e.g., shared memory 2354) that may be dedicated to one component or shared among multiple components. In at least one embodiment, APU 2300 implements a cache subsystem that includes, without limitation, one or more cache memories (e.g., L2 caches 2428, L3 cache 2330, and L2 cache 2342) that may each be private to or shared between any number of components (e.g., cores 2320, core complex 2310, SIMD units 2352, compute units 2350, and graphics complex 2340).

In at least one embodiment, at least one component shown or described with respect to FIG. 23 is used to implement techniques and/or functions described in connection with FIGS. 1-16. In at least one embodiment, at least one element of core complex 2310 or graphics complex 2340 is used to perform an API to cause a software kernel to be generated to perform an implicit matrix multiplication operation. In at least one embodiment, at least one element of core complex 2310 or graphics complex 2340 is used to perform an API to cause one or more dimensions of a tensor to be modified. In at least one embodiment, at least one element of core complex 2310 or graphics complex 2340 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 24:
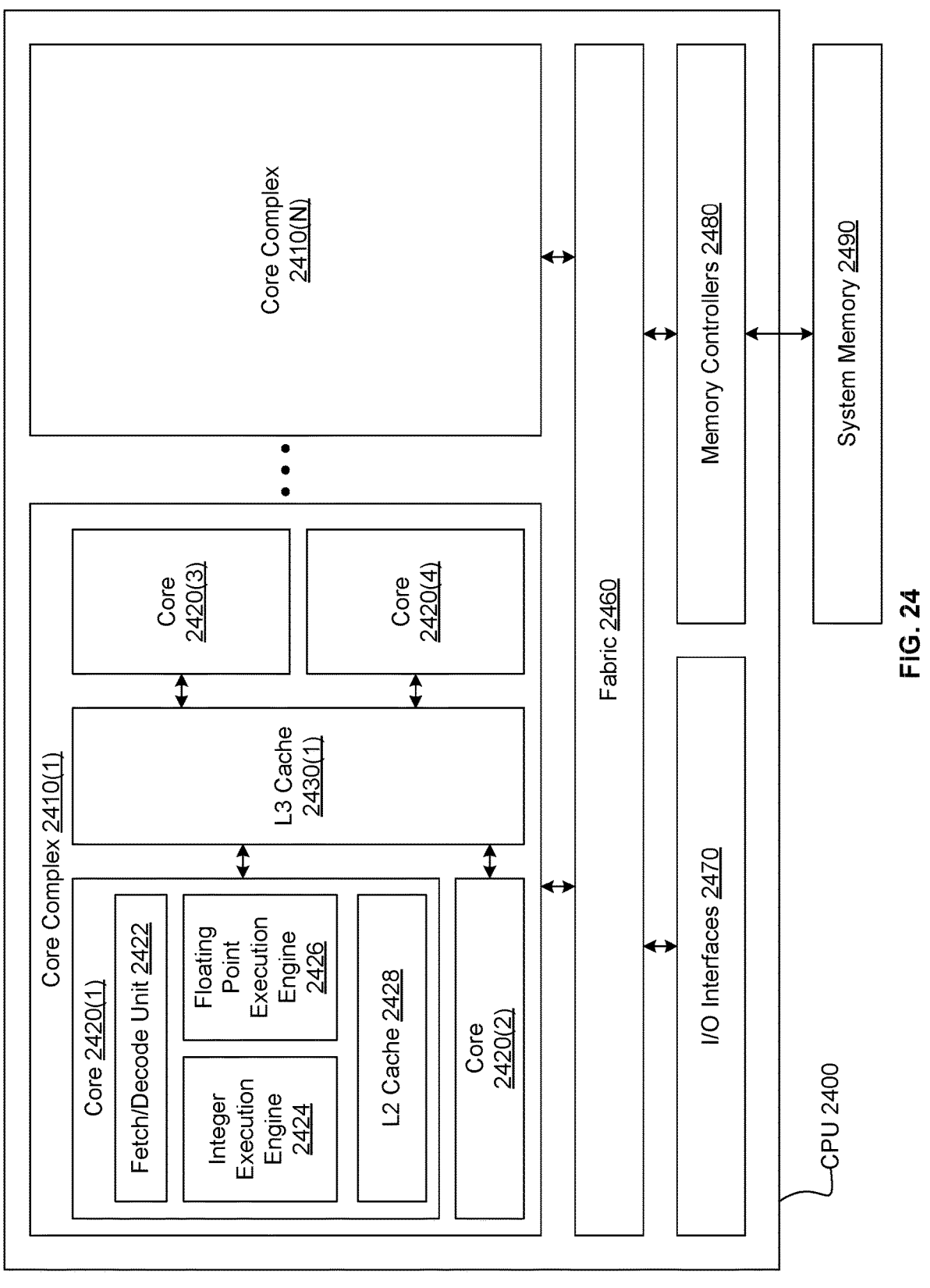
FIG. 24 illustrates a CPU, in accordance with at least one embodiment.

FIG. 24 illustrates a CPU 2400, in accordance with at least one embodiment. In at least one embodiment, CPU 2400 is developed by AMD Corporation of Santa Clara, CA. In at least one embodiment, CPU 2400 can be configured to execute an application program. In at least one embodiment, CPU 2400 is configured to execute main control software, such as an operating system. In at least one embodiment, CPU 2400 issues commands that control the operation of an external GPU (not shown). In at least one embodiment, CPU 2400 can be configured to execute host executable code derived from CUDA source code, and an external GPU can be configured to execute device executable code derived from such CUDA source code. In at least one embodiment, CPU 2400 includes, without limitation, any number of core complexes 2410, fabric 2460, I/O interfaces 2470, and memory controllers 2480.

In at least one embodiment, core complex 2410 includes, without limitation, cores 2420(1)-2420(4) and an L3 cache 2430. In at least one embodiment, core complex 2410 may include, without limitation, any number of cores 2420 and any number and type of caches in any combination. In at least one embodiment, cores 2420 are configured to execute instructions of a particular ISA. In at least one embodiment, each core 2420 is a CPU core.

In at least one embodiment, each core 2420 includes, without limitation, a fetch/decode unit 2422, an integer execution engine 2424, a floating point execution engine 2426, and an L2 cache 2428. In at least one embodiment, fetch/decode unit 2422 fetches instructions, decodes such instructions, generates micro-operations, and dispatches separate micro-instructions to integer execution engine 2424 and floating point execution engine 2426. In at least one embodiment, fetch/decode unit 2422 can concurrently dispatch one micro-instruction to integer execution engine 2424 and another micro-instruction to floating point execution engine 2426. In at least one embodiment, integer execution engine 2424 executes, without limitation, integer and memory operations. In at least one embodiment, floating point engine 2426 executes, without limitation, floating point and vector operations. In at least one embodiment, fetch-decode unit 2422 dispatches micro-instructions to a single execution engine that replaces both integer execution engine 2424 and floating point execution engine 2426.

In at least one embodiment, each core 2420(i), where i is an integer representing a particular instance of core 2420, may access L2 cache 2428(i) included in core 2420(i). In at least one embodiment, each core 2420 included in core complex 2410(j), where j is an integer representing a particular instance of core complex 2410, is connected to other cores 2420 in core complex 2410(j) via L3 cache 2430(j) included in core complex 2410(j). In at least one embodiment, cores 2420 included in core complex 2410(j), where j is an integer representing a particular instance of core complex 2410, can access all of L3 cache 2430(j) included in core complex 2410(j). In at least one embodiment, L3 cache 2430 may include, without limitation, any number of slices.

In at least one embodiment, fabric 2460 is a system interconnect that facilitates data and control transmissions across core complexes 2410(1)-2410(N) (where N is an integer greater than zero), I/O interfaces 2470, and memory controllers 2480. In at least one embodiment, CPU 2400 may include, without limitation, any amount and type of system interconnect in addition to or instead of fabric 2460 that facilitates data and control transmissions across any number and type of directly or indirectly linked components that may be internal or external to CPU 2400. In at least one embodiment, I/O interfaces 2470 are representative of any number and type of I/O interfaces (e.g., PCI, PCI-X, PCIe, GBE, USB, etc.). In at least one embodiment, various types of peripheral devices are coupled to I/O interfaces 2470 In at least one embodiment, peripheral devices that are coupled to I/O interfaces 2470 may include, without limitation, displays, keyboards, mice, printers, scanners, joysticks or other types of game controllers, media recording devices, external storage devices, network interface cards, and so forth.

In at least one embodiment, memory controllers 2480 facilitate data transfers between CPU 2400 and a system memory 2490. In at least one embodiment, core complex 2410 and graphics complex 2440 share system memory 2490. In at least one embodiment, CPU 2400 implements a memory subsystem that includes, without limitation, any amount and type of memory controllers 2480 and memory devices that may be dedicated to one component or shared among multiple components. In at least one embodiment, CPU 2400 implements a cache subsystem that includes, without limitation, one or more cache memories (e.g., L2 caches 2428 and L3 caches 2430) that may each be private to or shared between any number of components (e.g., cores 2420 and core complexes 2410).

In at least one embodiment, at least one component shown or described with respect to FIG. 24 is used to implement techniques and/or functions described in connection with FIGS. 1-16. In at least one embodiment, at least one element of core complex 2410(1)-2410(n) is used to perform an API to cause a software kernel to be generated to perform an implicit matrix multiplication operation. In at least one embodiment, at least one element of core complex 2410(1)-2410(n) is used to perform an API to cause one or more dimensions of a tensor to be modified. In at least one embodiment, at least one element of core complex 2410(1)-2410(n) is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 25:
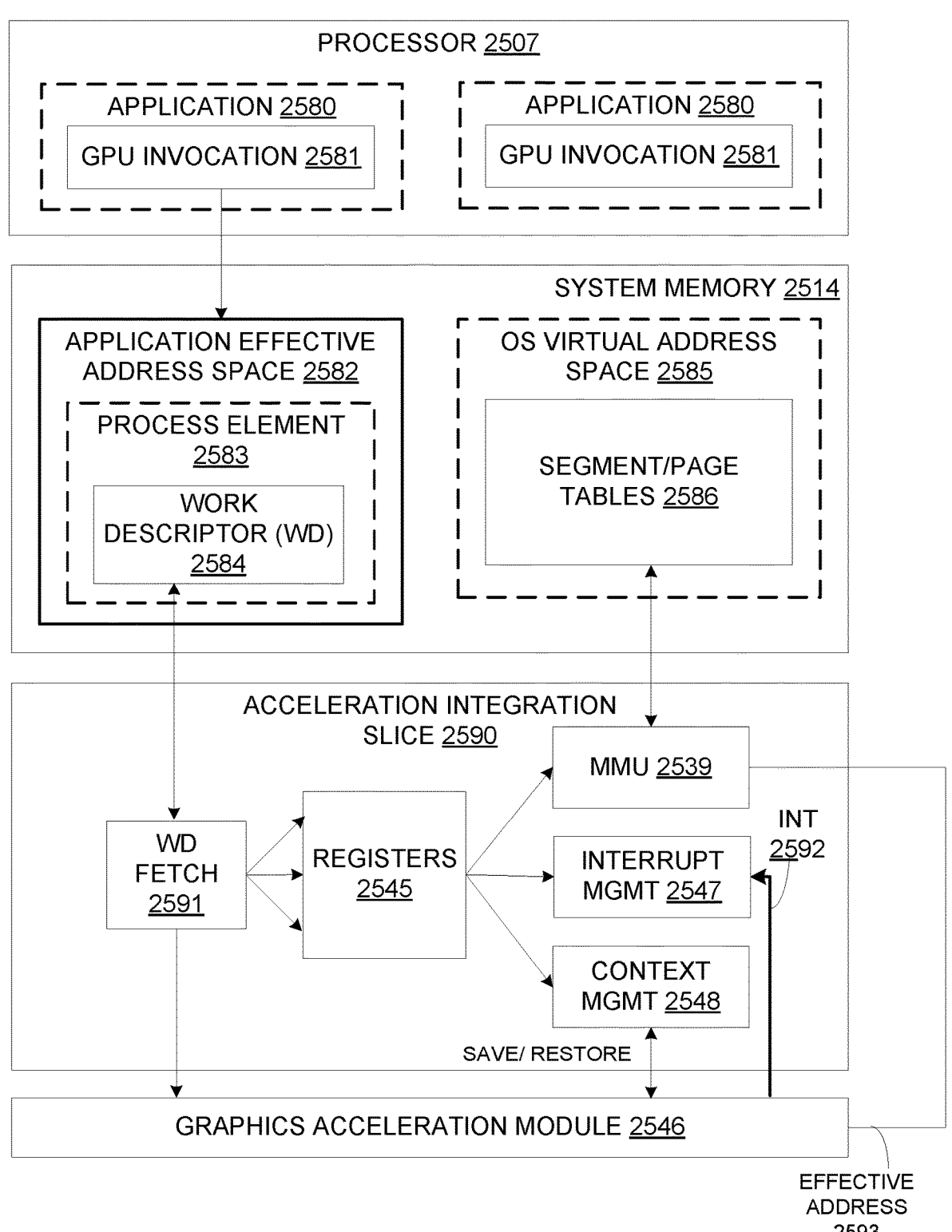
FIG. 25 illustrates an exemplary accelerator integration slice, in accordance with at least one embodiment.

FIG. 25 illustrates an exemplary accelerator integration slice 2590, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2582 within system memory 2514 stores process elements 2583. In one embodiment, process elements 2583 are stored in response to GPU invocations 2581 from applications 2580 executed on processor 2507. A process element 2583 contains process state for corresponding application 2580. A work descriptor ("WD") 2584 contained in process element 2583 can be a single job requested by an application or may contain a pointer to a queue of jobs. In at least one embodiment, WD 2584 is a pointer to a job request queue in application effective address space 2582.

Graphics acceleration module 2546 and/or individual graphics processing engines can be shared by all or a subset of processes in a system. In at least one embodiment, an infrastructure for setting up process state and sending WD 2584 to graphics acceleration module 2546 to start a job in a virtualized environment may be included.

In at least one embodiment, a dedicated-process programming model is implementation-specific. In this model, a single process owns graphics acceleration module 2546 or an individual graphics processing engine. Because graphics acceleration module 2546 is owned by a single process, a hypervisor initializes an accelerator integration circuit for an owning partition and an operating system initializes accelerator integration circuit for an owning process when graphics acceleration module 2546 is assigned.

In operation, a WD fetch unit 2591 in accelerator integration slice 2590 fetches next WD 2584 which includes an indication of work to be done by one or more graphics processing engines of graphics acceleration module 2546. Data from WD 2584 may be stored in registers 2545 and used by a memory management unit ("MMU") 2539, interrupt management circuit 2547 and/or context management circuit 2548 as illustrated. For example, one embodiment of MMU 2539 includes segment/page walk circuitry for accessing segment/page tables 2586 within OS virtual address space 2585. Interrupt management circuit 2547 may process interrupt events ("INT") 2592 received from graphics acceleration module 2546. When performing graphics operations, an effective address 2593 generated by a graphics processing engine is translated to a real address by MMU 2539.

In one embodiment, a same set of registers 2545 are duplicated for each graphics processing engine and/or graphics acceleration module 2546 and may be initialized by a hypervisor or operating system. Each of these duplicated registers may be included in accelerator integration slice 2590. Exemplary registers that may be initialized by a hypervisor are shown in Table 1.

TABLE 1

| Hypervisor Initialized Registers |
| --- |
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by an operating system are shown in Table 2.

TABLE 2

| Operating System Initialized Registers |
| --- |
| 1  Process and Thread Identification |
| 2  Effective Address (EA) Context Save/Restore Pointer |
| 3  Virtual Address (VA) Accelerator Utilization Record Pointer |
| 4  Virtual Address (VA) Storage Segment Table Pointer |
| 5  Authority Mask |
| 6  Work descriptor |

In one embodiment, each WD 2584 is specific to a particular graphics acceleration module 2546 and/or a particular graphics processing engine. It contains all information required by a graphics processing engine to do work or it can be a pointer to a memory location where an application has set up a command queue of work to be completed.

In at least one embodiment, at least one component shown or described with respect to FIG. 25 is used to implement techniques and/or functions described in connection with FIGS. 1-16. In at least one embodiment, processor 2507 is used to perform an API to cause a software kernel to be generated to perform an implicit matrix multiplication operation. In In at least one embodiment, processor 2507 is used to perform an API to cause one or more dimensions of a tensor to be modified. In at least one embodiment, processor 2507 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 26A:
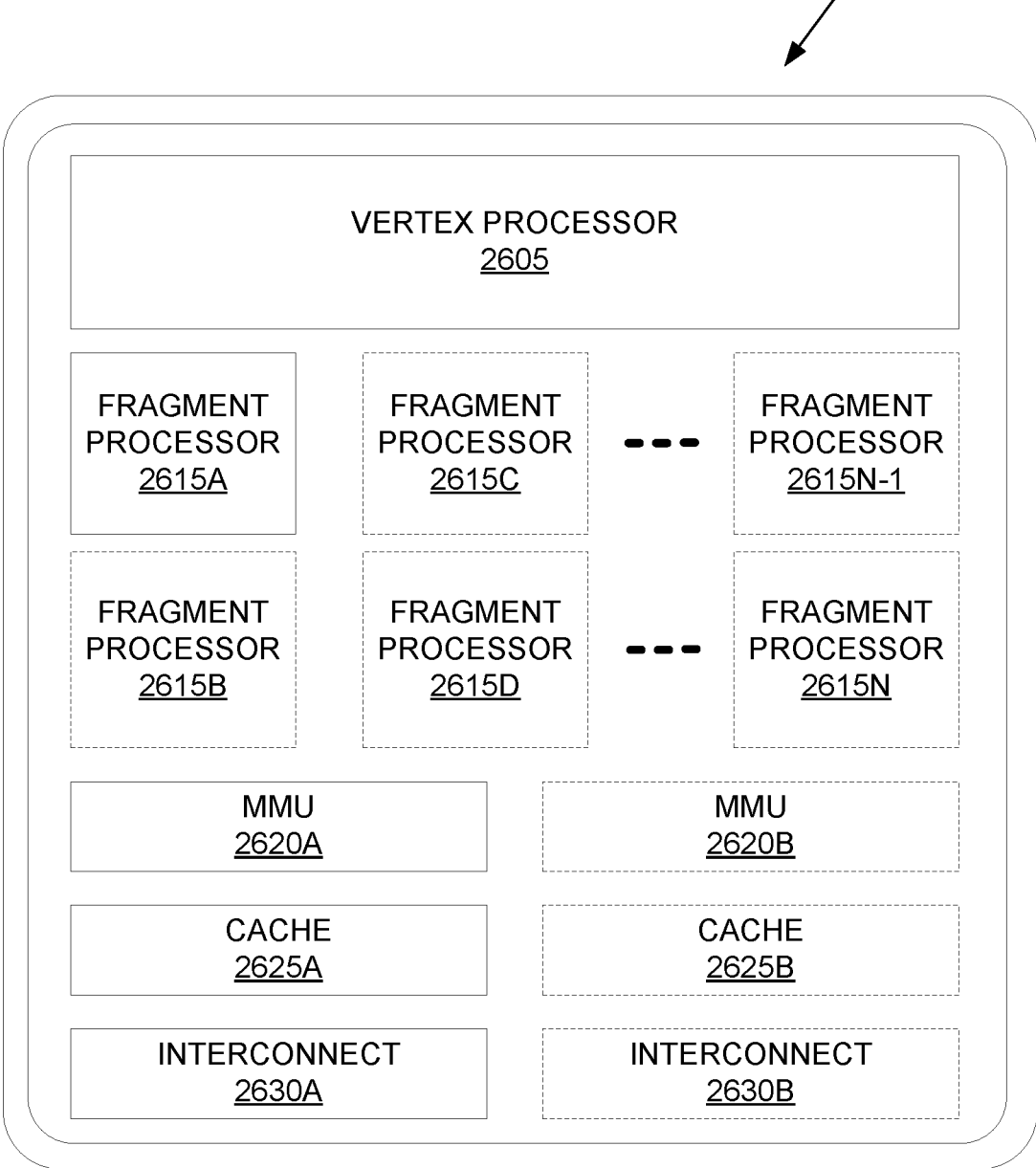
FIGS. 26A-26B illustrate exemplary graphics processors, in accordance with at least one embodiment.
Figure 26B:
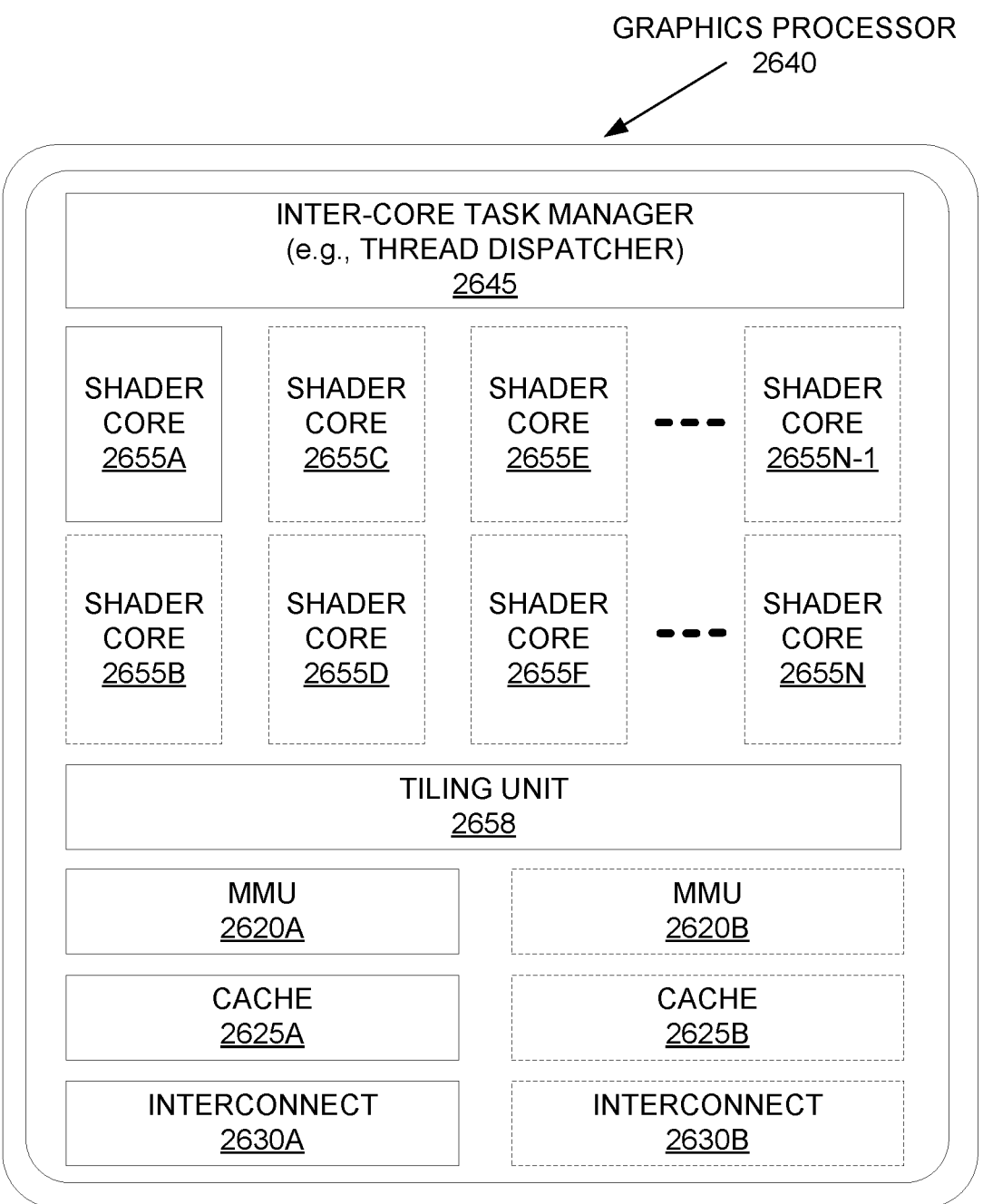

FIGS. 26A-26B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 26A illustrates an exemplary graphics processor 2610 of an SoC integrated circuit that may be fabricated using one or more IP cores, in accordance with at least one embodiment. FIG. 26B illustrates an additional exemplary graphics processor 2640 of an SoC integrated circuit that may be fabricated using one or more IP cores, in accordance with at least one embodiment. In at least one embodiment, graphics processor 2610 of FIG. 26A is a low power graphics processor core. In at least one embodiment, graphics processor 2640 of FIG. 26B is a higher performance graphics processor core. In at least one embodiment, each of graphics processors 2610, 2640 can be variants of graphics processor 2110 of FIG. 21.

In at least one embodiment, graphics processor 2610 includes a vertex processor 2605 and one or more fragment processor(s) 2615A-2615N (e.g., 2615A, 2615B, 2615C, 2615D, through 2615N-1, and 2615N). In at least one embodiment, graphics processor 2610 can execute different shader programs via separate logic, such that vertex processor 2605 is optimized to execute operations for vertex shader programs, while one or more fragment processor(s) 2615A-2615N execute fragment (e.g., pixel) shading operations for fragment or pixel shader programs. In at least one embodiment, vertex processor 2605 performs a vertex processing stage of a 3D graphics pipeline and generates primitives and vertex data. In at least one embodiment, fragment processor(s) 2615A-2615N use primitive and vertex data generated by vertex processor 2605 to produce a framebuffer that is displayed on a display device. In at least one embodiment, fragment processor(s) 2615A-2615N are optimized to execute fragment shader programs as provided for in an OpenGL API, which may be used to perform similar operations as a pixel shader program as provided for in a Direct 3D API.

In at least one embodiment, graphics processor 2610 additionally includes one or more MMU(s) 2620A-2620B, cache(s) 2625A-2625B, and circuit interconnect(s) 2630A-

2630B. In at least one embodiment, one or more MMU(s) 2620A-2620B provide for virtual to physical address mapping for graphics processor 2610, including for vertex processor 2605 and/or fragment processor(s) 2615A-2615N, which may reference vertex or image/texture data stored in memory, in addition to vertex or image/texture data stored in one or more cache(s) 2625A-2625B. In at least one embodiment, one or more MMU(s) 2620A-2620B may be synchronized with other MMUs within a system, including one or more MMUs associated with one or more application processor(s) 2105, image processors 2115, and/or video processors 2120 of FIG. 21, such that each processor 2105-2120 can participate in a shared or unified virtual memory system. In at least one embodiment, one or more circuit interconnect(s) 2630A-2630B enable graphics processor 2610 to interface with other IP cores within an SoC, either via an internal bus of the SoC or via a direct connection.

In at least one embodiment, graphics processor 2640 includes one or more MMU(s) 2620A-2620B, caches 2625A-2625B, and circuit interconnects 2630A-2630B of graphics processor 2610 of FIG. 26A. In at least one embodiment, graphics processor 2640 includes one or more shader core(s) 2655A-2655N (e.g., 2655A, 2655B, 2655C, 2655D, 2655E, 2655F, through 2655N-1, and 2655N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2640 includes an inter-core task manager 2645, which acts as a thread dispatcher to dispatch execution threads to one or more shader cores 2655A-2655N and a tiling unit 2658 to accelerate tiling operations for tile-based rendering, in which rendering operations for a scene are subdivided in image space, for example to exploit local spatial coherence within a scene or to optimize use of internal caches.

In at least one embodiment, at least one component shown or described with respect to FIG. 26A and FIG. 26B is used to implement techniques and/or functions described in connection with FIGS. 1-16. In at least one embodiment, at least one of graphics processor 2610 or graphics processor 2640 is used to perform an API to cause a software kernel to be generated to perform an implicit matrix multiplication operation. In at least one embodiment, at least one of graphics processor 2610 or graphics processor 2640 is used to perform an API to cause one or more dimensions of a tensor to be modified. In at least one embodiment, at least one of graphics processor 2610 or graphics processor 2640 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 27A:
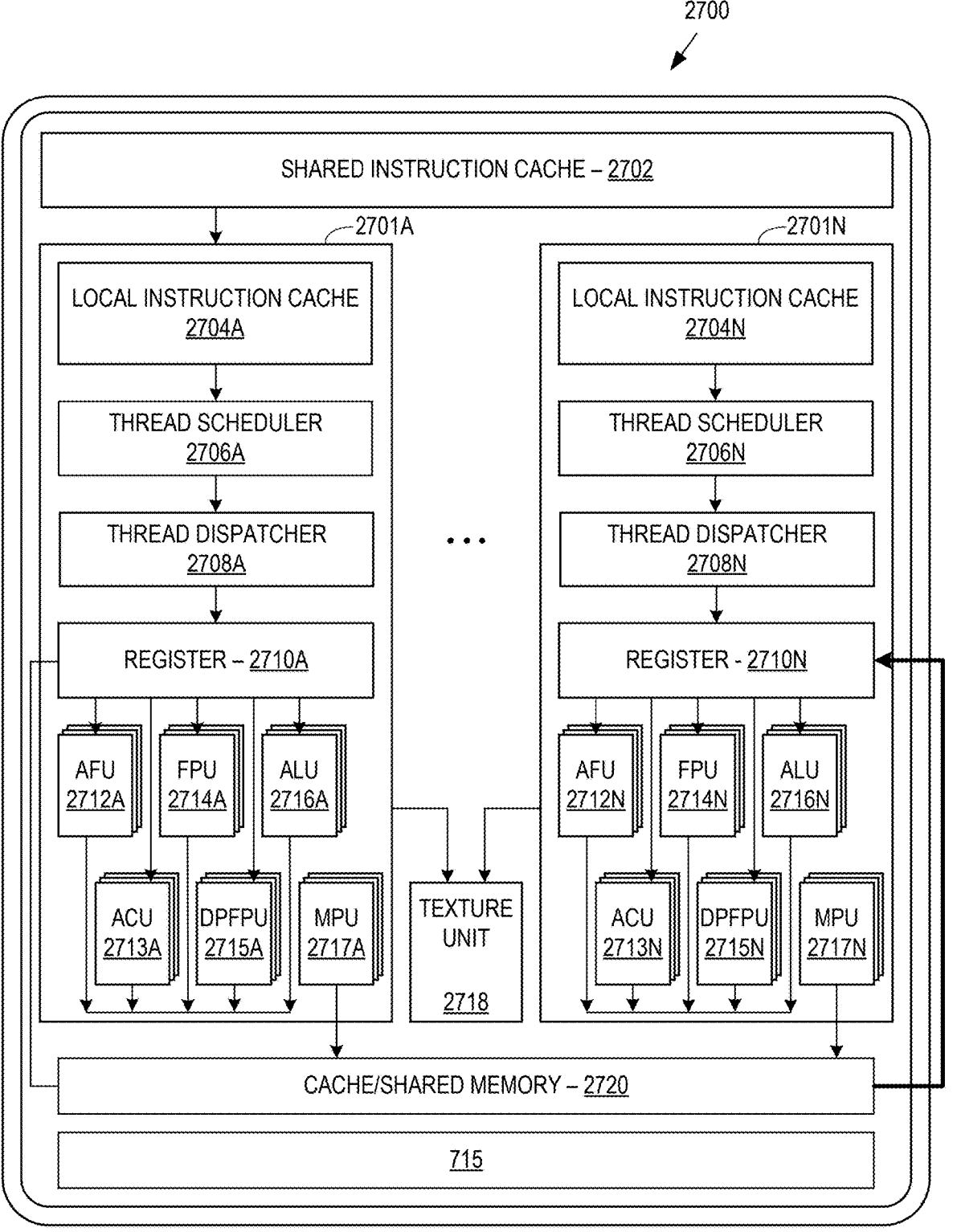
FIG. 27A illustrates a graphics core, in accordance with at least one embodiment.

FIG. 27A illustrates a graphics core 2700, in accordance with at least one embodiment. In at least one embodiment, graphics core 2700 may be included within graphics processor 2110 of FIG. 21. In at least one embodiment, graphics core 2700 may be a unified shader core 2655A-2655N as in FIG. 26B. In at least one embodiment, graphics core 2700 includes a shared instruction cache 2702, a texture unit 2718, and a cache/shared memory 2720 that are common to execution resources within graphics core 2700. In at least one embodiment, graphics core 2700 can include multiple slices 2701A-2701N or partition for each core, and a graphics processor can include multiple instances of graphics core 2700. Slices 2701A-2701N can include support logic including a local instruction cache 2704A-2704N, a thread scheduler 2706A-2706N, a thread dispatcher 2708A-2708N, and a set of registers 2710A-2710N. In at least one embodiment, slices 2701A-2701N can include a set of additional function units ("AFUs") 2712A-2712N, floating-point units ("FPUs") 2714A-2714N, integer arithmetic logic units ("ALUs") 2716-2716N, address computational units ("ACUs") 2713A-2713N, double-precision floating-point units ("DPFPUs") 2715A-2715N, and matrix processing units ("MPUs") 2717A-2717N.

In at least one embodiment, FPUs 2714A-2714N can perform single-precision (32-bit) and half-precision (16-bit) floating point operations, while DPFPUs 2715A-2715N perform double precision (64-bit) floating point operations. In at least one embodiment, ALUs 2716A-2716N can perform variable precision integer operations at 8-bit, 16-bit, and 32-bit precision, and can be configured for mixed precision operations. In at least one embodiment, MPUs 2717A-2717N can also be configured for mixed precision matrix operations, including half-precision floating point and 8-bit integer operations. In at least one embodiment, MPUs 2717-2717N can perform a variety of matrix operations to accelerate CUDA programs, including enabling support for accelerated general matrix to matrix multiplication ("GEMM"). In at least one embodiment, AFUs 2712A-2712N can perform additional logic operations not supported by floating-point or integer units, including trigonometric operations (e.g., Sine, Cosine, etc.).

In at least one embodiment, at least one component shown or described with respect to FIG. 27A is used to implement techniques and/or functions described in connection with FIGS. 1-16. In at least one embodiment, graphics core 2700 is used to perform an API to cause a software kernel to be generated to perform an implicit matrix multiplication operation. In at least one embodiment, graphics core 2700 is used to perform an API to cause one or more dimensions of a tensor to be modified. In at least one embodiment, graphics core 2700 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 27B:
FIG. 27B illustrates a GPGPU, in accordance with at least one embodiment.

FIG. 27B illustrates a general-purpose graphics processing unit ("GPGPU") 2730, in accordance with at least one embodiment. In at least one embodiment, GPGPU 2730 is highly-parallel and suitable for deployment on a multi-chip module. In at least one embodiment, GPGPU 2730 can be configured to enable highly-parallel compute operations to be performed by an array of GPUs. In at least one embodiment, GPGPU 2730 can be linked directly to other instances of GPGPU 2730 to create a multi-GPU cluster to improve execution time for CUDA programs. In at least one embodiment, GPGPU 2730 includes a host interface 2732 to enable a connection with a host processor. In at least one embodiment, host interface 2732 is a PCIe interface. In at least one embodiment, host interface 2732 can be a vendor specific communications interface or communications fabric. In at least one embodiment, GPGPU 2730 receives commands from a host processor and uses a global scheduler 2734 to distribute execution threads associated with those commands to a set of compute clusters 2736A-2736H. In at least one embodiment, compute clusters 2736A-2736H share a cache memory 2738. In at least one embodiment, cache memory 2738 can serve as a higher-level cache for cache memories within compute clusters 2736A-2736H.

In at least one embodiment, GPGPU 2730 includes memory 2744A-2744B coupled with compute clusters 2736A-2736H via a set of memory controllers 2742A-2742B. In at least one embodiment, memory 2744A-2744B can include various types of memory devices including DRAM or graphics random access memory, such as synchronous graphics random access memory ("SGRAM"), including graphics double data rate ("GDDR") memory.

In at least one embodiment, compute clusters 2736A-2736H each include a set of graphics cores, such as graphics core 2700 of FIG. 27A, which can include multiple types of integer and floating point logic units that can perform computational operations at a range of precisions including suited for computations associated with CUDA programs. For example, in at least one embodiment, at least a subset of floating point units in each of compute clusters 2736A-2736H can be configured to perform 16-bit or 32-bit floating point operations, while a different subset of floating point units can be configured to perform 64-bit floating point operations.

In at least one embodiment, multiple instances of GPGPU 2730 can be configured to operate as a compute cluster. Compute clusters 2736A-2736H may implement any technically feasible communication techniques for synchronization and data exchange. In at least one embodiment, multiple instances of GPGPU 2730 communicate over host interface 2732. In at least one embodiment, GPGPU 2730 includes an I/O hub 2739 that couples GPGPU 2730 with a GPU link 2740 that enables a direct connection to other instances of GPGPU 2730. In at least one embodiment, GPU link 2740 is coupled to a dedicated GPU-to-GPU bridge that enables communication and synchronization between multiple instances of GPGPU 2730. In at least one embodiment GPU link 2740 couples with a high speed interconnect to transmit and receive data to other GPGPUs 2730 or parallel processors. In at least one embodiment, multiple instances of GPGPU 2730 are located in separate data processing systems and communicate via a network device that is accessible via host interface 2732. In at least one embodiment GPU link 2740 can be configured to enable a connection to a host processor in addition to or as an alternative to host interface 2732. In at least one embodiment, GPGPU 2730 can be configured to execute a CUDA program.

In at least one embodiment, at least one component shown or described with respect to FIG. 27B is used to implement techniques and/or functions described in connection with FIGS. 1-16. In at least one embodiment, GPGPU 2730 is used to perform an API to cause a software kernel to be generated to perform an implicit matrix multiplication operation. In at least one embodiment, GPGPU 2730 is used to perform an API to cause one or more dimensions of a tensor to be modified. In at least one embodiment, GPGPU 2730 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 28A:
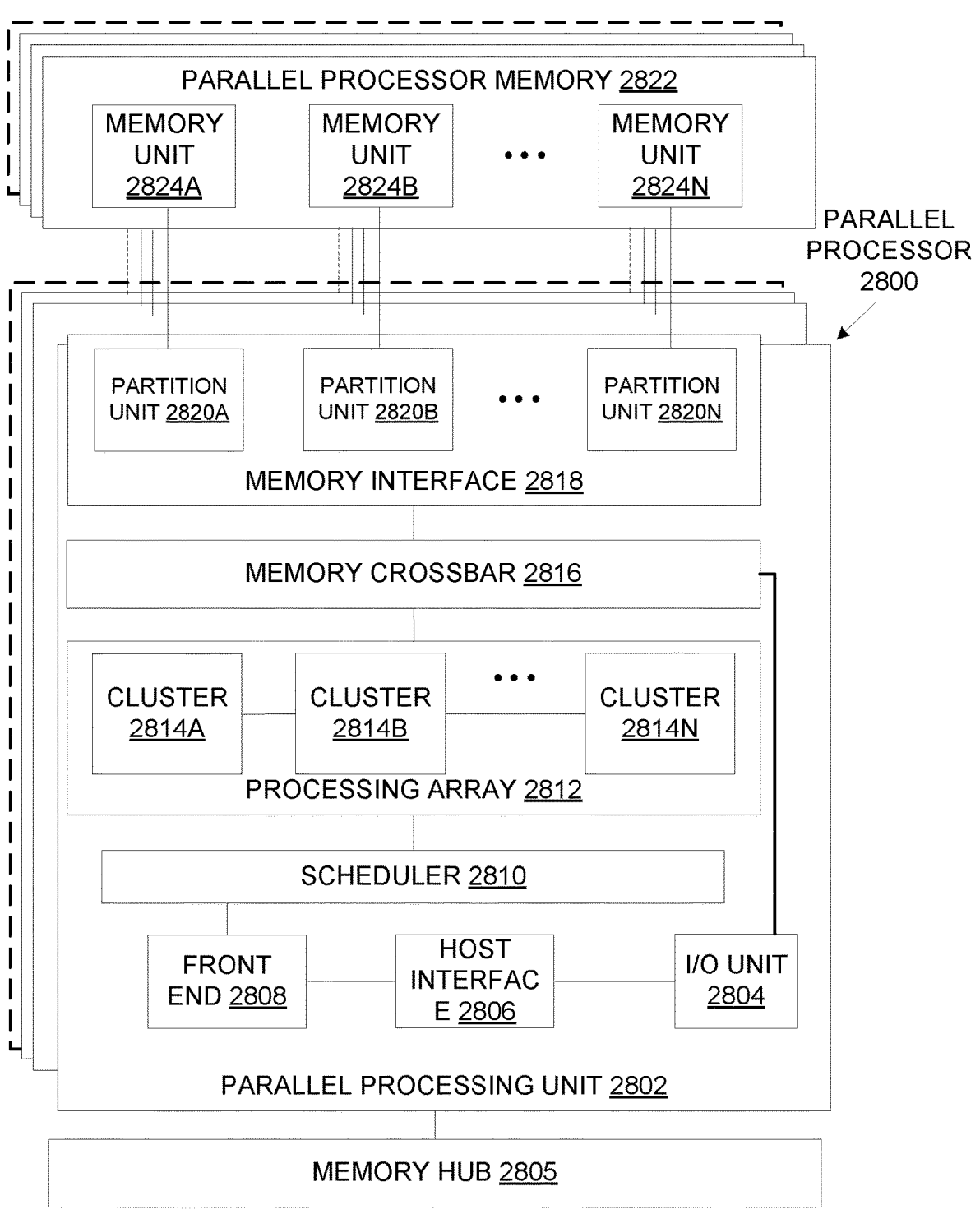
FIG. 28A illustrates a parallel processor, in accordance with at least one embodiment.

FIG. 28A illustrates a parallel processor 2800, in accordance with at least one embodiment. In at least one embodiment, various components of parallel processor 2800 may be implemented using one or more integrated circuit devices, such as programmable processors, application specific integrated circuits ("ASICs"), or FPGAs.

In at least one embodiment, parallel processor 2800 includes a parallel processing unit 2802. In at least one embodiment, parallel processing unit 2802 includes an I/O unit 2804 that enables communication with other devices, including other instances of parallel processing unit 2802. In at least one embodiment, I/O unit 2804 may be directly connected to other devices. In at least one embodiment, I/O unit 2804 connects with other devices via use of a hub or switch interface, such as memory hub 2805. In at least one embodiment, connections between memory hub 2805 and I/O unit 2804 form a communication link. In at least one embodiment, I/O unit 2804 connects with a host interface 2806 and a memory crossbar 2816, where host interface 2806 receives commands directed to performing processing operations and memory crossbar 2816 receives commands directed to performing memory operations.

In at least one embodiment, when host interface 2806 receives a command buffer via I/O unit 2804, host interface 2806 can direct work operations to perform those commands to a front end 2808. In at least one embodiment, front end 2808 couples with a scheduler 2810, which is configured to distribute commands or other work items to a processing array 2812. In at least one embodiment, scheduler 2810 ensures that processing array 2812 is properly configured and in a valid state before tasks are distributed to processing array 2812. In at least one embodiment, scheduler 2810 is implemented via firmware logic executing on a microcontroller. In at least one embodiment, microcontroller implemented scheduler 2810 is configurable to perform complex scheduling and work distribution operations at coarse and fine granularity, enabling rapid preemption and context switching of threads executing on processing array 2812. In at least one embodiment, host software can prove workloads for scheduling on processing array 2812 via one of multiple graphics processing doorbells. In at least one embodiment, workloads can then be automatically distributed across processing array 2812 by scheduler 2810 logic within a microcontroller including scheduler 2810.

In at least one embodiment, processing array 2812 can include up to "N" clusters (e.g., cluster 2814A, cluster 2814B, through cluster 2814N). In at least one embodiment, each cluster 2814A-2814N of processing array 2812 can execute a large number of concurrent threads. In at least one embodiment, scheduler 2810 can allocate work to clusters 2814A-2814N of processing array 2812 using various scheduling and/or work distribution algorithms, which may vary depending on the workload arising for each type of program or computation. In at least one embodiment, scheduling can be handled dynamically by scheduler 2810, or can be assisted in part by compiler logic during compilation of program logic configured for execution by processing array 2812. In at least one embodiment, different clusters 2814A-2814N of processing array 2812 can be allocated for processing different types of programs or for performing different types of computations.

In at least one embodiment, processing array 2812 can be configured to perform various types of parallel processing operations. In at least one embodiment, processing array 2812 is configured to perform general-purpose parallel compute operations. For example, in at least one embodiment, processing array 2812 can include logic to execute processing tasks including filtering of video and/or audio data, performing modeling operations, including physics operations, and performing data transformations.

In at least one embodiment, processing array 2812 is configured to perform parallel graphics processing operations. In at least one embodiment, processing array 2812 can include additional logic to support execution of such graphics processing operations, including, but not limited to texture sampling logic to perform texture operations, as well as tessellation logic and other vertex processing logic. In at least one embodiment, processing array 2812 can be configured to execute graphics processing related shader programs such as, but not limited to vertex shaders, tessellation shaders, geometry shaders, and pixel shaders. In at least one embodiment, parallel processing unit 2802 can transfer data from system memory via I/O unit 2804 for processing. In at least one embodiment, during processing, transferred data can be stored to on-chip memory (e.g., a parallel processor memory 2822) during processing, then written back to system memory.

In at least one embodiment, when parallel processing unit 2802 is used to perform graphics processing, scheduler 2810 can be configured to divide a processing workload into approximately equal sized tasks, to better enable distribution of graphics processing operations to multiple clusters 2814A-2814N of processing array 2812. In at least one embodiment, portions of processing array 2812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2814A-2814N may be stored in buffers to allow intermediate data to be transmitted between clusters 2814A-2814N for further processing.

In at least one embodiment, processing array 2812 can receive processing tasks to be executed via scheduler 2810, which receives commands defining processing tasks from front end 2808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2810 may be configured to fetch indices corresponding to tasks or may receive indices from front end 2808. In at least one embodiment, front end 2808 can be configured to ensure processing array 2812 is configured to a valid state before a workload specified by incoming command buffers (e.g., batch-buffers, push buffers, etc.) is initiated.

In at least one embodiment, each of one or more instances of parallel processing unit 2802 can couple with parallel processor memory 2822. In at least one embodiment, parallel processor memory 2822 can be accessed via memory crossbar 2816, which can receive memory requests from processing array 2812 as well as I/O unit 2804. In at least one embodiment, memory crossbar 2816 can access parallel processor memory 2822 via a memory interface 2818. In at least one embodiment, memory interface 2818 can include multiple partition units (e.g., a partition unit 2820A, partition unit 2820B, through partition unit 2820N) that can each couple to a portion (e.g., memory unit) of parallel processor memory 2822. In at least one embodiment, a number of partition units 2820A-2820N is configured to be equal to a number of memory units, such that a first partition unit 2820A has a corresponding first memory unit 2824A, a second partition unit 2820B has a corresponding memory unit 2824B, and an Nth partition unit 2820N has a corresponding Nth memory unit 2824N. In at least one embodiment, a number of partition units 2820A-2820N may not be equal to a number of memory devices.

In at least one embodiment, memory units 2824A-2824N can include various types of memory devices, including DRAM or graphics random access memory, such as SGRAM, including GDDR memory. In at least one embodiment, memory units 2824A-2824N may also include 3D stacked memory, including but not limited to high bandwidth memory ("HBM"). In at least one embodiment, render targets, such as frame buffers or texture maps may be stored across memory units 2824A-2824N, allowing partition units 2820A-2820N to write portions of each render target in parallel to efficiently use available bandwidth of parallel processor memory 2822. In at least one embodiment, a local instance of parallel processor memory 2822 may be excluded in favor of a unified memory design that utilizes system memory in conjunction with local cache memory.

In at least one embodiment, any one of clusters 2814A-2814N of processing array 2812 can process data that will be written to any of memory units 2824A-2824N within parallel processor memory 2822. In at least one embodiment, memory crossbar 2816 can be configured to transfer an output of each cluster 2814A-2814N to any partition unit 2820A-2820N or to another cluster 2814A-2814N, which can perform additional processing operations on an output. In at least one embodiment, each cluster 2814A-2814N can communicate with memory interface 2818 through memory crossbar 2816 to read from or write to various external memory devices. In at least one embodiment, memory crossbar 2816 has a connection to memory interface 2818 to communicate with I/O unit 2804, as well as a connection to a local instance of parallel processor memory 2822, enabling processing units within different clusters 2814A-2814N to communicate with system memory or other memory that is not local to parallel processing unit 2802. In at least one embodiment, memory crossbar 2816 can use virtual channels to separate traffic streams between clusters 2814A-2814N and partition units 2820A-2820N.

In at least one embodiment, multiple instances of parallel processing unit 2802 can be provided on a single add-in card, or multiple add-in cards can be interconnected. In at least one embodiment, different instances of parallel processing unit 2802 can be configured to inter-operate even if different instances have different numbers of processing cores, different amounts of local parallel processor memory, and/or other configuration differences. For example, in at least one embodiment, some instances of parallel processing unit 2802 can include higher precision floating point units relative to other instances. In at least one embodiment, systems incorporating one or more instances of parallel processing unit 2802 or parallel processor 2800 can be implemented in a variety of configurations and form factors, including but not limited to desktop, laptop, or handheld personal computers, servers, workstations, game consoles, and/or embedded systems.

In at least one embodiment, at least one component shown or described with respect to FIG. 28A is used to implement techniques and/or functions described in connection with FIGS. 1-16. In at least one embodiment, parallel processor 2800 is used to perform an API to cause a software kernel to be generated to perform an implicit matrix multiplication operation. In at least one embodiment, parallel processor 2800 is used to perform an API to cause one or more dimensions of a tensor to be modified. In at least one embodiment, parallel processor 2800 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 28B:
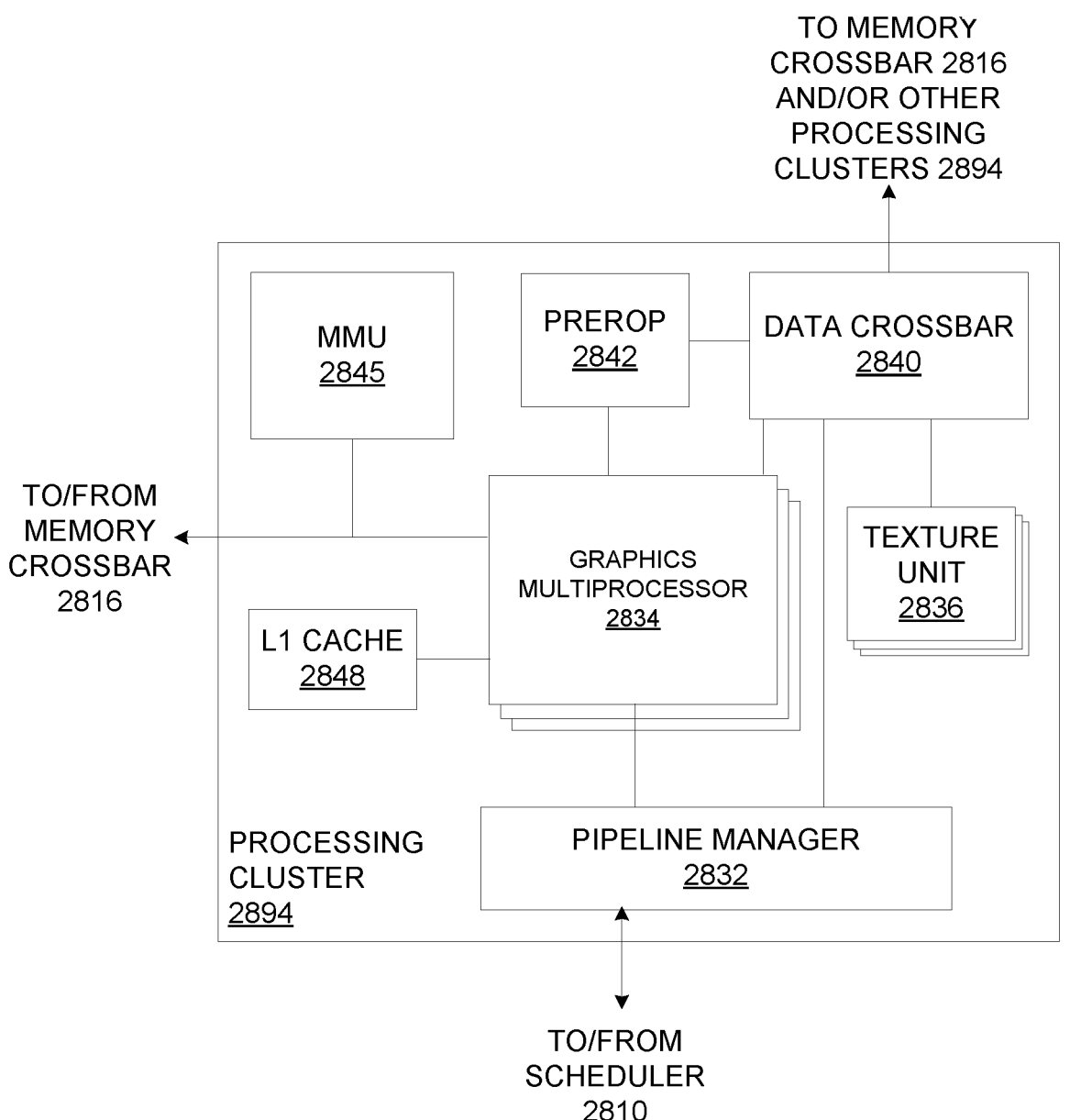
FIG. 28B illustrates a processing cluster, in accordance with at least one embodiment.

FIG. 28B illustrates a processing cluster 2894, in accordance with at least one embodiment. In at least one embodiment, processing cluster 2894 is included within a parallel processing unit. In at least one embodiment, processing cluster 2894 is one of processing clusters 2814A-2814N of FIG. 28. In at least one embodiment, processing cluster 2894 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2894.

In at least one embodiment, operation of processing cluster 2894 can be controlled via a pipeline manager 2832 that distributes processing tasks to SIMT parallel processors. In at least one embodiment, pipeline manager 2832 receives instructions from scheduler 2810 of FIG. 28 and manages execution of those instructions via a graphics multiprocessor 2834 and/or a texture unit 2836. In at least one embodiment, graphics multiprocessor 2834 is an exemplary instance of a SIMT parallel processor. However, in at least one embodiment, various types of SIMT parallel processors of differing architectures may be included within processing cluster 2894. In at least one embodiment, one or more instances of graphics multiprocessor 2834 can be included within processing cluster 2894. In at least one embodiment, graphics multiprocessor 2834 can process data and a data crossbar 2840 can be used to distribute processed data to one of multiple possible destinations, including other shader units. In at least one embodiment, pipeline manager 2832 can facilitate distribution of processed data by specifying destinations for processed data to be distributed via data crossbar 2840.

In at least one embodiment, each graphics multiprocessor 2834 within processing cluster 2894 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2894 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2834. In at least one embodiment, a thread group may include fewer threads than a number of processing engines within graphics multiprocessor 2834. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2834. In at least one embodiment, when a thread group includes more threads than the number of processing engines within graphics multiprocessor 2834, processing can be performed over consecutive clock cycles. In at least one embodiment, multiple thread groups can be executed concurrently on graphics multiprocessor 2834.

In at least one embodiment, graphics multiprocessor 2834 includes an internal cache memory to perform load and store operations. In at least one embodiment, graphics multiprocessor 2834 can forego an internal cache and use a cache memory (e.g., L1 cache 2848) within processing cluster 2894. In at least one embodiment, each graphics multiprocessor 2834 also has access to Level 2 ("L2") caches within partition units (e.g., partition units 2820A-2820N of FIG. 28A) that are shared among all processing clusters 2894 and may be used to transfer data between threads. In at least one embodiment, graphics multiprocessor 2834 may also access off-chip global memory, which can include one or more of local parallel processor memory and/or system memory. In at least one embodiment, any memory external to parallel processing unit 2802 may be used as global memory. In at least one embodiment, processing cluster 2894 includes multiple instances of graphics multiprocessor 2834 that can share common instructions and data, which may be stored in L1 cache 2848.

In at least one embodiment, each processing cluster 2894 may include an MMU 2845 that is configured to map virtual addresses into physical addresses. In at least one embodiment, one or more instances of MMU 2845 may reside within memory interface 2818 of FIG. 28. In at least one embodiment, MMU 2845 includes a set of page table entries ("PTEs") used to map a virtual address to a physical address of a tile and optionally a cache line index. In at least one embodiment, MMU 2845 may include address translation lookaside buffers ("TLBs") or caches that may reside within graphics multiprocessor 2834 or L1 cache 2848 or processing cluster 2894. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2894 may be configured such that each graphics multiprocessor 2834 is coupled to a texture unit 2836 for performing texture mapping operations, e.g., determining texture sample positions, reading texture data, and filtering texture data. In at least one embodiment, texture data is read from an internal texture L1 cache (not shown) or from an L1 cache within graphics multiprocessor 2834 and is fetched from an L2 cache, local parallel processor memory, or system memory, as needed. In at least one embodiment, each graphics multiprocessor 2834 outputs a processed task to data crossbar 2840 to provide the processed task to another processing cluster 2894 for further processing or to store the processed task in an L2 cache, a local parallel processor memory, or a system memory via memory crossbar 2816. In at least one embodiment, a pre-raster operations unit ("preROP") 2842 is configured to receive data from graphics multiprocessor 2834, direct data to ROP units, which may be located with partition units as described herein (e.g., partition units 2820A-2820N of FIG. 28). In at least one embodiment, PreROP 2842 can perform optimizations for color blending, organize pixel color data, and perform address translations.

In at least one embodiment, at least one component shown or described with respect to FIG. 28B is used to implement techniques and/or functions described in connection with FIGS. 1-16. In at least one embodiment, graphics multiprocessor 2834 is used to perform an API to cause a software kernel to be generated to perform an implicit matrix multiplication operation. In at least one embodiment, graphics multiprocessor 2834 is used to perform an API to cause one or more dimensions of a tensor to be modified. In at least one embodiment, graphics multiprocessor 2834 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 28C:
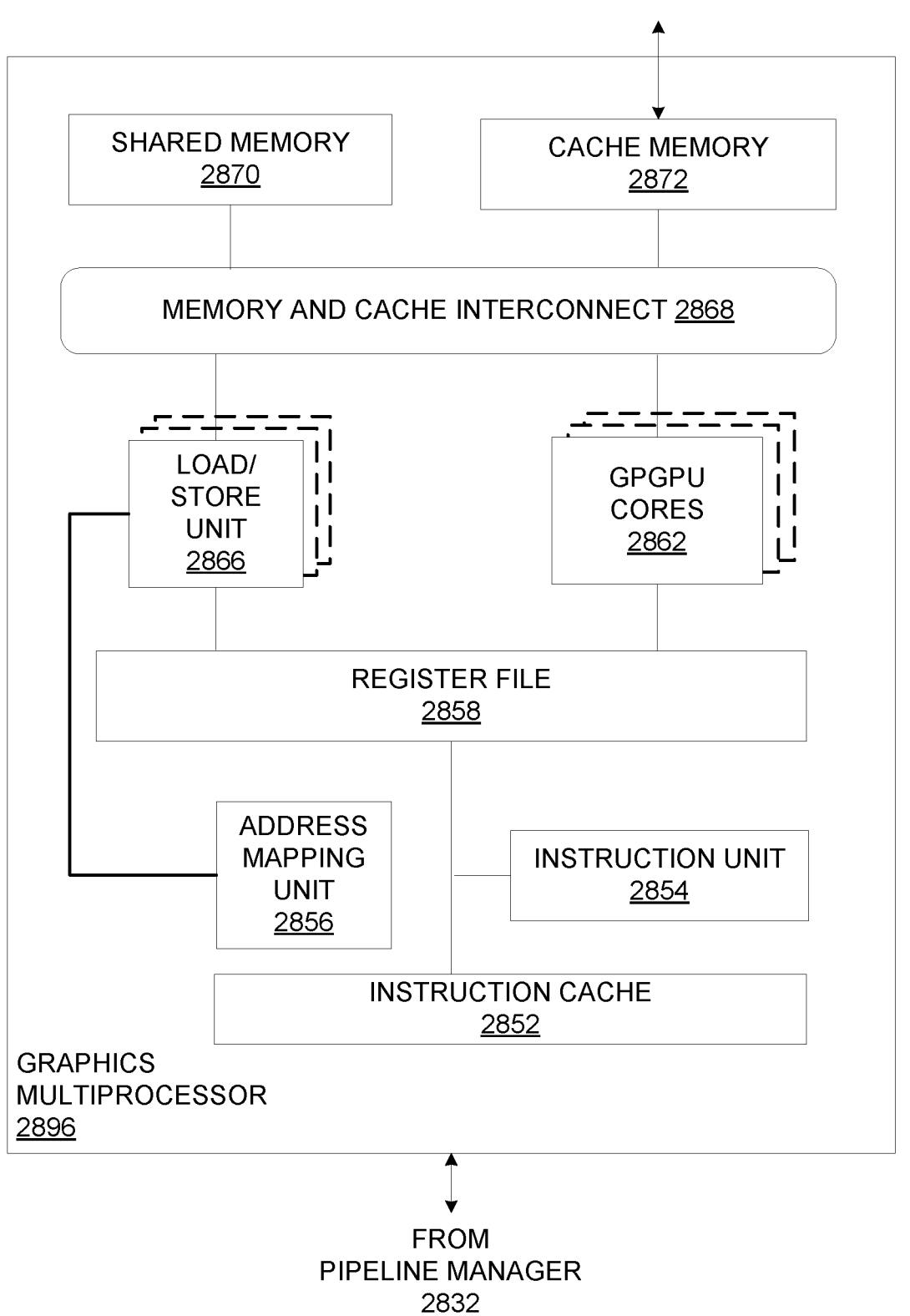
FIG. 28C illustrates a graphics multiprocessor, in accordance with at least one embodiment.

FIG. 28C illustrates a graphics multiprocessor 2896, in accordance with at least one embodiment. In at least one embodiment, graphics multiprocessor 2896 is graphics multiprocessor 2834 of FIG. 28B. In at least one embodiment, graphics multiprocessor 2896 couples with pipeline manager 2832 of processing cluster 2894. In at least one embodiment, graphics multiprocessor 2896 has an execution pipeline including but not limited to an instruction cache 2852, an instruction unit 2854, an address mapping unit 2856, a register file 2858, one or more GPGPU cores 2862, and one or more LSUs 2866. GPGPU cores 2862 and LSUs 2866 are coupled with cache memory 2872 and shared memory 2870 via a memory and cache interconnect 2868.

In at least one embodiment, instruction cache 2852 receives a stream of instructions to execute from pipeline manager 2832. In at least one embodiment, instructions are cached in instruction cache 2852 and dispatched for execution by instruction unit 2854. In at least one embodiment, instruction unit 2854 can dispatch instructions as thread groups (e.g., warps), with each thread of a thread group assigned to a different execution unit within GPGPU core 2862. In at least one embodiment, an instruction can access any of a local, shared, or global address space by specifying an address within a unified address space. In at least one embodiment, address mapping unit 2856 can be used to translate addresses in a unified address space into a distinct memory address that can be accessed by LSUs 2866.

In at least one embodiment, register file 2858 provides a set of registers for functional units of graphics multiprocessor 2896. In at least one embodiment, register file 2858 provides temporary storage for operands connected to data paths of functional units (e.g., GPGPU cores 2862, LSUs 2866) of graphics multiprocessor 2896. In at least one embodiment, register file 2858 is divided between each of functional units such that each functional unit is allocated a dedicated portion of register file 2858. In at least one embodiment, register file 2858 is divided between different thread groups being executed by graphics multiprocessor 2896.

In at least one embodiment, GPGPU cores 2862 can each include FPUs and/or integer ALUs that are used to execute instructions of graphics multiprocessor 2896. GPGPU cores 2862 can be similar in architecture or can differ in architecture. In at least one embodiment, a first portion of GPGPU cores 2862 include a single precision FPU and an integer ALU while a second portion of GPGPU cores 2862 include a double precision FPU. In at least one embodiment, FPUs can implement IEEE 754-2008 standard for floating point arithmetic or enable variable precision floating point arithmetic. In at least one embodiment, graphics multiprocessor 2896 can additionally include one or more fixed function or special function units to perform specific functions such as copy rectangle or pixel blending operations. In at least one embodiment one or more of GPGPU cores 2862 can also include fixed or special function logic.

In at least one embodiment, GPGPU cores 2862 include SIMD logic capable of performing a single instruction on multiple sets of data. In at least one embodiment GPGPU cores 2862 can physically execute SIMD4, SIMD8, and SIMD16 instructions and logically execute SIMD1, SIMD2, and SIMD32 instructions. In at least one embodiment, SIMD instructions for GPGPU cores 2862 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2868 is an interconnect network that connects each functional unit of graphics multiprocessor 2896 to register file 2858 and to shared memory 2870. In at least one embodiment, memory and cache interconnect 2868 is a crossbar interconnect that allows LSU 2866 to implement load and store operations between shared memory 2870 and register file 2858. In at least one embodiment, register file 2858 can operate at a same frequency as GPGPU cores 2862, thus data transfer between GPGPU cores 2862 and register file 2858 is very low latency. In at least one embodiment, shared memory 2870 can be used to enable communication between threads that execute on functional units within graphics multiprocessor 2896. In at least one embodiment, cache memory 2872 can be used as a data cache for example, to cache texture data communicated between functional units and texture unit 2836. In at least one embodiment, shared memory 2870 can also be used as a program managed cached. In at least one embodiment, threads executing on GPGPU cores 2862 can programmatically store data within shared memory in addition to automatically cached data that is stored within cache memory 2872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

In at least one embodiment, at least one component shown or described with respect to FIG. 28C is used to implement techniques and/or functions described in connection with FIGS. 1-16. In at least one embodiment, graphics multiprocessor 2896 is used to perform an API to cause a software kernel to be generated to perform an implicit matrix multiplication operation. In at least one embodiment, graphics multiprocessor 2896 is used to perform an API to cause one or more dimensions of a tensor to be modified. In at least one embodiment, graphics multiprocessor 2896 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 29:
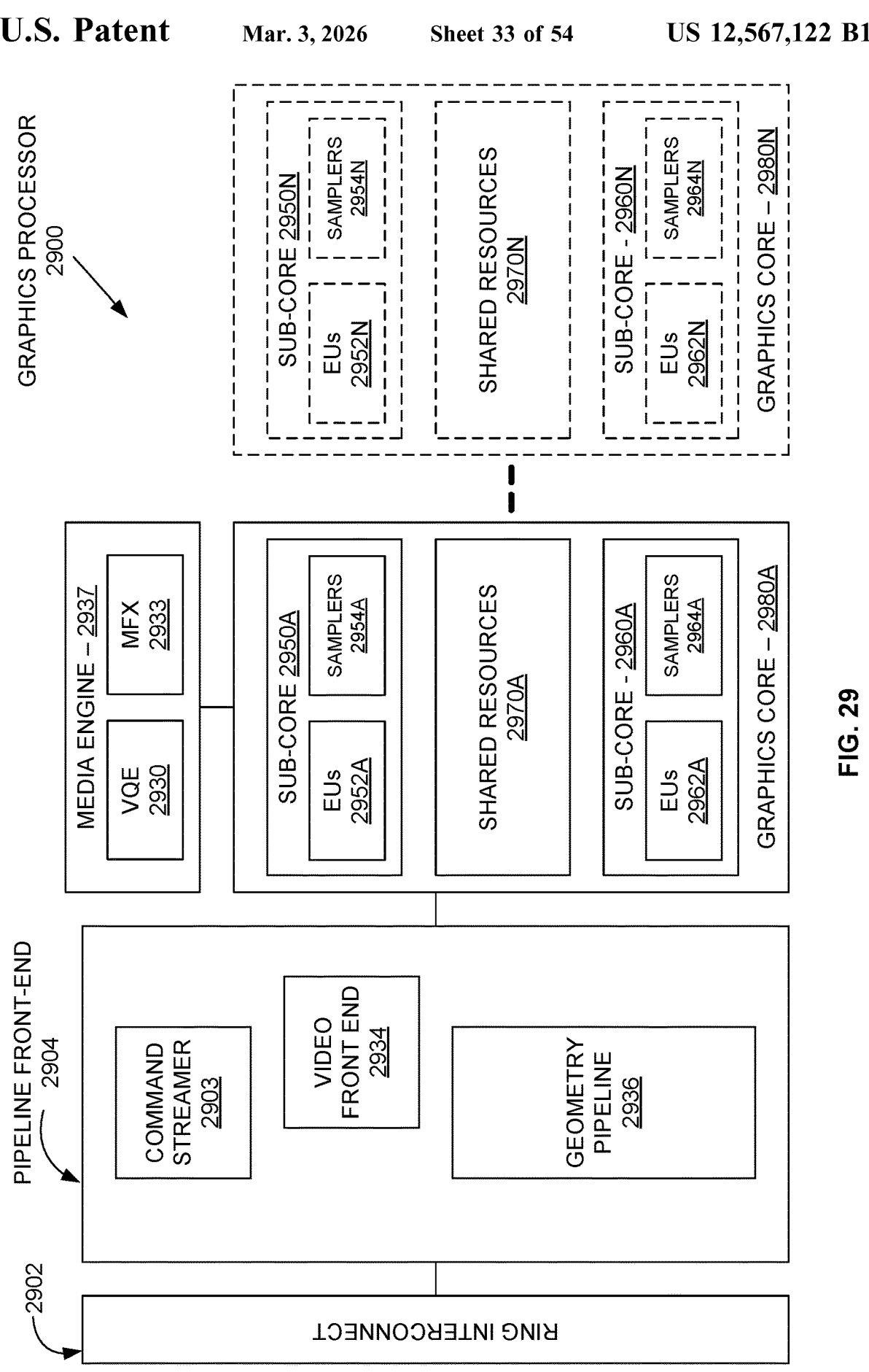
FIG. 29 illustrates a graphics processor, in accordance with at least one embodiment.

FIG. 29 illustrates a graphics processor 2900, in accordance with at least one embodiment. In at least one embodiment, graphics processor 2900 includes a ring interconnect 2902, a pipeline front-end 2904, a media engine 2937, and graphics cores 2980A-2980N. In at least one embodiment, ring interconnect 2902 couples graphics processor 2900 to other processing units, including other graphics processors or one or more general-purpose processor cores. In at least one embodiment, graphics processor 2900 is one of many processors integrated within a multi-core processing system.

In at least one embodiment, graphics processor 2900 receives batches of commands via ring interconnect 2902. In at least one embodiment, incoming commands are interpreted by a command streamer 2903 in pipeline front-end 2904. In at least one embodiment, graphics processor 2900 includes scalable execution logic to perform 3D geometry processing and media processing via graphics core(s) 2980A-2980N. In at least one embodiment, for 3D geometry processing commands, command streamer 2903 supplies commands to geometry pipeline 2936. In at least one embodiment, for at least some media processing commands, command streamer 2903 supplies commands to a video front end 2934, which couples with a media engine 2937. In at least one embodiment, media engine 2937 includes a Video Quality Engine ("VQE") 2930 for video and image post-processing and a multi-format encode/decode ("MFX") engine 2933 to provide hardware-accelerated media data encode and decode. In at least one embodiment, geometry pipeline 2936 and media engine 2937 each generate execution threads for thread execution resources provided by at least one graphics core 2980A.

In at least one embodiment, graphics processor 2900 includes scalable thread execution resources featuring modular graphics cores 2980A-2980N (sometimes referred to as core slices), each having multiple sub-cores 2950A-550N, 2960A-2960N (sometimes referred to as core sub-slices). In at least one embodiment, graphics processor 2900 can have any number of graphics cores 2980A through 2980N. In at least one embodiment, graphics processor 2900 includes a graphics core 2980A having at least a first sub-core 2950A and a second sub-core 2960A. In at least one embodiment, graphics processor 2900 is a low power processor with a single sub-core (e.g., sub-core 2950A). In at least one embodiment, graphics processor 2900 includes multiple graphics cores 2980A-2980N, each including a set of first sub-cores 2950A-2950N and a set of second sub-cores 2960A-2960N. In at least one embodiment, each sub-core in first sub-cores 2950A-2950N includes at least a first set of execution units ("EUs") 2952A-2952N and media/texture samplers 2954A-2954N. In at least one embodiment, each sub-core in second sub-cores 2960A-2960N includes at least a second set of execution units 2962A-2962N and samplers 2964A-2964N. In at least one embodiment, each sub-core 2950A-2950N, 2960A-2960N shares a set of shared resources 2970A-2970N. In at least one embodiment, shared resources 2970 include shared cache memory and pixel operation logic.

In at least one embodiment, at least one component shown or described with respect to FIG. 29 is used to implement techniques and/or functions described in connection with FIGS. 1-16. In at least one embodiment, graphics processor 2900 is used to perform an API to cause a software kernel to be generated to perform an implicit matrix multiplication operation. In at least one embodiment, graphics processor 2900 is used to perform an API to cause one or more dimensions of a tensor to be modified. In at least one embodiment, graphics processor 2900 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 30:
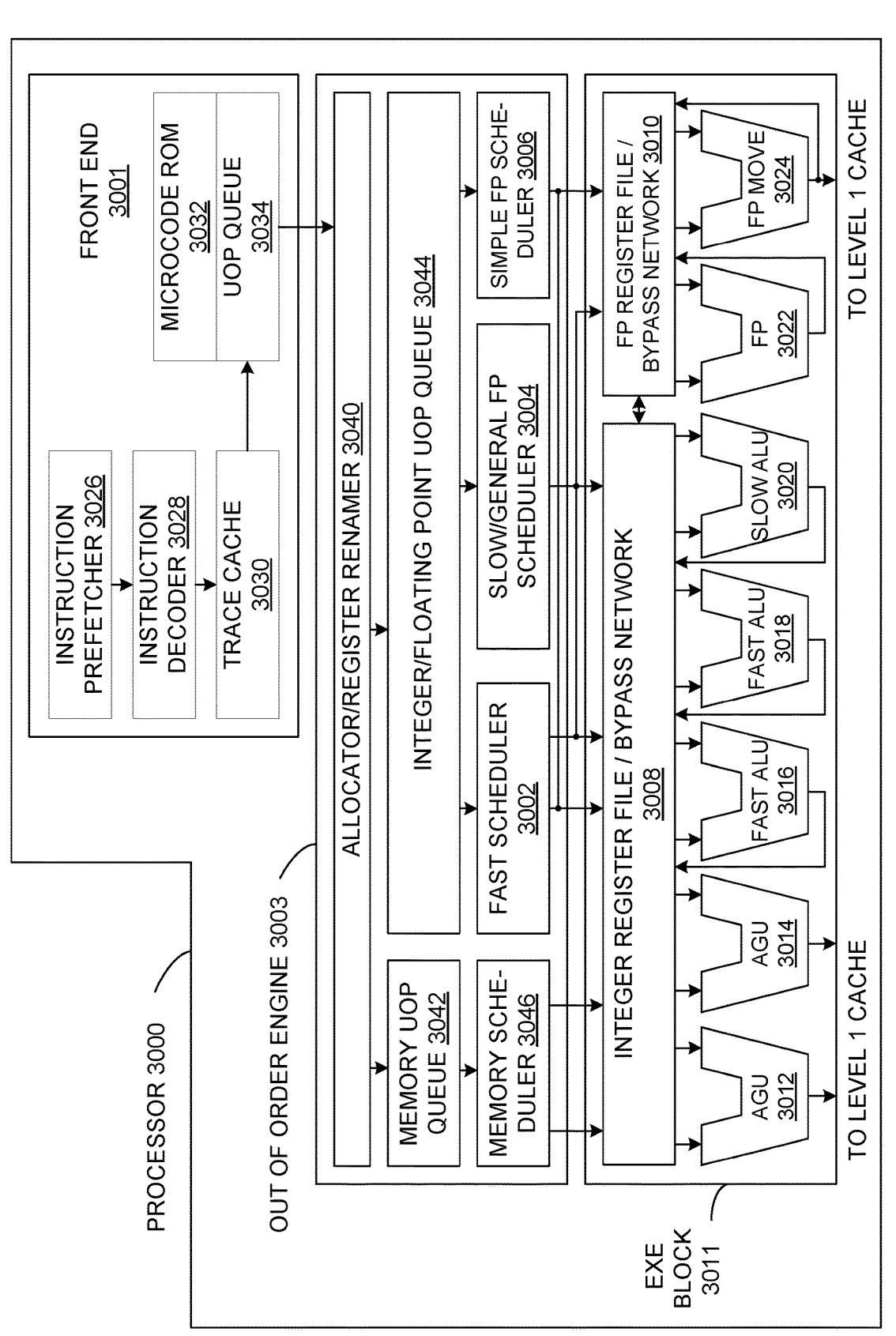
FIG. 30 illustrates a processor, in accordance with at least one embodiment.

FIG. 30 illustrates a processor 3000, in accordance with at least one embodiment. In at least one embodiment, processor 3000 may include, without limitation, logic circuits to perform instructions. In at least one embodiment, processor 3000 may perform instructions, including x86 instructions, ARM instructions, specialized instructions for ASICs, etc. In at least one embodiment, processor 3010 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3010 may perform instructions to accelerate CUDA programs.

In at least one embodiment, processor 3000 includes an in-order front end ("front end") 3001 to fetch instructions to be executed and prepare instructions to be used later in processor pipeline. In at least one embodiment, front end 3001 may include several units. In at least one embodiment, an instruction prefetcher 3026 fetches instructions from memory and feeds instructions to an instruction decoder 3028 which in turn decodes or interprets instructions. For example, in at least one embodiment, instruction decoder 3028 decodes a received instruction into one or more operations called "micro-instructions" or "micro-operations" (also called "micro ops" or "uops") for execution. In at least one embodiment, instruction decoder 3028 parses instruction into an opcode and corresponding data and control fields that may be used by micro-architecture to perform operations. In at least one embodiment, a trace cache 3030 may assemble decoded uops into program ordered sequences or traces in a uop queue 3034 for execution. In at least one embodiment, when trace cache 3030 encounters a complex instruction, a microcode ROM 3032 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 3028 may access microcode ROM 3032 to perform instruction. In at least one embodiment, an instruction may be decoded into a small number of micro-ops for processing at instruction decoder 3028. In at least one embodiment, an instruction may be stored within microcode ROM 3032 should a number of micro-ops be needed to accomplish operation. In at least one embodiment, trace cache 3030 refers to an entry point programmable logic array ("PLA") to determine a correct micro-instruction pointer for reading microcode sequences to complete one or more instructions from microcode ROM 3032. In at least one embodiment, after microcode ROM 3032 finishes sequencing micro-ops for an instruction, front end 3001 of machine may resume fetching micro-ops from trace cache 3030.

In at least one embodiment, out-of-order execution engine ("out of order engine") 3003 may prepare instructions for execution. In at least one embodiment, out-of-order execution logic has a number of buffers to smooth out and re-order the flow of instructions to optimize performance as they go down a pipeline and get scheduled for execution. Out-of-order execution engine 3003 includes, without limitation, an allocator/register renamer 3040, a memory uop queue 3042, an integer/floating point uop queue 3044, a memory scheduler 3046, a fast scheduler 3002, a slow/general floating point scheduler ("slow/general FP scheduler") 3004, and a simple floating point scheduler ("simple FP scheduler") 3006. In at least one embodiment, fast schedule 3002, slow/general floating point scheduler 3004, and simple floating point scheduler 3006 are also collectively referred to herein as "uop schedulers 3002, 3004, 3006." Allocator/register renamer 3040 allocates machine buffers and resources that each uop needs in order to execute. In at least one embodiment, allocator/register renamer 3040 renames logic registers onto entries in a register file. In at least one embodiment, allocator/register renamer 3040 also allocates an entry for each uop in one of two uop queues, memory uop queue 3042 for memory operations and integer/floating point uop queue 3044 for non-memory operations, in front of memory scheduler 3046 and uop schedulers 3002, 3004, 3006. In at least one embodiment, uop schedulers 3002, 3004, 3006, determine when a uop is ready to execute based on readiness of their dependent input register operand sources and availability of execution resources uops need to complete their operation. In at least one embodiment, fast scheduler 3002 of at least one embodiment may schedule on each half of main clock cycle while slow/general floating point scheduler 3004 and simple floating point scheduler 3006 may schedule once per main processor clock cycle. In at least one embodiment, uop schedulers 3002, 3004, 3006 arbitrate for dispatch ports to schedule uops for execution.

In at least one embodiment, execution block 3011 includes, without limitation, an integer register file/bypass network 3008, a floating point register file/bypass network ("FP register file/bypass network") 3010, address generation units ("AGUs") 3012 and 3014, fast ALUs 3016 and 3018, a slow ALU 3020, a floating point ALU ("FP") 3022, and a floating point move unit ("FP move") 3024. In at least one embodiment, integer register file/bypass network 3008 and floating point register file/bypass network 3010 are also referred to herein as "register files 3008, 3010." In at least one embodiment, AGUSs 3012 and 3014, fast ALUs 3016 and 3018, slow ALU 3020, floating point ALU 3022, and floating point move unit 3024 are also referred to herein as "execution units 3012, 3014, 3016, 3018, 3020, 3022, and 3024." In at least one embodiment, an execution block may include, without limitation, any number (including zero) and type of register files, bypass networks, address generation units, and execution units, in any combination.

In at least one embodiment, register files 3008, 3010 may be arranged between uop schedulers 3002, 3004, 3006, and execution units 3012, 3014, 3016, 3018, 3020, 3022, and 3024. In at least one embodiment, integer register file/bypass network 3008 performs integer operations. In at least one embodiment, floating point register file/bypass network 3010 performs floating point operations. In at least one embodiment, each of register files 3008, 3010 may include, without limitation, a bypass network that may bypass or forward just completed results that have not yet been written into register file to new dependent uops. In at least one embodiment, register files 3008, 3010 may communicate data with each other. In at least one embodiment, integer register file/bypass network 3008 may include, without limitation, two separate register files, one register file for low-order thirty-two bits of data and a second register file for high order thirty-two bits of data. In at least one embodiment, floating point register file/bypass network 3010 may include, without limitation, 128-bit wide entries because floating point instructions typically have operands from 64 to 128 bits in width.

In at least one embodiment, execution units 3012, 3014, 3016, 3018, 3020, 3022, 3024 may execute instructions. In at least one embodiment, register files 3008, 3010 store integer and floating point data operand values that micro-instructions need to execute. In at least one embodiment, processor 3000 may include, without limitation, any number and combination of execution units 3012, 3014, 3016, 3018, 3020, 3022, 3024. In at least one embodiment, floating point ALU 3022 and floating point move unit 3024 may execute floating point, MMX, SIMD, AVX and SSE, or other operations. In at least one embodiment, floating point ALU 3022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3016, 3018. In at least one embodiment, fast ALUS 3016, 3018 may execute fast operations with an effective latency of half a clock cycle. In at least one embodiment, most complex integer operations go to slow ALU 3020 as slow ALU 3020 may include, without limitation, integer execution hardware for long-latency type of operations, such as a multiplier, shifts, flag logic, and branch processing. In at least one embodiment, memory load/store operations may be executed by AGUs 3012, 3014. In at least one embodiment, fast ALU 3016, fast ALU 3018, and slow ALU 3020 may perform integer operations on 64-bit data operands. In at least one embodiment, fast ALU 3016, fast ALU 3018, and slow ALU 3020 may be implemented to support a variety of data bit sizes including sixteen, thirty-two, 128, 256, etc. In at least one embodiment, floating point ALU 3022 and floating point move unit 3024 may be implemented to support a range of operands having bits of various widths. In at least one embodiment, floating point ALU 3022 and floating point move unit 3024 may operate on 128-bit wide packed data operands in conjunction with SIMD and multimedia instructions.

In at least one embodiment, uop schedulers 3002, 3004, 3006 dispatch dependent operations before parent load has finished executing. In at least one embodiment, as uops may be speculatively scheduled and executed in processor 3000, processor 3000 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, at least one component shown or described with respect to FIG. 30 is used to implement techniques and/or functions described in connection with FIGS. 1-16. In at least one embodiment, processor 3000 is used to perform an API to cause a software kernel to be generated to perform an implicit matrix multiplication operation. In at least one embodiment, processor 3000 is used to perform an API to cause one or more dimensions of a tensor to be modified. In at least one embodiment, processor 3000 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 31:
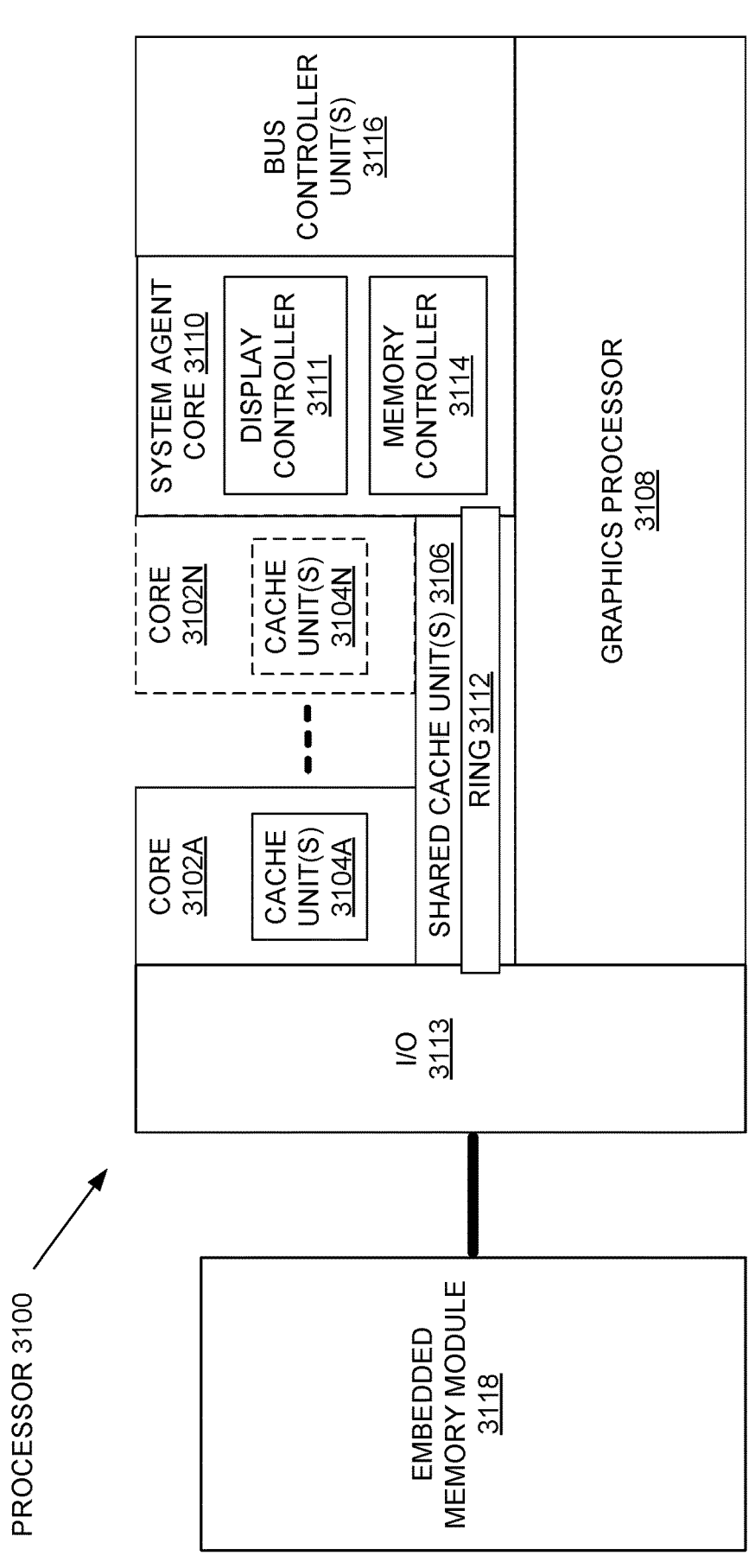
FIG. 31 illustrates a processor, in accordance with at least one embodiment.

FIG. 31 illustrates a processor 3100, in accordance with at least one embodiment. In at least one embodiment, processor 3100 includes, without limitation, one or more processor cores ("cores") 3102A-3102N, an integrated memory controller 3114, and an integrated graphics processor 3108. In at least one embodiment, processor 3100 can include additional cores up to and including additional processor core 3102N represented by dashed lined boxes. In at least one embodiment, each of processor cores 3102A-3102N includes one or more internal cache units 3104A-3104N. In at least one embodiment, each processor core also has access to one or more shared cached units 3106.

In at least one embodiment, internal cache units 3104A-3104N and shared cache units 3106 represent a cache memory hierarchy within processor 3100. In at least one embodiment, cache memory units 3104A-3104N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 3106 and 3104A-3104N.

In at least one embodiment, processor 3100 may also include a set of one or more bus controller units 3116 and a system agent core 3110. In at least one embodiment, one or more bus controller units 3116 manage a set of peripheral buses, such as one or more PCI or PCI express buses. In at least one embodiment, system agent core 3110 provides management functionality for various processor components. In at least one embodiment, system agent core 3110 includes one or more integrated memory controllers 3114 to manage access to various external memory devices (not shown).

In at least one embodiment, one or more of processor cores 3102A-3102N include support for simultaneous multi-threading. In at least one embodiment, system agent core 3110 includes components for coordinating and operating processor cores 3102A-3102N during multi-threaded processing. In at least one embodiment, system agent core 3110 may additionally include a power control unit ("PCU"), which includes logic and components to regulate one or more power states of processor cores 3102A-3102N and graphics processor 3108.

In at least one embodiment, processor 3100 additionally includes graphics processor 3108 to execute graphics processing operations. In at least one embodiment, graphics processor 3108 couples with shared cache units 3106, and system agent core 3110, including one or more integrated memory controllers 3114. In at least one embodiment, system agent core 3110 also includes a display controller 3111 to drive graphics processor output to one or more coupled displays. In at least one embodiment, display controller 3111 may also be a separate module coupled with graphics processor 3108 via at least one interconnect, or may be integrated within graphics processor 3108.

In at least one embodiment, a ring based interconnect unit 3112 is used to couple internal components of processor 3100. In at least one embodiment, an alternative interconnect unit may be used, such as a point-to-point interconnect, a switched interconnect, or other techniques. In at least one embodiment, graphics processor 3108 couples with ring interconnect 3112 via an I/O link 3113.

In at least one embodiment, I/O link 3113 represents at least one of multiple varieties of I/O interconnects, including an on package I/O interconnect which facilitates communication between various processor components and a high-performance embedded memory module 3118, such as an eDRAM module. In at least one embodiment, each of processor cores 3102A-3102N and graphics processor 3108 use embedded memory modules 3118 as a shared LLC.

In at least one embodiment, processor cores 3102A-3102N are homogeneous cores executing a common instruction set architecture. In at least one embodiment, processor cores 3102A-3102N are heterogeneous in terms of ISA, where one or more of processor cores 3102A-3102N execute a common instruction set, while one or more other cores of processor cores 3102A-31-02N executes a subset of a common instruction set or a different instruction set. In at least one embodiment, processor cores 3102A-3102N are heterogeneous in terms of microarchitecture, where one or more cores having a relatively higher power consumption couple with one or more cores having a lower power consumption. In at least one embodiment, processor 3100 can be implemented on one or more chips or as an SoC integrated circuit.

In at least one embodiment, at least one component shown or described with respect to FIG. 31 is used to implement techniques and/or functions described in connection with FIGS. 1-16. In at least one embodiment, at least one of processor 3100 or graphics processor 3108 is used to perform an API to cause a software kernel to be generated to perform an implicit matrix multiplication operation. In at least one embodiment, at least one of processor 3100 or graphics processor 3108 is used to perform an API to cause one or more dimensions of a tensor to be modified. In at least one embodiment, at least one of processor 3100 or graphics processor 3108 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 32:
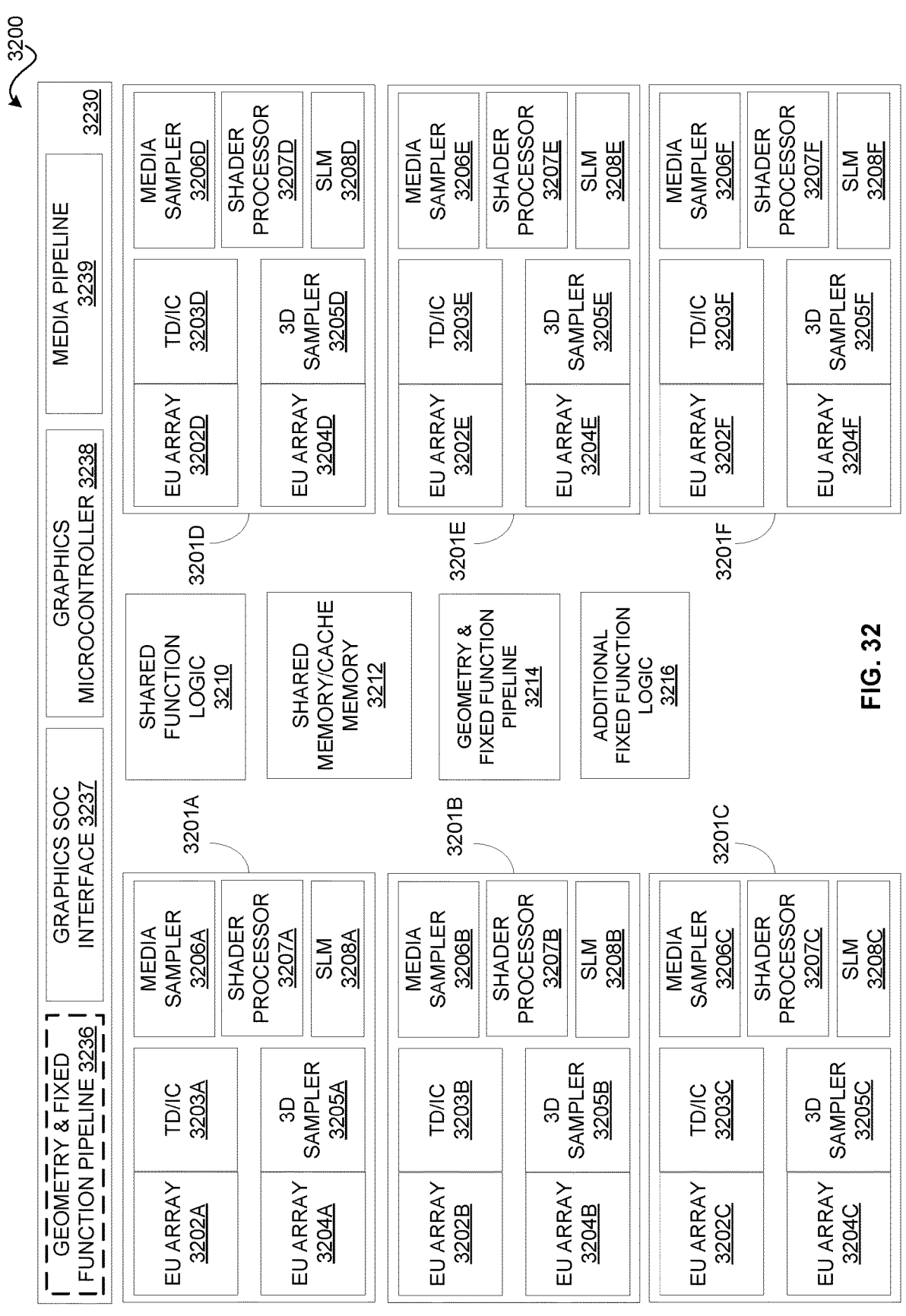
FIG. 32 illustrates a graphics processor core, in accordance with at least one embodiment.

FIG. 32 illustrates a graphics processor core 3200, in accordance with at least one embodiment described. In at least one embodiment, graphics processor core 3200 is included within a graphics core array. In at least one embodiment, graphics processor core 3200, sometimes referred to as a core slice, can be one or multiple graphics cores within a modular graphics processor. In at least one embodiment, graphics processor core 3200 is exemplary of one graphics core slice, and a graphics processor as described herein may include multiple graphics core slices based on target power and performance envelopes. In at least one embodiment, each graphics core 3200 can include a fixed function block 3230 coupled with multiple sub-cores 3201A-3201F, also referred to as sub-slices, that include modular blocks of general-purpose and fixed function logic.

In at least one embodiment, fixed function block 3230 includes a geometry/fixed function pipeline 3236 that can be shared by all sub-cores in graphics processor 3200, for example, in lower performance and/or lower power graphics processor implementations. In at least one embodiment, geometry/fixed function pipeline 3236 includes a 3D fixed function pipeline, a video front-end unit, a thread spawner and thread dispatcher, and a unified return buffer manager, which manages unified return buffers.

In at least one embodiment, fixed function block 3230 also includes a graphics SoC interface 3237, a graphics microcontroller 3238, and a media pipeline 3239. Graphics SoC interface 3237 provides an interface between graphics core 3200 and other processor cores within an SoC integrated circuit. In at least one embodiment, graphics microcontroller 3238 is a programmable sub-processor that is configurable to manage various functions of graphics processor 3200, including thread dispatch, scheduling, and pre-emption. In at least one embodiment, media pipeline 3239 includes logic to facilitate decoding, encoding, pre-processing, and/or post-processing of multimedia data, including image and video data. In at least one embodiment, media pipeline 3239 implements media operations via requests to compute or sampling logic within sub-cores 3201-3201F.

In at least one embodiment, SoC interface 3237 enables graphics core 3200 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 3237 can also enable communication with fixed function devices within an SoC, such as camera imaging pipelines, and enables use of and/or implements global memory atomics that may be shared between graphics core 3200 and CPUs within an SoC. In at least one embodiment, SoC interface 3237 can also implement power management controls for graphics core 3200 and enable an interface between a clock domain of graphic core 3200 and other clock domains within an SoC. In at least one embodiment, SoC interface 3237 enables receipt of command buffers from a command streamer and global thread dispatcher that are configured to provide commands and instructions to each of one or more graphics cores within a graphics processor. In at least one embodiment, commands and instructions can be dispatched to media pipeline 3239, when media operations are to be performed, or a geometry and fixed function pipeline (e.g., geometry and fixed function pipeline 3236, geometry and fixed function pipeline 3214) when graphics processing operations are to be performed.

In at least one embodiment, graphics microcontroller 3238 can be configured to perform various scheduling and management tasks for graphics core 3200. In at least one embodiment, graphics microcontroller 3238 can perform graphics and/or compute workload scheduling on various graphics parallel engines within execution unit (EU) arrays 3202A-3202F, 3204A-3204F within sub-cores 3201A-3201F. In at least one embodiment, host software executing on a CPU core of an SoC including graphics core 3200 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3238 can also facilitate low-power or idle states for graphics core 3200, providing graphics core 3200 with an ability to save and restore registers within graphics core 3200 across low-power state transitions independently from an operating system and/or graphics driver software on a system.

In at least one embodiment, graphics core 3200 may have greater than or fewer than illustrated sub-cores 3201A-3201F, up to N modular sub-cores. For each set of N sub-cores, in at least one embodiment, graphics core 3200 can also include shared function logic 3210, shared and/or cache memory 3212, a geometry/fixed function pipeline 3214, as well as additional fixed function logic 3216 to accelerate various graphics and compute processing operations. In at least one embodiment, shared function logic 3210 can include logic units (e.g., sampler, math, and/or inter-thread communication logic) that can be shared by each N sub-cores within graphics core 3200. Shared and/or cache memory 3212 can be an LLC for N sub-cores 3201A-3201F within graphics core 3200 and can also serve as shared memory that is accessible by multiple sub-cores. In at least one embodiment, geometry/fixed function pipeline 3214 can be included instead of geometry/fixed function pipeline 3236 within fixed function block 3230 and can include same or similar logic units.

In at least one embodiment, graphics core 3200 includes additional fixed function logic 3216 that can include various fixed function acceleration logic for use by graphics core 3200. In at least one embodiment, additional fixed function logic 3216 includes an additional geometry pipeline for use in position only shading. In position-only shading, at least two geometry pipelines exist, whereas in a full geometry pipeline within geometry/fixed function pipeline 3216, 3236, and a cull pipeline, which is an additional geometry pipeline which may be included within additional fixed function logic 3216. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3216 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3216 can also include general purpose processing acceleration logic, such as fixed function matrix multiplication logic, for accelerating CUDA programs.

In at least one embodiment, each graphics sub-core 3201A-3201F includes a set of execution resources that may be used to perform graphics, media, and compute operations in response to requests by graphics pipeline, media pipeline, or shader programs. In at least one embodiment, graphics sub-cores 3201A-3201F include multiple EU arrays 3202A-3202F, 3204A-3204F, thread dispatch and inter-thread communication ("TD/IC") logic 3203A-3203F, a 3D (e.g., texture) sampler 3205A-3205F, a media sampler 3206A-3206F, a shader processor 3207A-3207F, and shared local memory ("SLM") 3208A-3208F. EU arrays 3202A-3202F, 3204A-3204F each include multiple execution units, which are GPGPUs capable of performing floating-point and integer/fixed-point logic operations in service of a graphics, media, or compute operation, including graphics, media, or compute shader programs. In at least one embodiment, TD/IC logic 3203A-3203F performs local thread dispatch and thread control operations for execution units within a sub-core and facilitate communication between threads executing on execution units of a sub-core. In at least one embodiment, 3D sampler 3205A-3205F can read texture or other 3D graphics related data into memory. In at least one embodiment, 3D sampler can read texture data differently based on a configured sample state and texture format associated with a given texture. In at least one embodiment, media sampler 3206A-3206F can perform similar read operations based on a type and format associated with media data. In at least one embodiment, each graphics sub-core 3201A-3201F can alternately include a unified 3D and media sampler. In at least one embodiment, threads executing on execution units within each of sub-cores 3201A-3201F can make use of shared local memory 3208A-3208F within each sub-core, to enable threads executing within a thread group to execute using a common pool of on-chip memory.

In at least one embodiment, at least one component shown or described with respect to FIG. 32 is used to implement techniques and/or functions described in connection with FIGS. 1-16. In at least one embodiment, graphics processor core 3200 is used to perform an API to cause a software kernel to be generated to perform an implicit matrix multiplication operation. In at least one embodiment, graphics processor core 3200 is used to perform an API to cause one or more dimensions of a tensor to be modified. In at least one embodiment, graphics processor core 3200 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 33:
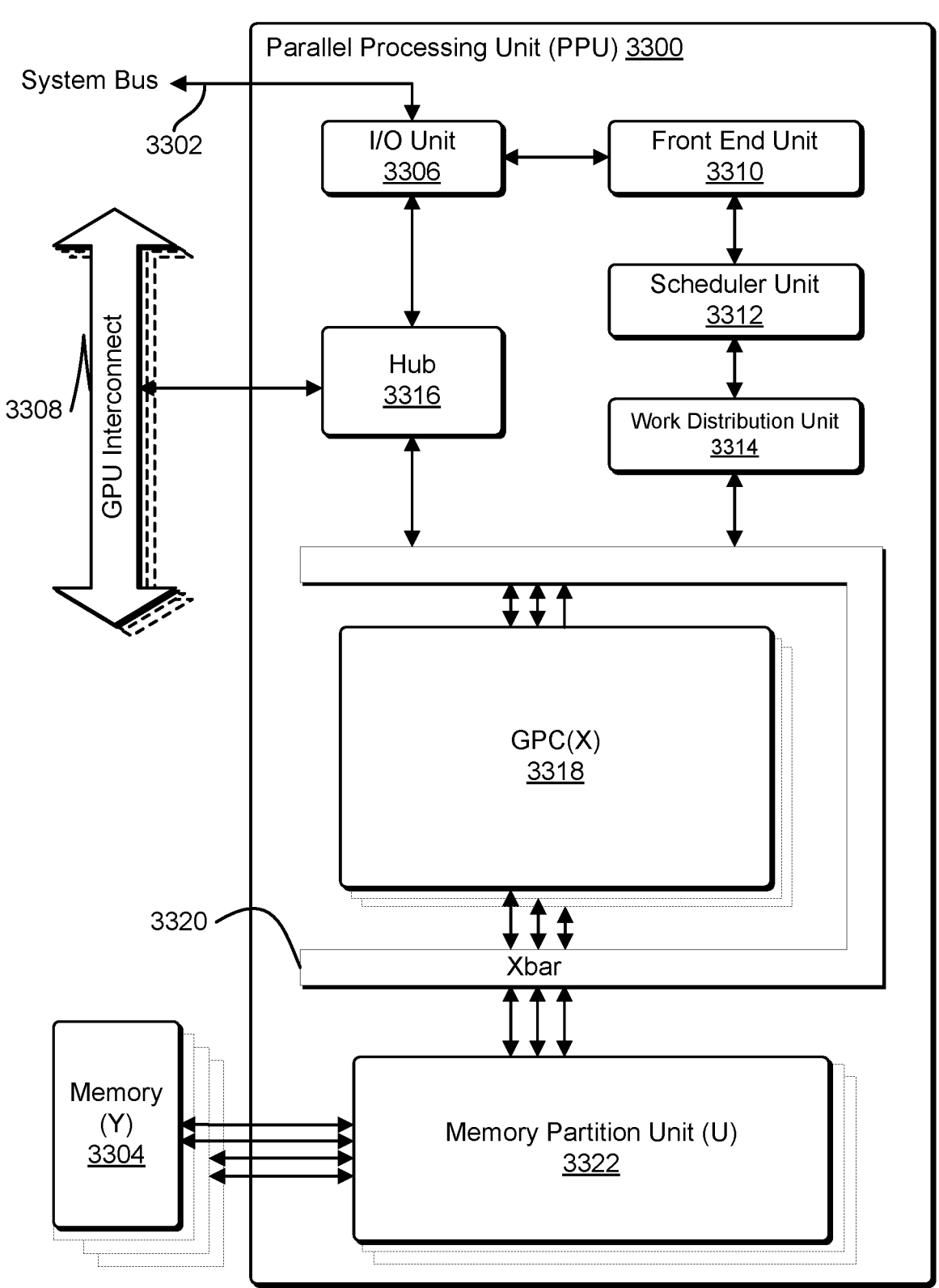
FIG. 33 illustrates a PPU, in accordance with at least one embodiment.

FIG. 33 illustrates a parallel processing unit ("PPU") 3300, in accordance with at least one embodiment. In at least one embodiment, PPU 3300 is configured with machine-readable code that, if executed by PPU 3300, causes PPU 3300 to perform some or all of processes and techniques described herein. In at least one embodiment, PPU 3300 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3300. In at least one embodiment, PPU 3300 is a GPU configured to implement a graphics rendering pipeline for processing three-dimensional ("3D") graphics data in order to generate two-dimensional ("2D") image data for display on a display device such as an LCD device. In at least one embodiment, PPU 3300 is utilized to perform computations such as linear algebra operations and machine-learning operations. FIG. 33 illustrates an example parallel processor for illustrative purposes only and should be construed as a non-limiting example of a processor architecture that may be implemented in at least one embodiment.

In at least one embodiment, one or more PPUs 3300 are configured to accelerate High Performance Computing ("HPC"), data center, and machine learning applications. In at least one embodiment, one or more PPUs 3300 are configured to accelerate CUDA programs. In at least one embodiment, PPU 3300 includes, without limitation, an I/O unit 3306, a front-end unit 3310, a scheduler unit 3312, a work distribution unit 3314, a hub 3316, a crossbar ("Xbar") 3320, one or more general processing clusters ("GPCs") 3318, and one or more partition units ("memory partition units") 3322. In at least one embodiment, PPU 3300 is connected to a host processor or other PPUs 3300 via one or more high-speed GPU interconnects ("GPU interconnects") 3308. In at least one embodiment, PPU 3300 is connected to a host processor or other peripheral devices via a system bus or interconnect 3302. In at least one embodiment, PPU 3300 is connected to a local memory comprising one or more memory devices ("memory") 3304. In at least one embodiment, memory devices 3304 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3308 may refer to a wire-based multi-lane communications link that is used by systems to scale and include one or more PPUs 3300 combined with one or more CPUs, supports cache coherence between PPUs 3300 and CPUs, and CPU mastering. In at least one embodiment, data and/or commands are transmitted by high-speed GPU interconnect 3308 through hub 3316 to/from other units of PPU 3300 such as one or more copy engines, video encoders, video decoders, power management units, and other components which may not be explicitly illustrated in FIG. 33.

In at least one embodiment, I/O unit 3306 is configured to transmit and receive communications (e.g., commands, data) from a host processor (not illustrated in FIG. 33) over system bus 3302. In at least one embodiment, I/O unit 3306 communicates with host processor directly via system bus 3302 or through one or more intermediate devices such as a memory bridge. In at least one embodiment, I/O unit 3306 may communicate with one or more other processors, such as one or more of PPUs 3300 via system bus 3302. In at least one embodiment, I/O unit 3306 implements a PCIe interface for communications over a PCIe bus. In at least one embodiment, I/O unit 3306 implements interfaces for communicating with external devices.

In at least one embodiment, I/O unit 3306 decodes packets received via system bus 3302. In at least one embodiment, at least some packets represent commands configured to cause PPU 3300 to perform various operations. In at least one embodiment, I/O unit 3306 transmits decoded commands to various other units of PPU 3300 as specified by commands. In at least one embodiment, commands are transmitted to front-end unit 3310 and/or transmitted to hub 3316 or other units of PPU 3300 such as one or more copy engines, a video encoder, a video decoder, a power management unit, etc. (not explicitly illustrated in FIG. 33). In at least one embodiment, I/O unit 3306 is configured to route communications between and among various logical units of PPU 3300.

In at least one embodiment, a program executed by host processor encodes a command stream in a buffer that provides workloads to PPU 3300 for processing. In at least one embodiment, a workload comprises instructions and data to be processed by those instructions. In at least one embodiment, buffer is a region in a memory that is accessible (e.g., read/write) by both a host processor and PPU 3300—a host interface unit may be configured to access buffer in a system memory connected to system bus 3302 via memory requests transmitted over system bus 3302 by I/O unit 3306. In at least one embodiment, a host processor writes a command stream to a buffer and then transmits a pointer to the start of the command stream to PPU 3300 such that front-end unit 3310 receives pointers to one or more command streams and manages one or more command streams, reading commands from command streams and forwarding commands to various units of PPU 3300.

In at least one embodiment, front-end unit 3310 is coupled to scheduler unit 3312 that configures various GPCs 3318 to process tasks defined by one or more command streams. In at least one embodiment, scheduler unit 3312 is configured to track state information related to various tasks managed by scheduler unit 3312 where state information may indicate which of GPCs 3318 a task is assigned to, whether task is active or inactive, a priority level associated with task, and so forth. In at least one embodiment, scheduler unit 3312 manages execution of a plurality of tasks on one or more of GPCs 3318.

In at least one embodiment, scheduler unit 3312 is coupled to work distribution unit 3314 that is configured to dispatch tasks for execution on GPCs 3318. In at least one embodiment, work distribution unit 3314 tracks a number of scheduled tasks received from scheduler unit 3312 and work distribution unit 3314 manages a pending task pool and an active task pool for each of GPCs 3318. In at least one embodiment, pending task pool comprises a number of slots (e.g., 32 slots) that contain tasks assigned to be processed by a particular GPC 3318; active task pool may comprise a number of slots (e.g., 4 slots) for tasks that are actively being processed by GPCs 3318 such that as one of GPCs 3318 completes execution of a task, that task is evicted from active task pool for GPC 3318 and one of other tasks from pending task pool is selected and scheduled for execution on GPC 3318. In at least one embodiment, if an active task is idle on GPC 3318, such as while waiting for a data dependency to be resolved, then the active task is evicted from GPC 3318 and returned to a pending task pool while another task in the pending task pool is selected and scheduled for execution on GPC 3318.

In at least one embodiment, work distribution unit 3314 communicates with one or more GPCs 3318 via XBar 3320. In at least one embodiment, XBar 3320 is an interconnect network that couples many units of PPU 3300 to other units of PPU 3300 and can be configured to couple work distribution unit 3314 to a particular GPC 3318. In at least one embodiment, one or more other units of PPU 3300 may also be connected to XBar 3320 via hub 3316.

In at least one embodiment, tasks are managed by scheduler unit 3312 and dispatched to one of GPCs 3318 by work distribution unit 3314. GPC 3318 is configured to process task and generate results. In at least one embodiment, results may be consumed by other tasks within GPC 3318, routed to a different GPC 3318 via XBar 3320, or stored in memory 3304. In at least one embodiment, results can be written to memory 3304 via partition units 3322, which implement a memory interface for reading and writing data to/from memory 3304. In at least one embodiment, results can be transmitted to another PPU 3304 or CPU via high-speed GPU interconnect 3308. In at least one embodiment, PPU 3300 includes, without limitation, a number U of partition units 3322 that is equal to number of separate and distinct memory devices 3304 coupled to PPU 3300.

In at least one embodiment, a host processor executes a driver kernel that implements an application programming interface ("API") that enables one or more applications executing on host processor to schedule operations for execution on PPU 3300. In at least one embodiment, multiple compute applications are simultaneously executed by PPU 3300 and PPU 3300 provides isolation, quality of service ("QoS"), and independent address spaces for multiple compute applications. In at least one embodiment, an application generates instructions (e.g., in the form of API calls) that cause a driver kernel to generate one or more tasks for execution by PPU 3300 and the driver kernel outputs tasks to one or more streams being processed by PPU 3300. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

In at least one embodiment, at least one component shown or described with respect to FIG. 33 is used to implement techniques and/or functions described in connection with FIGS. 1-16. In at least one embodiment, parallel processing unit 3300 is used to perform an API to cause a software kernel to be generated to perform an implicit matrix multiplication operation. In at least one embodiment, parallel processing unit 3300 is used to perform an API to cause one or more dimensions of a tensor to be modified. In at least one embodiment, parallel processing unit 3300 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 34:
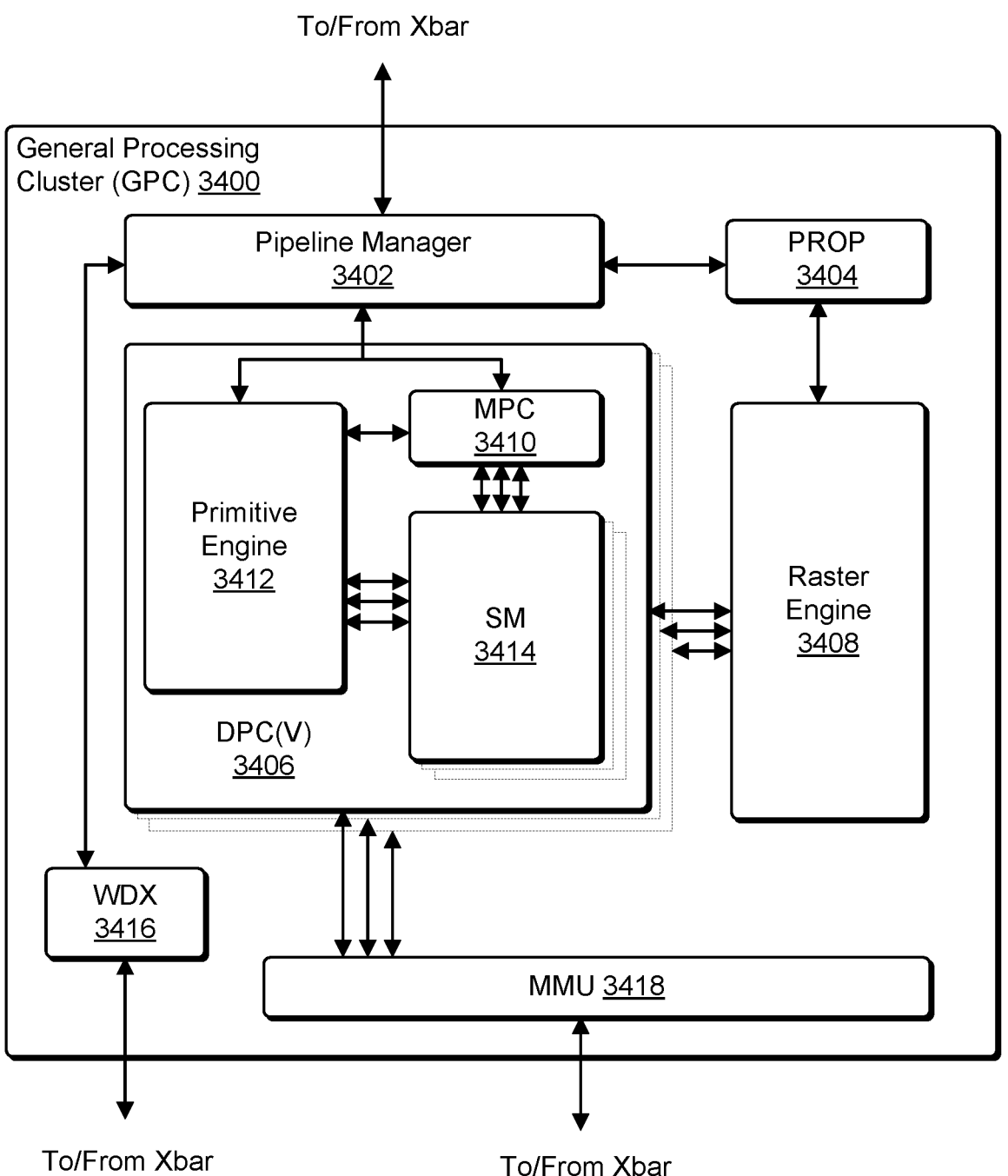
FIG. 34 illustrates a GPC, in accordance with at least one embodiment.

FIG. 34 illustrates a GPC 3400, in accordance with at least one embodiment. In at least one embodiment, GPC 3400 is GPC 3318 of FIG. 33. In at least one embodiment, each GPC 3400 includes, without limitation, a number of hardware units for processing tasks and each GPC 3400 includes, without limitation, a pipeline manager 3402, a pre-raster operations unit ("PROP") 3404, a raster engine 3408, a work distribution crossbar ("WDX") 3416, an MMU 3418, one or more Data Processing Clusters ("DPCs") 3406, and any suitable combination of parts.

In at least one embodiment, operation of GPC 3400 is controlled by pipeline manager 3402. In at least one embodiment, pipeline manager 3402 manages configuration of one or more DPCs 3406 for processing tasks allocated to GPC 3400. In at least one embodiment, pipeline manager 3402 configures at least one of one or more DPCs 3406 to implement at least a portion of a graphics rendering pipeline. In at least one embodiment, DPC 3406 is configured to execute a vertex shader program on a programmable streaming multiprocessor ("SM") 3414. In at least one embodiment, pipeline manager 3402 is configured to route packets received from a work distribution unit to appropriate logical units within GPC 3400 and, in at least one embodiment, some packets may be routed to fixed function hardware units in PROP 3404 and/or raster engine 3408 while other packets may be routed to DPCs 3406 for processing by a primitive engine 3412 or SM 3414. In at least one embodiment, pipeline manager 3402 configures at least one of DPCs 3406 to implement a computing pipeline. In at least one embodiment, pipeline manager 3402 configures at least one of DPCs 3406 to execute at least a portion of a CUDA program.

In at least one embodiment, PROP unit 3404 is configured to route data generated by raster engine 3408 and DPCs 3406 to a Raster Operations ("ROP") unit in a partition unit, such as memory partition unit 3322 described in more detail above in conjunction with FIG. 33. In at least one embodiment, PROP unit 3404 is configured to perform optimizations for color blending, organize pixel data, perform address translations, and more. In at least one embodiment, raster engine 3408 includes, without limitation, a number of fixed function hardware units configured to perform various raster operations and, in at least one embodiment, raster engine 3408 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 3408 comprises fragments to be processed by any suitable entity such as by a fragment shader implemented within DPC 3406.

In at least one embodiment, each DPC 3406 included in GPC 3400 comprise, without limitation, an M-Pipe Controller ("MPC") 3410; primitive engine 3412; one or more SMs 3414; and any suitable combination thereof. In at least one embodiment, MPC 3410 controls operation of DPC 3406, routing packets received from pipeline manager 3402 to appropriate units in DPC 3406. In at least one embodiment, packets associated with a vertex are routed to primitive engine 3412, which is configured to fetch vertex attributes associated with vertex from memory; in contrast, packets associated with a shader program may be transmitted to SM 3414.

In at least one embodiment, SM 3414 comprises, without limitation, a programmable streaming processor that is configured to process tasks represented by a number of threads. In at least one embodiment, SM 3414 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 3414 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 3414 is described in more detail in conjunction with FIG. 35.

In at least one embodiment, MMU 3418 provides an interface between GPC 3400 and a memory partition unit (e.g., partition unit 3322 of FIG. 33) and MMU 3418 provides translation of virtual addresses into physical addresses, memory protection, and arbitration of memory requests. In at least one embodiment, MMU 3418 provides one or more translation lookaside buffers (TLBs) for performing translation of virtual addresses into physical addresses in memory.

In at least one embodiment, at least one component shown or described with respect to FIG. 34 is used to implement techniques and/or functions described in connection with FIGS. 1-16. In at least one embodiment, general processing cluster 3400 is used to perform an API to cause a software kernel to be generated to perform an implicit matrix multiplication operation. In at least one embodiment, general processing cluster 3400 is used to perform an API to cause one or more dimensions of a tensor to be modified. In at least one embodiment, general processing cluster 3400 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 35:
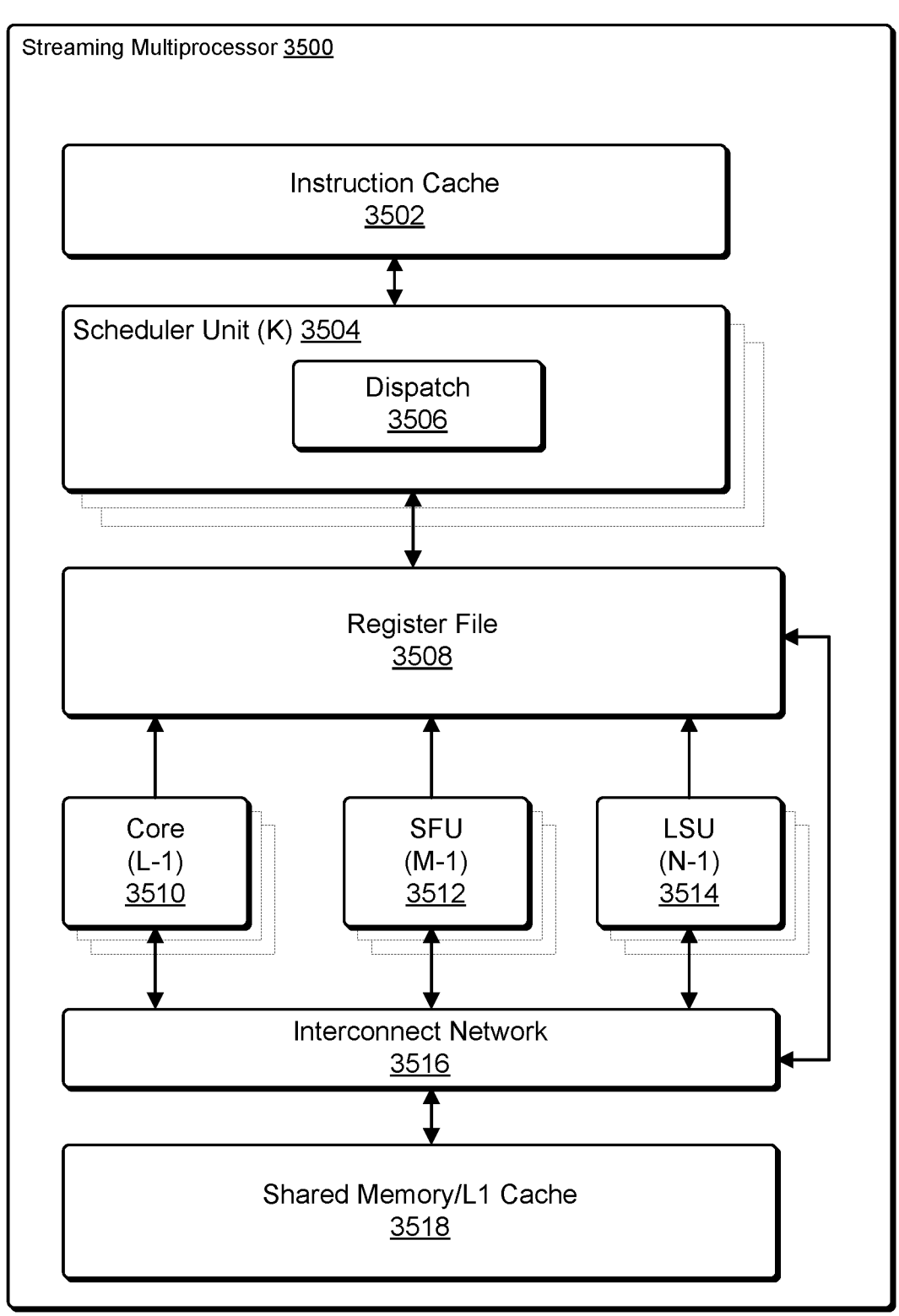
FIG. 35 illustrates a streaming multiprocessor, in accordance with at least one embodiment.

FIG. 35 illustrates a streaming multiprocessor ("SM") 3500, in accordance with at least one embodiment. In at least one embodiment, SM 3500 is SM 3414 of FIG. 34. In at least one embodiment, SM 3500 includes, without limitation, an instruction cache 3502; one or more scheduler units 3504; a register file 3508; one or more processing cores ("cores") 3510; one or more special function units ("SFUs") 3512; one or more LSUs 3514; an interconnect network 3516; a shared memory/L1 cache 3518; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3500. In at least one embodiment, scheduler unit 3504 receives tasks from a work distribution unit and manages instruction scheduling for one or more thread blocks assigned to SM 3500. In at least one embodiment, scheduler unit 3504 schedules thread blocks for execution as warps of parallel threads, wherein each thread block is allocated at least one warp. In at least one embodiment, each warp executes threads. In at least one embodiment, scheduler unit 3504 manages a plurality of different thread blocks, allocating warps to different thread blocks and then dispatching instructions from a plurality of different cooperative groups to various functional units (e.g., processing cores 3510, SFUs 3512, and LSUs 3514) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3506 is configured to transmit instructions to one or more of functional units and scheduler unit 3504 includes, without limitation, two dispatch units 3506 that enable two different instructions from same warp to be dispatched during each clock cycle. In at least one embodiment, each scheduler unit 3504 includes a single dispatch unit 3506 or additional dispatch units 3506.

In at least one embodiment, each SM 3500, in at least one embodiment, includes, without limitation, register file 3508 that provides a set of registers for functional units of SM 3500. In at least one embodiment, register file 3508 is divided between each of the functional units such that each functional unit is allocated a dedicated portion of register file 3508. In at least one embodiment, register file 3508 is divided between different warps being executed by SM 3500 and register file 3508 provides temporary storage for operands connected to data paths of functional units. In at least one embodiment, each SM 3500 comprises, without limitation, a plurality of L processing cores 3510. In at least one embodiment, SM 3500 includes, without limitation, a large number (e.g., 128 or more) of distinct processing cores 3510. In at least one embodiment, each processing core 3510 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3510 include, without limitation, 64 single-precision (32-bit) floating point cores, 64 integer cores, 32 double-precision (64-bit) floating point cores, and 8 tensor cores.

In at least one embodiment, tensor cores (and/or other circuitry to accelerate matrix operations, such as matrix processing units (MPUs), vector engines, and/or matrix engines) are configured to perform matrix operations. In at least one embodiment, one or more tensor cores are included in processing cores 3510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3500 comprises, without limitation, M SFUs 3512 that perform special functions (e.g., attribute evaluation, reciprocal square root, and like). In at least one embodiment, SFUs 3512 include, without limitation, a tree traversal unit configured to traverse a hierarchical tree data structure. In at least one embodiment, SFUs 3512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3500. In at least one embodiment, texture maps are stored in shared memory/L1 cache 3518. In at least one embodiment, texture units implement texture operations such as filtering operations using mip-maps (e.g., texture maps of varying levels of detail). In at least one embodiment, each SM 3500 includes, without limitation, two texture units.

In at least one embodiment, each SM 3500 comprises, without limitation, N LSUs 3514 that implement load and store operations between shared memory/L1 cache 3518 and register file 3508. In at least one embodiment, each SM 3500 includes, without limitation, interconnect network 3516 that connects each of the functional units to register file 3508 and LSU 3514 to register file 3508 and shared memory/L1 cache 3518. In at least one embodiment, interconnect network 3516 is a crossbar that can be configured to connect any of the functional units to any of the registers in register file 3508 and connect LSUs 3514 to register file 3508 and memory locations in shared memory/L1 cache 3518.

In at least one embodiment, shared memory/L1 cache 3518 is an array of on-chip memory that allows for data storage and communication between SM 3500 and a primitive engine and between threads in SM 3500. In at least one embodiment, shared memory/L1 cache 3518 comprises, without limitation, 128 KB of storage capacity and is in a path from SM 3500 to a partition unit. In at least one embodiment, shared memory/L1 cache 3518 is used to cache reads and writes. In at least one embodiment, one or more of shared memory/L1 cache 3518, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3518 enables shared memory/L1 cache 3518 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3500 to execute a program and perform calculations, shared memory/L1 cache 3518 to communicate between threads, and LSU 3514 to read and write global memory through shared memory/L1 cache 3518 and a memory partition unit. In at least one embodiment, when configured for general purpose parallel computation, SM 3500 writes commands that scheduler unit 3504 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

In at least one embodiment, at least one component shown or described with respect to FIG. 35 is used to implement techniques and/or functions described in connection with FIGS. 1-16. In at least one embodiment, streaming multiprocessor 3500 is used to perform an API to cause a software kernel to be generated to perform an implicit matrix multiplication operation. In at least one embodiment, streaming multiprocessor 3500 is used to perform an API to cause one or more dimensions of a tensor to be modified. In at least one embodiment, streaming multiprocessor 3500 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Software Constructions for General-Purpose Computing

The following figures set forth, without limitation, exemplary software constructs for implementing at least one embodiment.

Figure 36:
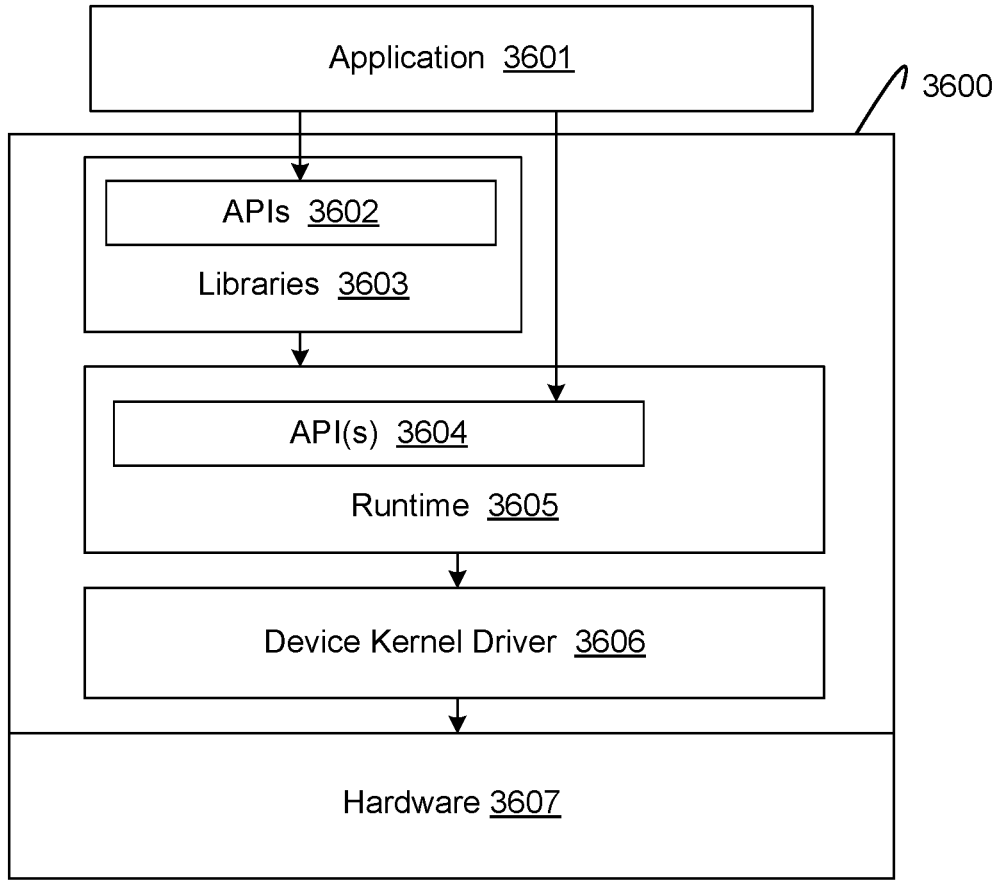
FIG. 36 illustrates a software stack of a programming platform, in accordance with at least one embodiment.

FIG. 36 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3600 of a programming platform provides an execution environment for an application 3601. In at least one embodiment, application 3601 may include any computer software capable of being launched on software stack 3600. In at least one embodiment, application 3601 may include, but is not limited to, an artificial intelligence ("AI")/machine learning ("ML") application, a high performance computing ("HPC") application, a virtual desktop infrastructure ("VDI"), or a data center workload.

In at least one embodiment, application 3601 and software stack 3600 run on hardware 3607. Hardware 3607 may include one or more GPUs, CPUs, FPGAs, AI engines, and/or other types of compute devices that support a programming platform, in at least one embodiment. In at least one embodiment, such as with CUDA, software stack 3600 may be vendor specific and compatible with only devices from particular vendor(s). In at least one embodiment, such as in with OpenCL, software stack 3600 may be used with devices from different vendors. In at least one embodiment, hardware 3607 includes a host connected to one more devices that can be accessed to perform computational tasks via application programming interface ("API") calls. A device within hardware 3607 may include, but is not limited to, a GPU, FPGA, AI engine, or other compute device (but may also include a CPU) and its memory, as opposed to a host within hardware 3607 that may include, but is not limited to, a CPU (but may also include a compute device) and its memory, in at least one embodiment.

In at least one embodiment, software stack 3600 of a programming platform includes, without limitation, a number of libraries 3603, a runtime 3605, and a device kernel driver 3606. Each of libraries 3603 may include data and programming code that can be used by computer programs and leveraged during software development, in at least one embodiment. In at least one embodiment, libraries 3603 may include, but are not limited to, pre-written code and subroutines, classes, values, type specifications, configuration data, documentation, help data, and/or message templates. In at least one embodiment, libraries 3603 include functions that are optimized for execution on one or more types of devices. In at least one embodiment, libraries 3603 may include, but are not limited to, functions for performing mathematical, deep learning, and/or other types of operations on devices. In at least one embodiment, libraries 3603 are associated with corresponding APIs 3602, which may include one or more APIs, that expose functions implemented in libraries 3603.

In at least one embodiment, application 3601 is written as source code that is compiled into executable code, as discussed in greater detail below in conjunction with FIGS. 41-43. Executable code of application 3601 may run, at least in part, on an execution environment provided by software stack 3600, in at least one embodiment. In at least one embodiment, during execution of application 3601, code may be reached that needs to run on a device, as opposed to a host. In such a case, runtime 3605 may be called to load and launch requisite code on the device, in at least one embodiment. In at least one embodiment, runtime 3605 may include any technically feasible runtime system that is able to support execution of application S01.

In at least one embodiment, runtime 3605 is implemented as one or more runtime libraries associated with corresponding APIs, which are shown as API(s) 3604. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3604 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3606 is configured to facilitate communication with an underlying device. In at least one embodiment, device kernel driver 3606 may provide low-level functionalities upon which APIs, such as API(s) 3604, and/or other software relies. In at least one embodiment, device kernel driver 3606 may be configured to compile intermediate representation ("IR") code into binary code at runtime. For CUDA, device kernel driver 3606 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3606 to compile IR code at runtime.

In at least one embodiment, at least one component shown or described with respect to FIG. 36 is used to implement techniques and/or functions described in connection with FIGS. 1-16. In at least one embodiment, at least one element of software stack 3600 of a programming platform is used to perform an API to cause a software kernel to be generated to perform an implicit matrix multiplication operation. In at least one embodiment, at least one element of software stack 3600 of a programming platform is used to perform an API to cause one or more dimensions of a tensor to be modified. In at least one embodiment, at least one element of software stack 3600 of a programming platform is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 37:
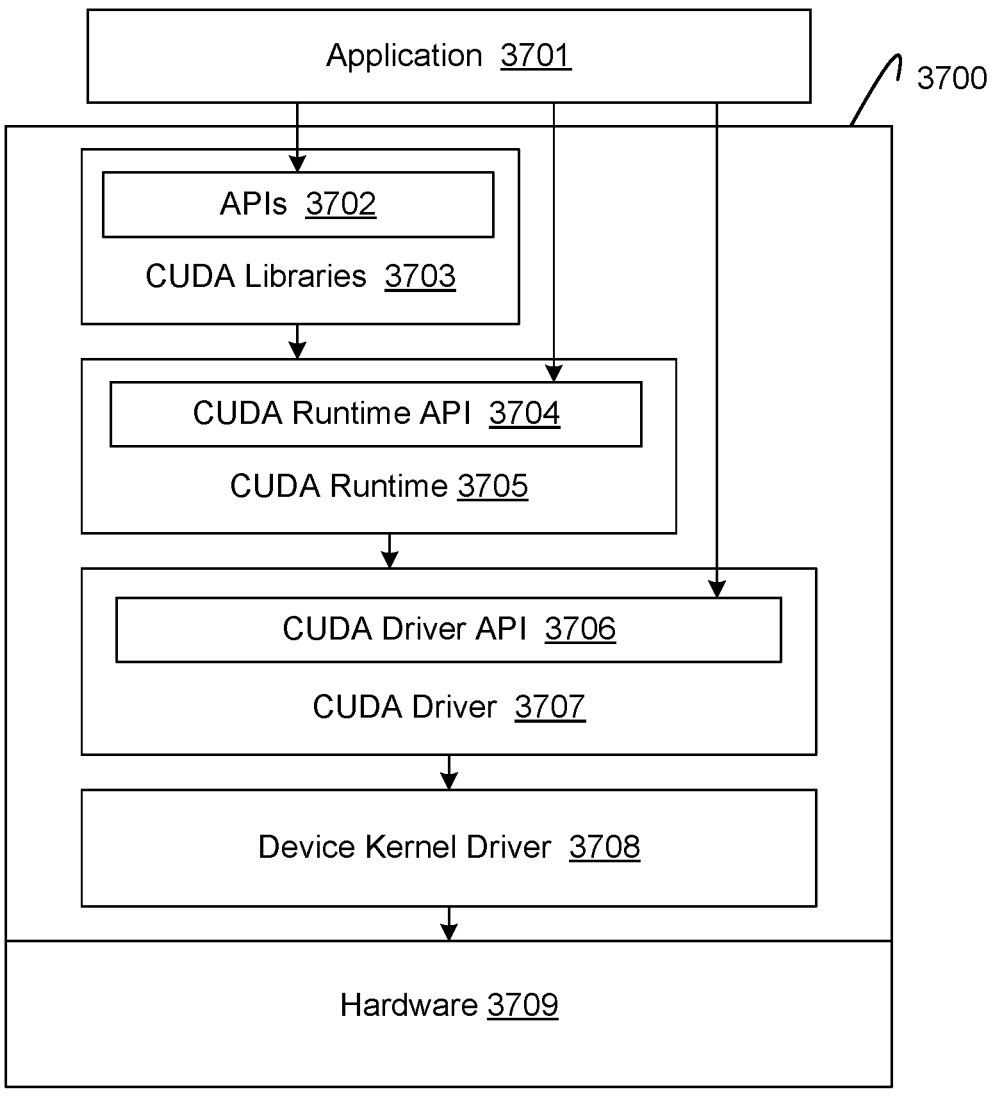
FIG. 37 illustrates a CUDA implementation of a software stack of FIG. 36, in accordance with at least one embodiment.

FIG. 37 illustrates a CUDA implementation of software stack 3600 of FIG. 36, in accordance with at least one embodiment. In at least one embodiment, a CUDA software stack 3700, on which an application 3701 may be launched, includes CUDA libraries 3703, a CUDA runtime 3705, a CUDA driver 3707, and a device kernel driver 3708. In at least one embodiment, CUDA software stack 3700 executes on hardware 3709, which may include a GPU that supports CUDA and is developed by NVIDIA Corporation of Santa Clara, CA.

In at least one embodiment, application 3701, CUDA runtime 3705, and device kernel driver 3708 may perform similar functionalities as application 3601, runtime 3605, and device kernel driver 3606, respectively, which are described above in conjunction with FIG. 36. In at least one embodiment, CUDA driver 3707 includes a library (libcuda.so) that implements a CUDA driver API 3706. Similar to a CUDA runtime API 3704 implemented by a CUDA runtime library (cudart), CUDA driver API 3706 may, without limitation, expose functions for memory management, execution control, device management, error handling, synchronization, and/or graphics interoperability, among other things, in at least one embodiment. In at least one embodiment, CUDA driver API 3706 differs from CUDA runtime API 3704 in that CUDA runtime API 3704 simplifies device code management by providing implicit initialization, context (analogous to a process) management, and module (analogous to dynamically loaded libraries) management. In contrast to high-level CUDA runtime API 3704, CUDA driver API 3706 is a low-level API providing more fine-grained control of the device, particularly with respect to contexts and module loading, in at least one embodiment. In at least one embodiment, CUDA driver API 3706 may expose functions for context management that are not exposed by CUDA runtime API 3704. In at least one embodiment, CUDA driver API 3706 is also language-independent and supports, e.g., OpenCL in addition to CUDA runtime API 3704. Further, in at least one embodiment, development libraries, including CUDA runtime 3705, may be considered as separate from driver components, including user-mode CUDA driver 3707 and kernel-mode device driver 3708 (also sometimes referred to as a "display" driver).

In at least one embodiment, CUDA libraries 3703 may include, but are not limited to, mathematical libraries, deep learning libraries, parallel algorithm libraries, and/or signal/image/video processing libraries, which parallel computing applications such as application 3701 may utilize. In at least one embodiment, CUDA libraries 3703 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3703 may include deep learning libraries such as a cuDNN library of primitives for deep neural networks and a TensorRT platform for high-performance deep learning inference, among others.

In at least one embodiment, at least one component shown or described with respect to FIG. 37 is used to implement techniques and/or functions described in connection with FIGS. 1-16. In at least one embodiment, at least one element of CUDA software stack 3700 is used to perform an API to cause a software kernel to be generated to perform an implicit matrix multiplication operation. In at least one embodiment, at least one element of CUDA software stack 3700 is used to perform an API to cause one or more dimensions of a tensor to be modified. In at least one embodiment, at least one element of CUDA software stack 3700 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 38:
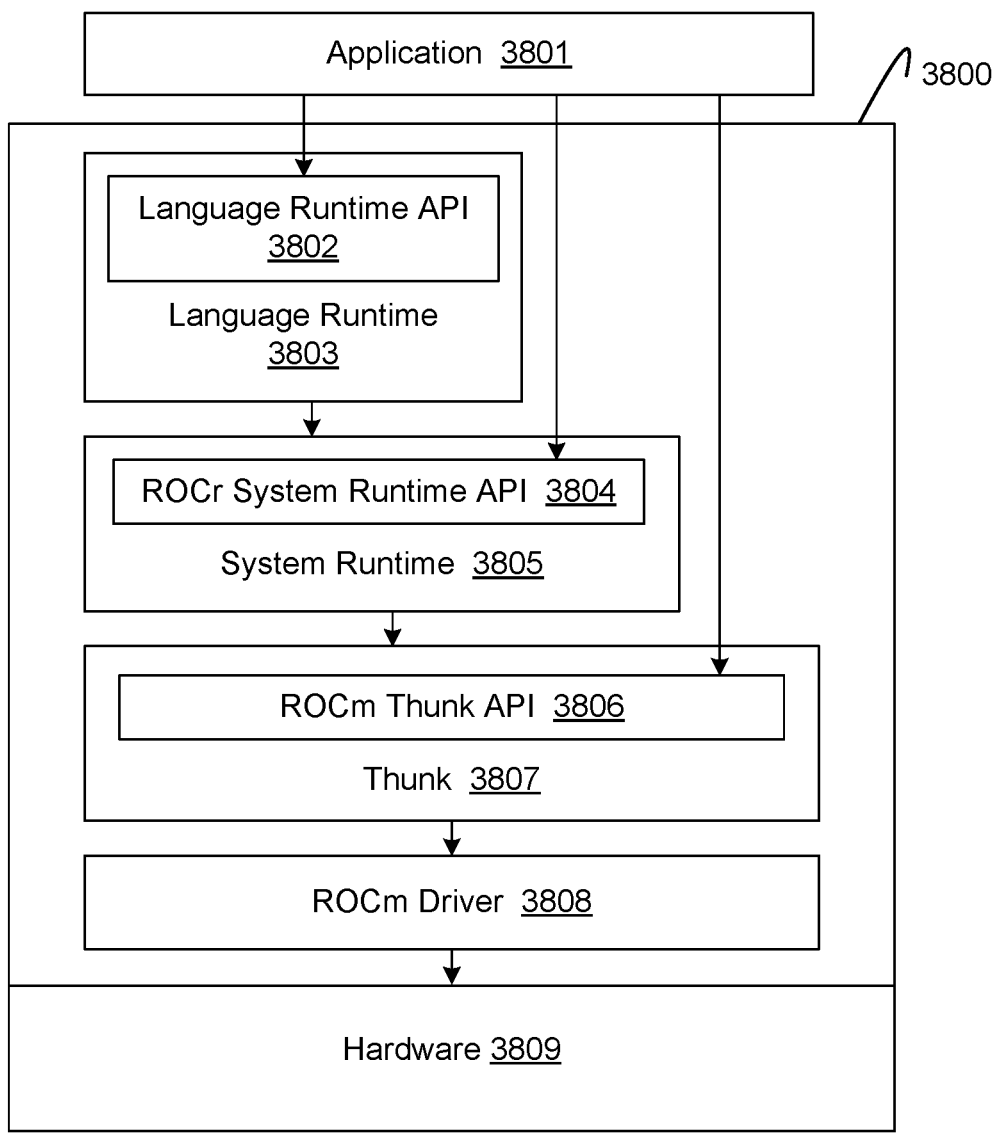
FIG. 38 illustrates a ROCm implementation of a software stack of FIG. 36, in accordance with at least one embodiment.

FIG. 38 illustrates a ROCm implementation of software stack 3600 of FIG. 36, in accordance with at least one embodiment. In at least one embodiment, a ROCm software stack 3800, on which an application 3801 may be launched, includes a language runtime 3803, a system runtime 3805, a thunk 3807, and a ROCm kernel driver 3808. In at least one embodiment, ROCm software stack 3800 executes on hardware 3809, which may include a GPU that supports ROCm and is developed by AMD Corporation of Santa Clara, CA.

In at least one embodiment, application 3801 may perform similar functionalities as application 3601 discussed above in conjunction with FIG. 36. In addition, language runtime 3803 and system runtime 3805 may perform similar functionalities as runtime 3605 discussed above in conjunction with FIG. 36, in at least one embodiment. In at least one embodiment, language runtime 3803 and system runtime 3805 differ in that system runtime 3805 is a language-independent runtime that implements a ROCr system runtime API 3804 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3805, language runtime 3803 is an implementation of a language-specific runtime API 3802 layered on top of ROCr system runtime API 3804, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3704 discussed above in conjunction with FIG. 37, such as functions for memory management, execution control, device management, error handling, and synchronization, among other things.

In at least one embodiment, thunk (ROCt) 3807 is an interface 3806 that can be used to interact with underlying ROCm driver 3808. In at least one embodiment, ROCm driver 3808 is a ROCK driver, which is a combination of an AMDGPU driver and a HSA kernel driver (amdkfd). In at least one embodiment, AMDGPU driver is a device kernel driver for GPUs developed by AMD that performs similar functionalities as device kernel driver 3606 discussed above in conjunction with FIG. 36. In at least one embodiment, HSA kernel driver is a driver permitting different types of processors to share system resources more effectively via hardware features.

In at least one embodiment, various libraries (not shown) may be included in ROCm software stack 3800 above language runtime 3803 and provide functionality similarity to CUDA libraries 3703, discussed above in conjunction with FIG. 37. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 38 is used to implement techniques and/or functions described in connection with FIGS. 1-16. In at least one embodiment, at least one element of ROCm software stack 3800 is used to perform an API to cause a software kernel to be generated to perform an implicit matrix multiplication operation. In at least one embodiment, at least one element of ROCm software stack 3800 is used to perform an API to cause one or more dimensions of a tensor to be modified. In at least one embodiment, at least one element of ROCm software stack 3800 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 39:
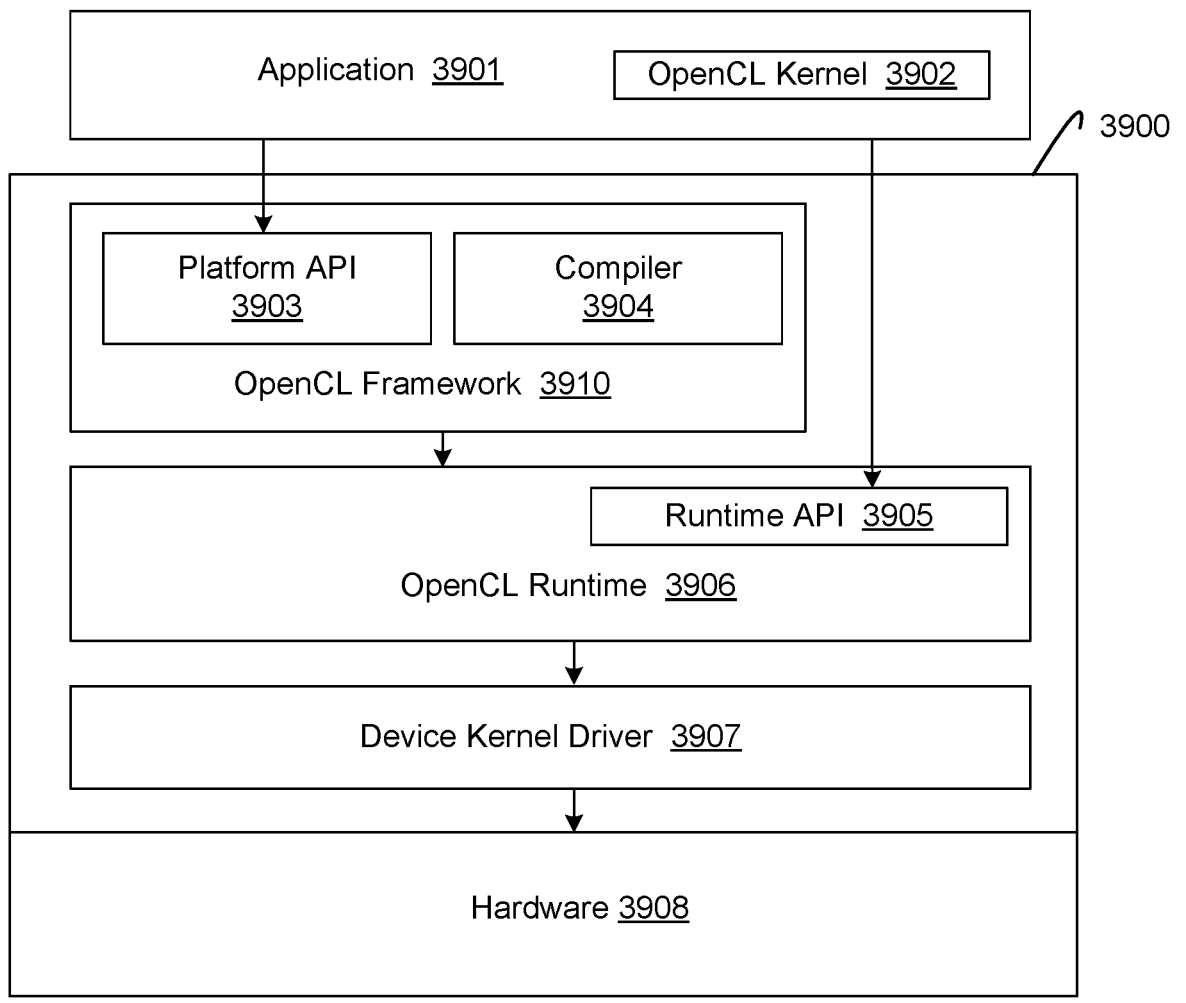
FIG. 39 illustrates an OpenCL implementation of a software stack of FIG. 36, in accordance with at least one embodiment.

FIG. 39 illustrates an OpenCL implementation of software stack 3600 of FIG. 36, in accordance with at least one embodiment. In at least one embodiment, an OpenCL software stack 3900, on which an application 3901 may be launched, includes an OpenCL framework 3910, an OpenCL runtime 3906, and a driver 3907. In at least one embodiment, OpenCL software stack 3900 executes on hardware 3709 that is not vendor-specific. As OpenCL is supported by devices developed by different vendors, specific OpenCL drivers may be required to interoperate with hardware from such vendors, in at least one embodiment.

In at least one embodiment, application 3901, OpenCL runtime 3906, device kernel driver 3907, and hardware 3908 may perform similar functionalities as application 3601, runtime 3605, device kernel driver 3606, and hardware 3607, respectively, that are discussed above in conjunction with FIG. 36. In at least one embodiment, application 3901 further includes an OpenCL kernel 3902 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3903 and runtime API 3905. In at least one embodiment, runtime API 3905 uses contexts to manage execution of kernels on devices. In at least one embodiment, each identified device may be associated with a respective context, which runtime API 3905 may use to manage command queues, program objects, and kernel objects, share memory objects, among other things, for that device. In at least one embodiment, platform API 3903 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3904 is also included in OpenCL frame-work 3910. Source code may be compiled offline prior to executing an application or online during execution of an application, in at least one embodiment. In contrast to CUDA and ROCm, OpenCL applications in at least one embodiment may be compiled online by compiler 3904, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

In at least one embodiment, at least one component shown or described with respect to FIG. 39 is used to implement techniques and/or functions described in connection with FIGS. 1-16. In at least one embodiment, at least one element of OpenCL software stack 3900 is used to perform an API to cause a software kernel to be generated to perform an implicit matrix multiplication operation. In at least one embodiment, at least one element of OpenCL software stack 3900 is used to perform an API to cause one or more dimensions of a tensor to be modified. In at least one embodiment, at least one element of OpenCL software stack 3900 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 40:
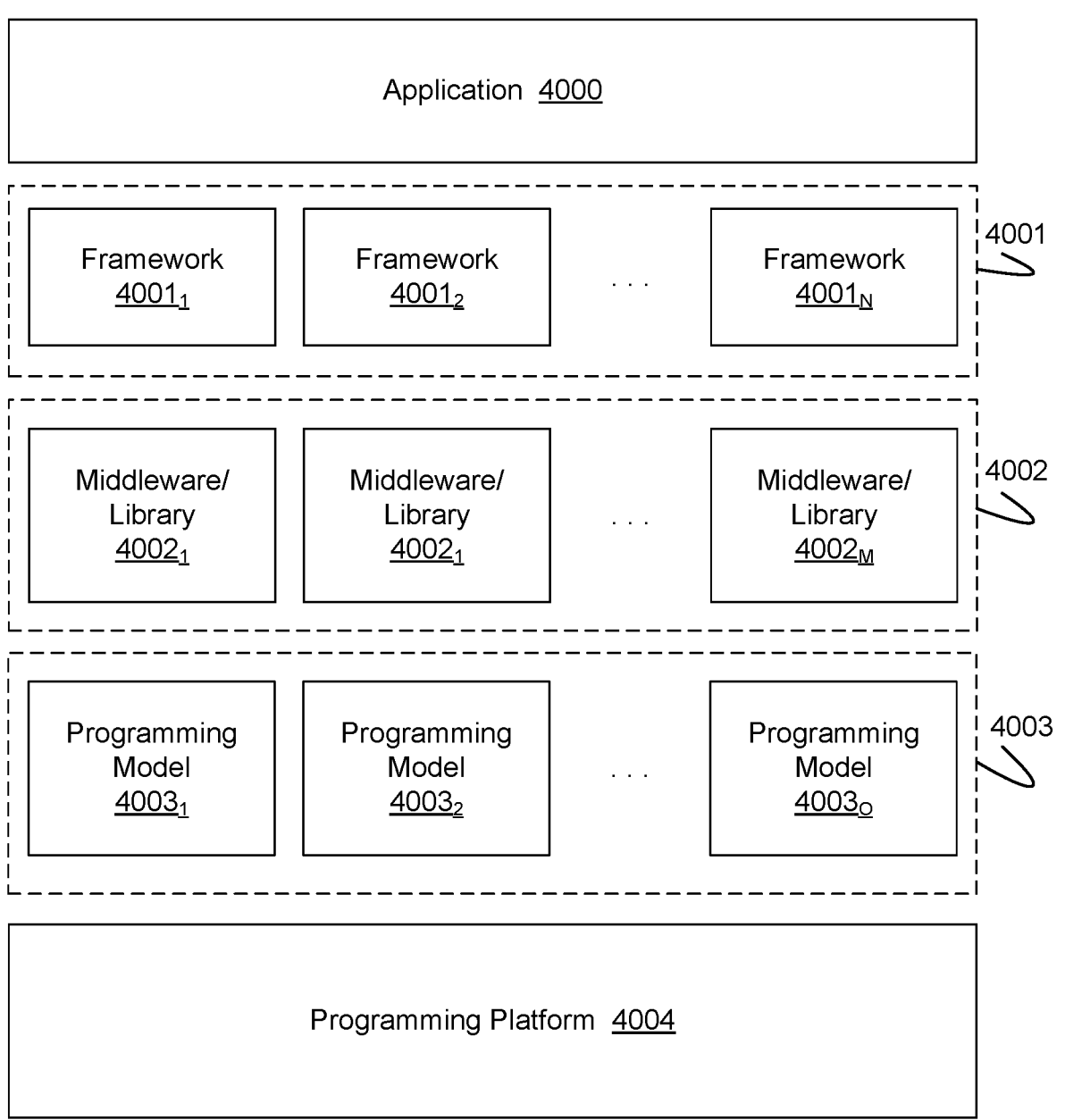
FIG. 40 illustrates software that is supported by a programming platform, in accordance with at least one embodiment.

FIG. 40 illustrates software that is supported by a programming platform, in accordance with at least one embodiment. In at least one embodiment, a programming platform 4004 is configured to support various programming models 4003, middlewares and/or libraries 4002, and frameworks 4001 that an application 4000 may rely upon. In at least one embodiment, application 4000 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4004 may be one of a CUDA, ROCm, or OpenCL platform described above in conjunction with FIG. 37, FIG. 38, and FIG. 39, respectively. In at least one embodiment, programming platform 4004 supports multiple programming models 4003, which are abstractions of an underlying computing system permitting expressions of algorithms and data structures. Programming models 4003 may expose features of underlying hardware in order to improve performance, in at least one embodiment. In at least one embodiment, programming models 4003 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4002 provide implementations of abstractions of programming models 4004. In at least one embodiment, such libraries include data and programming code that may be used by computer programs and leveraged during software development. In at least one embodiment, such middlewares include software that provides services to applications beyond those available from programming platform 4004. In at least one embodiment, libraries and/or middlewares 4002 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4002 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4001 depend on libraries and/or middlewares 4002. In at least one embodiment, each of application frameworks 4001 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

In at least one embodiment, at least one component shown or described with respect to FIG. 40 is used to implement techniques and/or functions described in connection with FIGS. 1-16. In at least one embodiment, application 4000 is used to perform an API to cause a software kernel to be generated to perform an implicit matrix multiplication operation. In at least one embodiment, application 4000 is used to perform an API to cause one or more dimensions of a tensor to be modified. In at least one embodiment, application 4000 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 41:
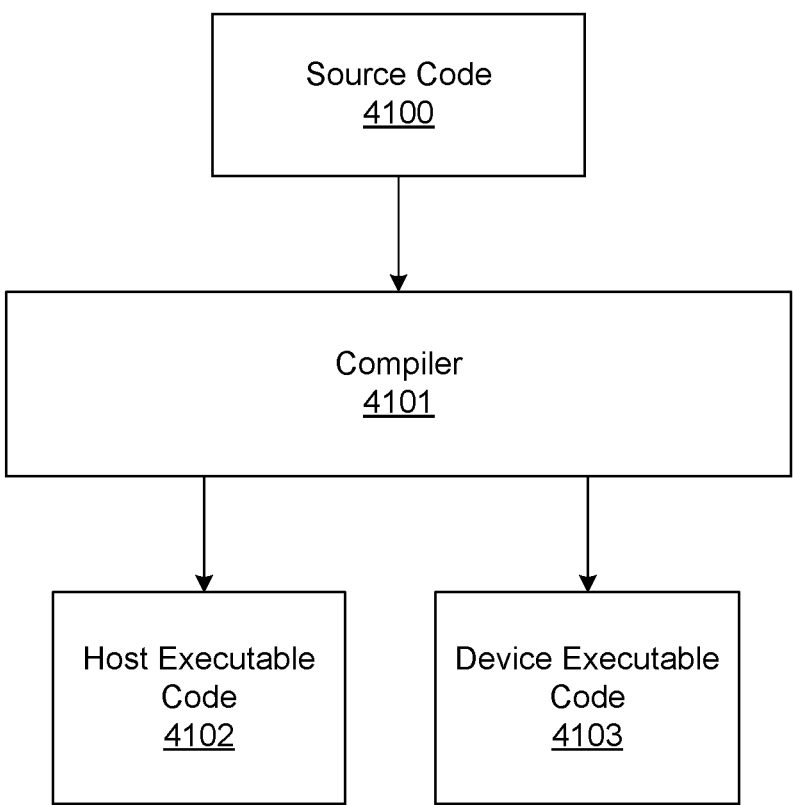
FIG. 41 illustrates compiling code to execute on programming platforms of FIGS. 36-39, in accordance with at least one embodiment.

FIG. 41 illustrates compiling code to execute on one of programming platforms of FIGS. 36-39, in accordance with at least one embodiment. In at least one embodiment, a compiler 4101 receives source code 4100 that includes both host code as well as device code. In at least one embodiment, complier 4101 is configured to convert source code 4100 into host executable code 4102 for execution on a host and device executable code 4103 for execution on a device. In at least one embodiment, source code 4100 may either be compiled offline prior to execution of an application, or online during execution of an application.

In at least one embodiment, source code 4100 may include code in any programming language supported by compiler 4101, such as C++, C, Fortran, etc. In at least one embodiment, source code 4100 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4100 may include multiple source code files, rather than a single-source file, into which host code and device code are separated.

In at least one embodiment, compiler 4101 is configured to compile source code 4100 into host executable code 4102 for execution on a host and device executable code 4103 for execution on a device. In at least one embodiment, compiler 4101 performs operations including parsing source code 4100 into an abstract system tree (AST), performing optimizations, and generating executable code. In at least one embodiment in which source code 4100 includes a single-source file, compiler 4101 may separate device code from host code in such a single-source file, compile device code and host code into device executable code 4103 and host executable code 4102, respectively, and link device executable code 4103 and host executable code 4102 together in a single file, as discussed in greater detail below with respect to FIG. 42.

In at least one embodiment, host executable code 4102 and device executable code 4103 may be in any suitable format, such as binary code and/or IR code. In the case of CUDA, host executable code 4102 may include native object code and device executable code 4103 may include code in PTX intermediate representation, in at least one embodiment. In the case of ROCm, both host executable code 4102 and device executable code 4103 may include target binary code, in at least one embodiment.

In at least one embodiment, at least one component shown or described with respect to FIG. 41 is used to implement techniques and/or functions described in connection with FIGS. 1-16. In at least one embodiment, at least one of host executable code 4102 or device executable code 4103 specified in source code 4100 is used to perform an API to cause a software kernel to be generated to perform an implicit matrix multiplication operation. In at least one embodiment, at least one of host executable code 4102 or device executable code 4103 specified in source code 4100 is used to perform an API to cause one or more dimensions of a tensor to be modified. In at least one embodiment, at least one of host executable code 4102 or device executable code 4103 specified in source code 4100 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 42:
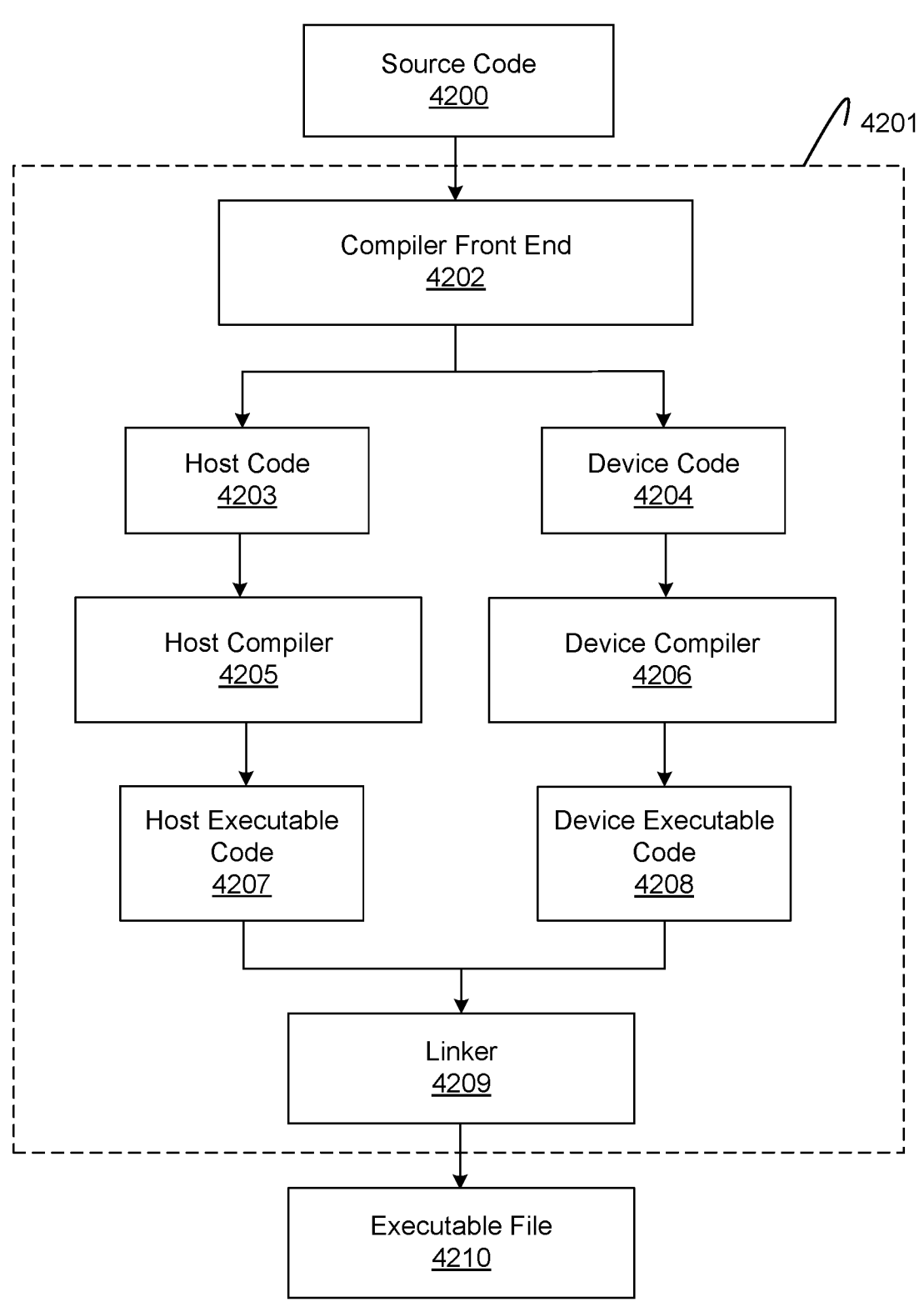
FIG. 42 illustrates in greater detail compiling code to execute on programming platforms of FIGS. 36-39, in accordance with at least one embodiment.

FIG. 42 is a more detailed illustration of compiling code to execute on one of programming platforms of FIGS. 36-39, in accordance with at least one embodiment. In at least one embodiment, a compiler 4201 is configured to receive source code 4200, compile source code 4200, and output an executable file 4210. In at least one embodiment, source code 4200 is a single-source file, such as a .cu file, a .hip.cpp file, or a file in another format, that includes both host and device code. In at least one embodiment, compiler 4201 may be, but is not limited to, an NVIDIA CUDA compiler ("NVCC") for compiling CUDA code in .cu files, or a HCC compiler for compiling HIP code in .hip.cpp files.

In at least one embodiment, compiler 4201 includes a compiler front end 4202, a host compiler 4205, a device compiler 4206, and a linker 4209. In at least one embodiment, compiler front end 4202 is configured to separate device code 4204 from host code 4203 in source code 4200. Device code 4204 is compiled by device compiler 4206 into device executable code 4208, which as described may include binary code or IR code, in at least one embodiment. Separately, host code 4203 is compiled by host compiler 4205 into host executable code 4207, in at least one embodiment. For NVCC, host compiler 4205 may be, but is not limited to, a general purpose C/C++ compiler that outputs native object code, while device compiler 4206 may be, but is not limited to, a Low Level Virtual Machine ("LLVM")-based compiler that forks a LLVM compiler infrastructure and outputs PTX code or binary code, in at least one embodiment. For HCC, both host compiler 4205 and device compiler 4206 may be, but are not limited to, LLVM-based compilers that output target binary code, in at least one embodiment.

Subsequent to compiling source code 4200 into host executable code 4207 and device executable code 4208, linker 4209 links host and device executable code 4207 and 4208 together in executable file 4210, in at least one embodiment. In at least one embodiment, native object code for a host and PTX or binary code for a device may be linked together in an Executable and Linkable Format ("ELF") file, which is a container format used to store object code.

In at least one embodiment, at least one component shown or described with respect to FIG. 42 is used to implement techniques and/or functions described in connection with FIGS. 1-16. In at least one embodiment, executable file 4210 implemented using source code 4200 is used to perform an API to cause a software kernel to be generated to perform an implicit matrix multiplication operation. In at least one embodiment, executable file 4210 implemented using source code 4200 is used to perform an API to cause one or more dimensions of a tensor to be modified. In at least one embodiment, executable file 4210 implemented using source code 4200 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 43:
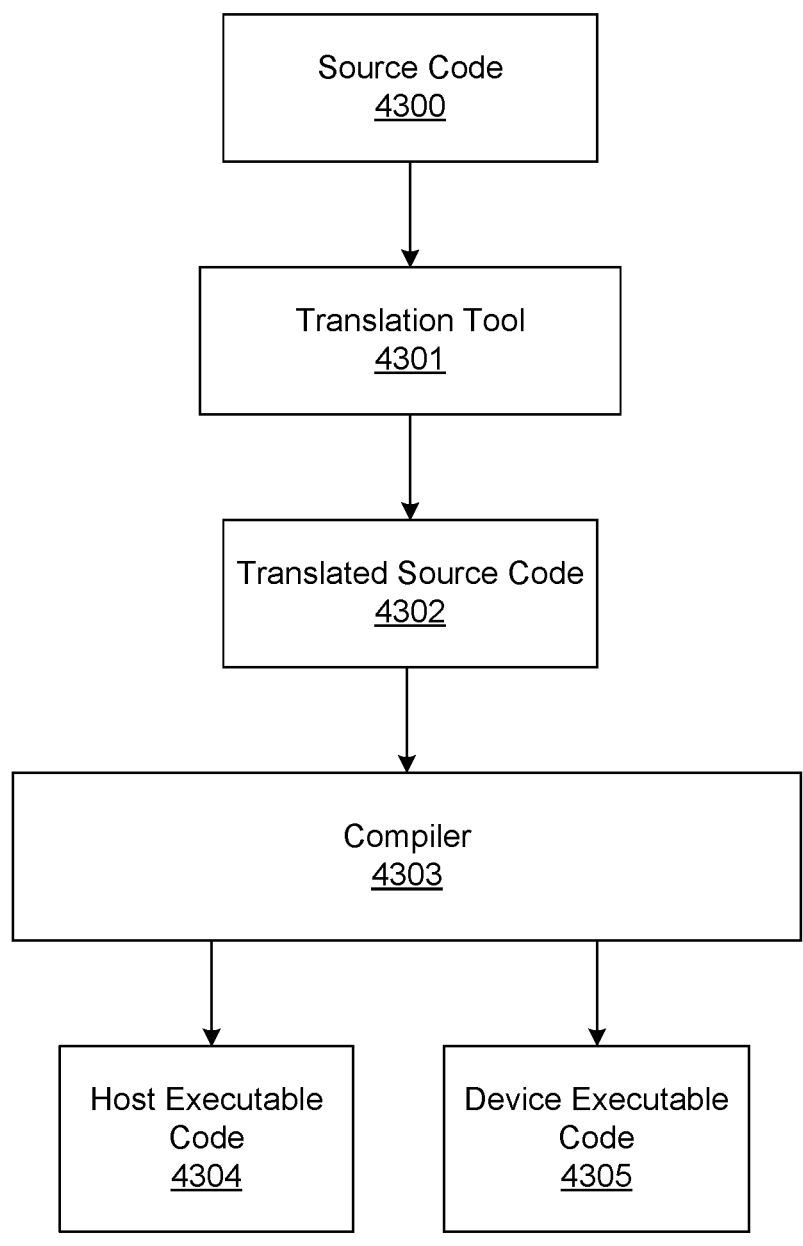
FIG. 43 illustrates translating source code prior to compiling source code, in accordance with at least one embodiment.

FIG. 43 illustrates translating source code prior to compiling source code, in accordance with at least one embodiment. In at least one embodiment, source code 4300 is passed through a translation tool 4301, which translates source code 4300 into translated source code 4302. In at least one embodiment, a compiler 4303 is used to compile translated source code 4302 into host executable code 4304 and device executable code 4305 in a process that is similar to compilation of source code 4100 by compiler 4101 into host executable code 4102 and device executable 4103, as discussed above in conjunction with FIG. 41.

In at least one embodiment, a translation performed by translation tool 4301 is used to port source 4300 for execution in a different environment than that in which it was originally intended to run. In at least one embodiment, translation tool 4301 may include, but is not limited to, a HIP translator that is used to "hipify" CUDA code intended for a CUDA platform into HIP code that can be compiled and executed on a ROCm platform. In at least one embodiment, translation of source code 4300 may include parsing source code 4300 and converting calls to API(s) provided by one programming model (e.g., CUDA) into corresponding calls to API(s) provided by another programming model (e.g., HIP), as discussed in greater detail below in conjunction with FIGS. 44A-45. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 4301 may sometimes be incomplete, requiring additional, manual effort to fully port source code 4300.

In at least one embodiment, at least one component shown or described with respect to FIG. 43 is used to implement techniques and/or functions described in connection with FIGS. 1-16. In at least one embodiment, at least one of host executable code 4304 or device executable code 4305 specified in source code 4300 is used to perform an API to cause a software kernel to be generated to perform an implicit matrix multiplication operation. In at least one embodiment, at least one of host executable code 4304 or device executable code 4305 specified in source code 4300 is used to perform an API to cause one or more dimensions of a tensor to be modified. In at least one embodiment, at least one of host executable code 4304 or device executable code 4305 specified in source code 4300 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Configuring GPUs for General-Purpose Computing

The following figures set forth, without limitation, exemplary architectures for compiling and executing compute source code, in accordance with at least one embodiment.

Figure 44A:
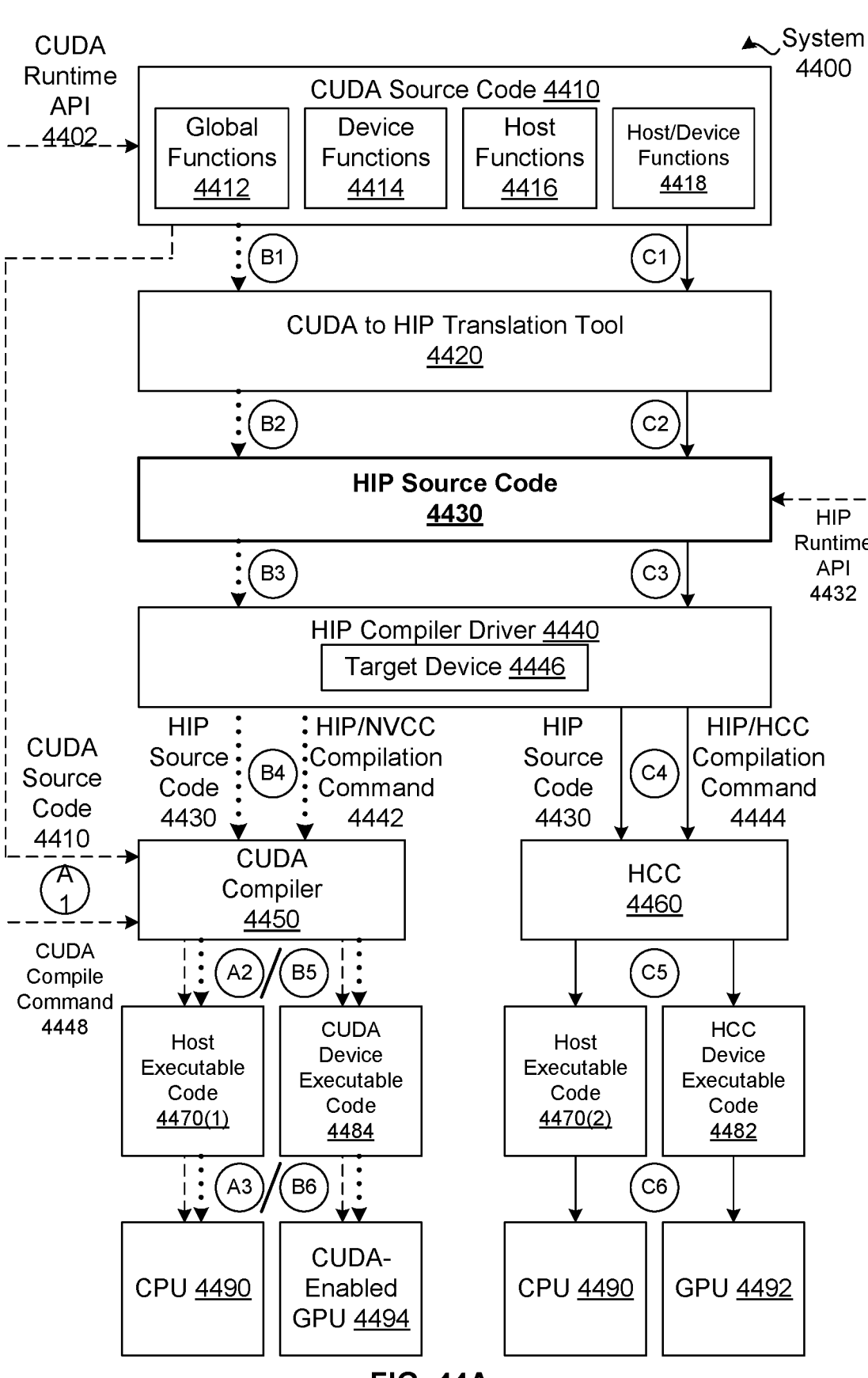
FIG. 44A illustrates a system configured to compile and execute CUDA source code using different types of processing units, in accordance with at least one embodiment.

FIG. 44A illustrates a system 44A00 configured to compile and execute CUDA source code 4410 using different types of processing units, in accordance with at least one embodiment. In at least one embodiment, system 44A00 includes, without limitation, CUDA source code 4410, a CUDA compiler 4450, host executable code 4470(1), host executable code 4470(2), CUDA device executable code 4484, a CPU 4490, a CUDA-enabled GPU 4494, a GPU 4492, a CUDA to HIP translation tool 4420, HIP source code 4430, a HIP compiler driver 4440, an HCC 4460, and HCC device executable code 4482.

In at least one embodiment, CUDA source code 4410 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 4490, GPU 44192, or another GPGPU, etc. In at least one embodiment, host code is source code that, after compilation, is executable on a host. In at least one embodiment, a host is a processor that is optimized for sequential instruction processing, such as CPU 4490.

In at least one embodiment, CUDA source code 4410 includes, without limitation, any number (including zero) of global functions 4412, any number (including zero) of device functions 4414, any number (including zero) of host functions 4416, and any number (including zero) of host/device functions 4418. In at least one embodiment, global functions 4412, device functions 4414, host functions 4416, and host/device functions 4418 may be mixed in CUDA source code 4410. In at least one embodiment, each of global functions 4412 is executable on a device and callable from a host. In at least one embodiment, one or more of global functions 4412 may therefore act as entry points to a device. In at least one embodiment, each of global functions 4412 is a kernel. In at least one embodiment and in a technique known as dynamic parallelism, one or more of global functions 4412 defines a kernel that is executable on a device and callable from such a device. In at least one embodiment, a kernel is executed N (where N is any positive integer) times in parallel by N different threads on a device during execution.

In at least one embodiment, each of device functions 4414 is executed on a device and callable from such a device only. In at least one embodiment, each of host functions 4416 is executed on a host and callable from such a host only. In at least one embodiment, each of host/device functions 4416 defines both a host version of a function that is executable on a host and callable from such a host only and a device version of the function that is executable on a device and callable from such a device only.

In at least one embodiment, CUDA source code 4410 may also include, without limitation, any number of calls to any number of functions that are defined via a CUDA runtime API 4402. In at least one embodiment, CUDA runtime API 4402 may include, without limitation, any number of functions that execute on a host to allocate and deallocate device memory, transfer data between host memory and device memory, manage systems with multiple devices, etc. In at least one embodiment, CUDA source code 4410 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 4402, a CUDA driver API, APIs for any number of CUDA libraries, etc. In at least one embodiment and relative to CUDA runtime API 4402, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 4450 compiles input CUDA code (e.g., CUDA source code 4410) to generate host executable code 4470(1) and CUDA device executable code 4484. In at least one embodiment, CUDA compiler 4450 is NVCC. In at least one embodiment, host executable code 4470(1) is a compiled version of host code included in input source code that is executable on CPU 4490. In at least one embodiment, CPU 4490 may be any processor that is optimized for sequential instruction processing.

In at least one embodiment, CUDA device executable code 4484 is a compiled version of device code included in input source code that is executable on CUDA-enabled GPU 4494. In at least one embodiment, CUDA device executable code 4484 includes, without limitation, binary code. In at least one embodiment, CUDA device executable code 4484 includes, without limitation, IR code, such as PTX code, that is further compiled at runtime into binary code for a specific target device (e.g., CUDA-enabled GPU 4494) by a device driver. In at least one embodiment, CUDA-enabled GPU 4494 may be any processor that is optimized for parallel instruction processing and that supports CUDA. In at least one embodiment, CUDA-enabled GPU 4494 is developed by NVIDIA Corporation of Santa Clara, CA.

In at least one embodiment, CUDA to HIP translation tool 4420 is configured to translate CUDA source code 4410 to functionally similar HIP source code 4430. In a least one embodiment, HIP source code 4430 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 4412, but such a HIP programming language may lack support for dynamic parallelism and therefore global functions 4412 defined in HIP code may be callable from a host only.

In at least one embodiment, HIP source code 4430 includes, without limitation, any number (including zero) of global functions 4412, any number (including zero) of device functions 4414, any number (including zero) of host functions 4416, and any number (including zero) of host/device functions 4418. In at least one embodiment, HIP source code 4430 may also include any number of calls to any number of functions that are specified in a HIP runtime API 4432. In at least one embodiment, HIP runtime API 4432 includes, without limitation, functionally similar versions of a subset of functions included in CUDA runtime API 4402. In at least one embodiment, HIP source code 4430 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 4432, a HIP driver API, APIs for any number of HIP libraries, APIs for any number of ROCm libraries, etc.

In at least one embodiment, CUDA to HIP translation tool 4420 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 4420 converts any number of calls to functions specified in CUDA runtime API 4402 to any number of calls to functions specified in HIP runtime API 4432.

In at least one embodiment, CUDA to HIP translation tool 4420 is a tool known as hipify-perl that executes a text-based translation process. In at least one embodiment, CUDA to HIP translation tool 4420 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 4420.

In at least one embodiment, HIP compiler driver 4440 is a front end that determines a target device 4446 and then configures a compiler that is compatible with target device 4446 to compile HIP source code 4430. In at least one embodiment, target device 4446 is a processor that is optimized for parallel instruction processing. In at least one embodiment, HIP compiler driver 4440 may determine target device 4446 in any technically feasible fashion.

In at least one embodiment, if target device 4446 is compatible with CUDA (e.g., CUDA-enabled GPU 4494), then HIP compiler driver 4440 generates a HIP/NVCC compilation command 4442. In at least one embodiment and as described in greater detail in conjunction with FIG. 44B, HIP/NVCC compilation command 4442 configures CUDA compiler 4450 to compile HIP source code 4430 using, without limitation, a HIP to CUDA translation header and a CUDA runtime library. In at least one embodiment and in response to HIP/NVCC compilation command 4442, CUDA compiler 4450 generates host executable code 4470(1) and CUDA device executable code 4484.

In at least one embodiment, if target device 4446 is not compatible with CUDA, then HIP compiler driver 4440 generates a HIP/HCC compilation command 4444. In at least one embodiment and as described in greater detail in conjunction with FIG. 44C, HIP/HCC compilation command 4444 configures HCC 4460 to compile HIP source code 4430 using, without limitation, an HCC header and a HIP/HCC runtime library. In at least one embodiment and in response to HIP/HCC compilation command 4444, HCC 4460 generates host executable code 4470(2) and HCC device executable code 4482. In at least one embodiment, HCC device executable code 4482 is a compiled version of device code included in HIP source code 4430 that is executable on GPU 4492. In at least one embodiment, GPU 4492 may be any processor that is optimized for parallel instruction processing, is not compatible with CUDA, and is compatible with HCC. In at least one embodiment, GPU 4492 is developed by AMD Corporation of Santa Clara, CA. In at least one embodiment GPU, 4492 is a non-CUDA-enabled GPU 4492.

For explanatory purposes only, three different flows that may be implemented in at least one embodiment to compile CUDA source code 4410 for execution on CPU 4490 and different devices are depicted in FIG. 44A. In at least one embodiment, a direct CUDA flow compiles CUDA source code 4410 for execution on CPU 4490 and CUDA-enabled GPU 4494 without translating CUDA source code 4410 to HIP source code 4430. In at least one embodiment, an indirect CUDA flow translates CUDA source code 4410 to HIP source code 4430 and then compiles HIP source code 4430 for execution on CPU 4490 and CUDA-enabled GPU 4494. In at least one embodiment, a CUDA/HCC flow translates CUDA source code 4410 to HIP source code 4430 and then compiles HIP source code 4430 for execution on CPU 4490 and GPU 4492.

A direct CUDA flow that may be implemented in at least one embodiment is depicted via dashed lines and a series of bubbles annotated A1-A3. In at least one embodiment and as depicted with bubble annotated A1, CUDA compiler 4450 receives CUDA source code 4410 and a CUDA compile command 4448 that configures CUDA compiler 4450 to compile CUDA source code 4410. In at least one embodiment, CUDA source code 4410 used in a direct CUDA flow is written in a CUDA programming language that is based on a programming language other than C++ (e.g., C, Fortran, Python, Java, etc.). In at least one embodiment and in response to CUDA compile command 4448, CUDA compiler 4450 generates host executable code 4470(1) and CUDA device executable code 4484 (depicted with bubble annotated A2). In at least one embodiment and as depicted with bubble annotated A3, host executable code 4470(1) and CUDA device executable code 4484 may be executed on, respectively, CPU 4490 and CUDA-enabled GPU 4494. In at least one embodiment, CUDA device executable code 4484 includes, without limitation, binary code. In at least one embodiment, CUDA device executable code 4484 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 4420 receives CUDA source code 4410. In at least one embodiment and as depicted with bubble annotated B2, CUDA to HIP translation tool 4420 translates CUDA source code 4410 to HIP source code 4430. In at least one embodiment and as depicted with bubble annotated B3, HIP compiler driver 4440 receives HIP source code 4430 and determines that target device 4446 is CUDA-enabled.

In at least one embodiment and as depicted with bubble annotated B4, HIP compiler driver 4440 generates HIP/NVCC compilation command 4442 and transmits both HIP/NVCC compilation command 4442 and HIP source code 4430 to CUDA compiler 4450. In at least one embodiment and as described in greater detail in conjunction with FIG. 44B, HIP/NVCC compilation command 4442 configures CUDA compiler 4450 to compile HIP source code 4430 using, without limitation, a HIP to CUDA translation header and a CUDA runtime library. In at least one embodiment and in response to HIP/NVCC compilation command 4442, CUDA compiler 4450 generates host executable code 4470 (1) and CUDA device executable code 4484 (depicted with bubble annotated B5). In at least one embodiment and as depicted with bubble annotated B6, host executable code 4470(1) and CUDA device executable code 4484 may be executed on, respectively, CPU 4490 and CUDA-enabled GPU 4494. In at least one embodiment, CUDA device executable code 4484 includes, without limitation, binary code. In at least one embodiment, CUDA device executable code 4484 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 4420 receives CUDA source code 4410. In at least one embodiment and as depicted with bubble annotated C2, CUDA to HIP translation tool 4420 translates CUDA source code 4410 to HIP source code 4430. In at least one embodiment and as depicted with bubble annotated C3, HIP compiler driver 4440 receives HIP source code 4430 and determines that target device 4446 is not CUDA-enabled.

In at least one embodiment, HIP compiler driver 4440 generates HIP/HCC compilation command 4444 and transmits both HIP/HCC compilation command 4444 and HIP source code 4430 to HCC 4460 (depicted with bubble annotated C4). In at least one embodiment and as described in greater detail in conjunction with FIG. 44C, HIP/HCC compilation command 4444 configures HCC 4460 to compile HIP source code 4430 using, without limitation, an HCC header and a HIP/HCC runtime library. In at least one embodiment and in response to HIP/HCC compilation command 4444, HCC 4460 generates host executable code 4470(2) and HCC device executable code 4482 (depicted with bubble annotated C5). In at least one embodiment and as depicted with bubble annotated C6, host executable code 4470(2) and HCC device executable code 4482 may be executed on, respectively, CPU 4490 and GPU 4492.

In at least one embodiment, after CUDA source code 4410 is translated to HIP source code 4430, HIP compiler driver 4440 may subsequently be used to generate executable code for either CUDA-enabled GPU 4494 or GPU 4492 without re-executing CUDA to HIP translation tool 4420. In at least one embodiment, CUDA to HIP translation tool 4420 translates CUDA source code 4410 to HIP source code 4430 that is then stored in memory. In at least one embodiment, HIP compiler driver 4440 then configures HCC 4460 to generate host executable code 4470(2) and HCC device executable code 4482 based on HIP source code 4430. In at least one embodiment, HIP compiler driver 4440 subsequently configures CUDA compiler 4450 to generate host executable code 4470(1) and CUDA device executable code 4484 based on stored HIP source code 4430.

In at least one embodiment, at least one component shown or described with respect to FIG. 44A is used to implement techniques and/or functions described in connection with FIGS. 1-16. In at least one embodiment, at least one element of system 4400 is used to perform an API to cause a software kernel to be generated to perform an implicit matrix multiplication operation. In at least one embodiment, at least one element of system 4400 is used to perform an API to cause one or more dimensions of a tensor to be modified. In at least one embodiment, at least one element of system 4400 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 44B:
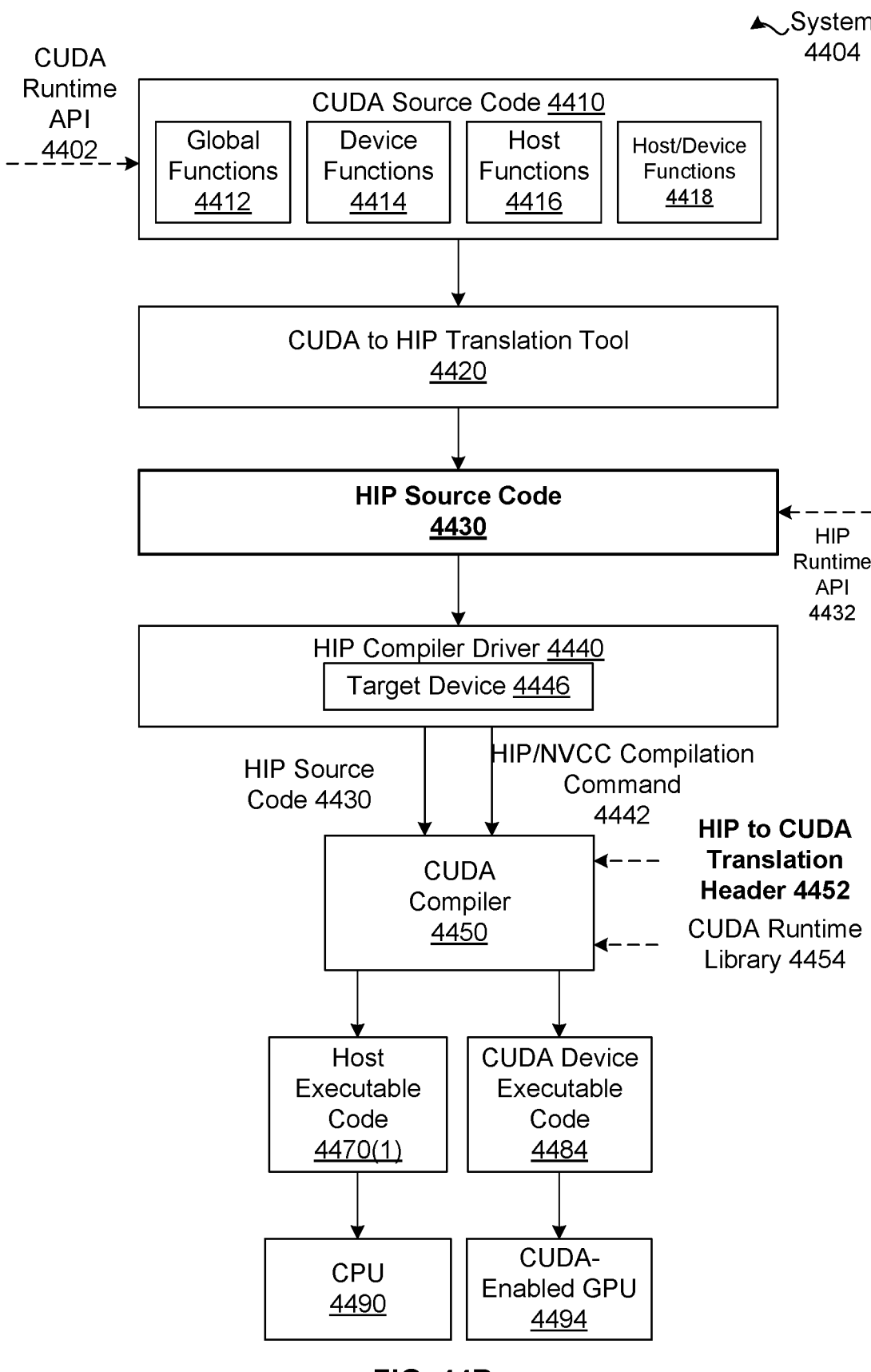
FIG. 44B illustrates a system configured to compile and execute CUDA source code of FIG. 44A using a CPU and a CUDA-enabled GPU, in accordance with at least one embodiment.

FIG. 44B illustrates a system 4404 configured to compile and execute CUDA source code 4410 of FIG. 44A using CPU 4490 and CUDA-enabled GPU 4494, in accordance with at least one embodiment. In at least one embodiment, system 4404 includes, without limitation, CUDA source code 4410, CUDA to HIP translation tool 4420, HIP source code 4430, HIP compiler driver 4440, CUDA compiler 4450, host executable code 4470(1), CUDA device executable code 4484, CPU 4490, and CUDA-enabled GPU 4494.

In at least one embodiment and as described previously herein in conjunction with FIG. 44A, CUDA source code 4410 includes, without limitation, any number (including zero) of global functions 4412, any number (including zero) of device functions 4414, any number (including zero) of host functions 4416, and any number (including zero) of host/device functions 4418. In at least one embodiment, CUDA source code 4410 also includes, without limitation, any number of calls to any number of functions that are specified in any number of CUDA APIs.

In at least one embodiment, CUDA to HIP translation tool 4420 translates CUDA source code 4410 to HIP source code 4430. In at least one embodiment, CUDA to HIP translation tool 4420 converts each kernel call in CUDA source code 4410 from a CUDA syntax to a HIP syntax and converts any number of other CUDA calls in CUDA source code 4410 to any number of other functionally similar HIP calls.

In at least one embodiment, HIP compiler driver 4440 determines that target device 4446 is CUDA-enabled and generates HIP/NVCC compilation command 4442. In at least one embodiment, HIP compiler driver 4440 then configures CUDA compiler 4450 via HIP/NVCC compilation command 4442 to compile HIP source code 4430. In at least one embodiment, HIP compiler driver 4440 provides access to a HIP to CUDA translation header 4452 as part of configuring CUDA compiler 4450. In at least one embodiment, HIP to CUDA translation header 4452 translates any number of mechanisms (e.g., functions) specified in any number of HIP APIs to any number of mechanisms specified in any number of CUDA APIs. In at least one embodiment, CUDA compiler 4450 uses HIP to CUDA translation header 4452 in conjunction with a CUDA runtime library 4454 corresponding to CUDA runtime API 4402 to generate host executable code 4470(1) and CUDA device executable code 4484. In at least one embodiment, host executable code 4470(1) and CUDA device executable code 4484 may then be executed on, respectively, CPU 4490 and CUDA-enabled GPU 4494. In at least one embodiment, CUDA device executable code 4484 includes, without limitation, binary code. In at least one embodiment, CUDA device executable code 4484 includes, without limitation, PTX code and is further compiled into binary code for a specific target device at runtime.

In at least one embodiment, at least one component shown or described with respect to FIG. 44B is used to implement techniques and/or functions described in connection with FIGS. 1-16. In at least one embodiment, at least one element of system 4404 is used to perform an API to cause a software kernel to be generated to perform an implicit matrix multiplication operation. In at least one embodiment, at least one element of system 4404 is used to perform an API to cause one or more dimensions of a tensor to be modified. In at least one embodiment, at least one element of system 4404 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 44C:
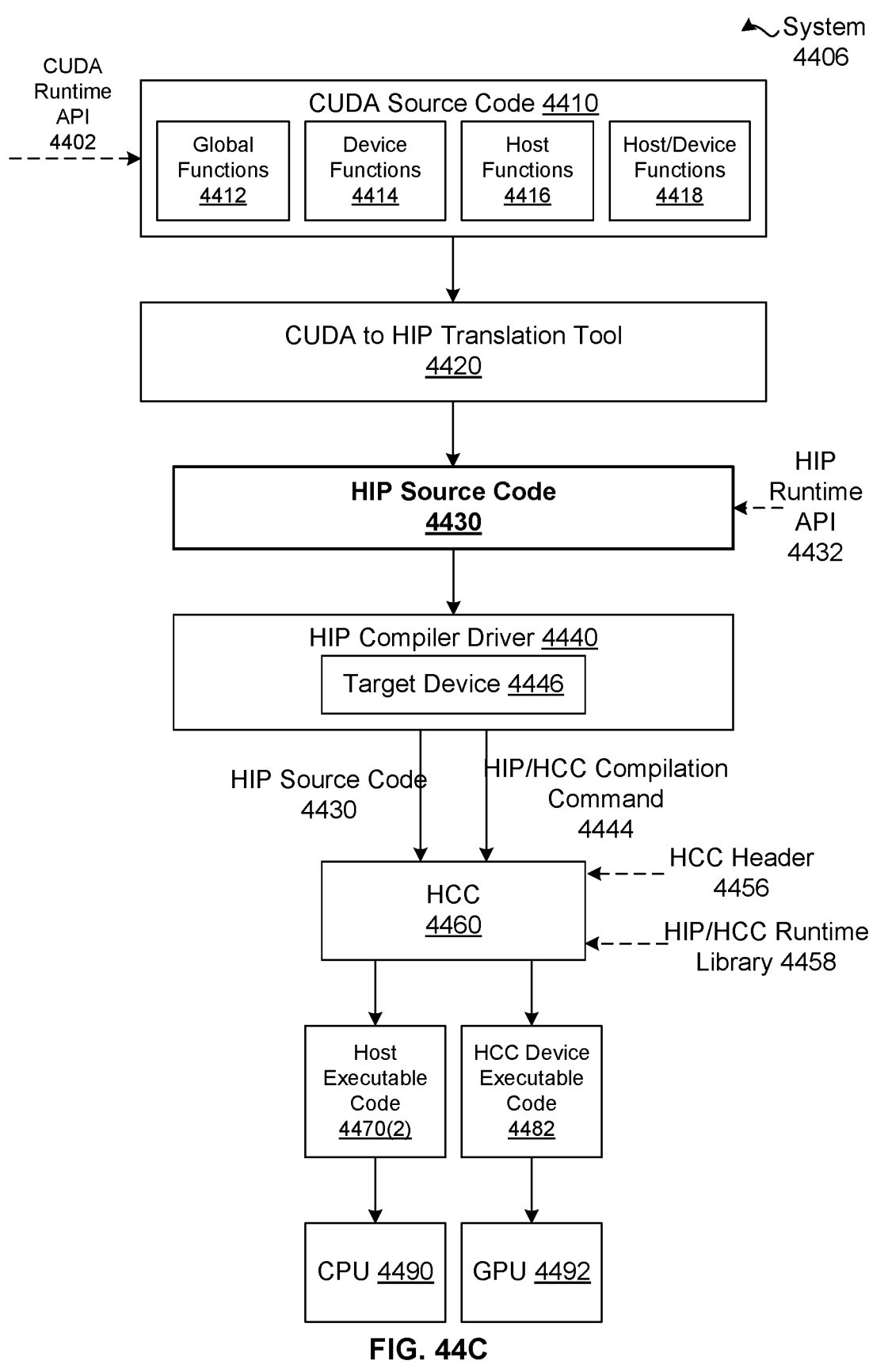
FIG. 44C illustrates a system configured to compile and execute CUDA source code of FIG. 44A using a CPU and a non-CUDA-enabled GPU, in accordance with at least one embodiment.

FIG. 44C illustrates a system 4406 configured to compile and execute CUDA source code 4410 of FIG. 44A using CPU 4490 and non-CUDA-enabled GPU 4492, in accordance with at least one embodiment. In at least one embodiment, system 4406 includes, without limitation, CUDA source code 4410, CUDA to HIP translation tool 4420, HIP source code 4430, HIP compiler driver 4440, HCC 4460, host executable code 4470(2), HCC device executable code 4482, CPU 4490, and GPU 4492.

In at least one embodiment and as described previously herein in conjunction with FIG. 44A, CUDA source code 4410 includes, without limitation, any number (including zero) of global functions 4412, any number (including zero) of device functions 4414, any number (including zero) of host functions 4416, and any number (including zero) of host/device functions 4418. In at least one embodiment, CUDA source code 4410 also includes, without limitation, any number of calls to any number of functions that are specified in any number of CUDA APIs.

In at least one embodiment, CUDA to HIP translation tool 4420 translates CUDA source code 4410 to HIP source code 4430. In at least one embodiment, CUDA to HIP translation tool 4420 converts each kernel call in CUDA source code 4410 from a CUDA syntax to a HIP syntax and converts any number of other CUDA calls in source code 4410 to any number of other functionally similar HIP calls.

In at least one embodiment, HIP compiler driver 4440 subsequently determines that target device 4446 is not CUDA-enabled and generates HIP/HCC compilation command 4444. In at least one embodiment, HIP compiler driver 4440 then configures HCC 4460 to execute HIP/HCC compilation command 4444 to compile HIP source code 4430. In at least one embodiment, HIP/HCC compilation command 4444 configures HCC 4460 to use, without limitation, a HIP/HCC runtime library 4458 and an HCC header 4456 to generate host executable code 4470(2) and HCC device executable code 4482. In at least one embodiment, HIP/HCC runtime library 4458 corresponds to HIP runtime API 4432. In at least one embodiment, HCC header 4456 includes, without limitation, any number and type of interoperability mechanisms for HIP and HCC. In at least one embodiment, host executable code 4470(2) and HCC device executable code 4482 may be executed on, respectively, CPU 4490 and GPU 4492.

In at least one embodiment, at least one component shown or described with respect to FIG. 44C is used to implement techniques and/or functions described in connection with FIGS. 1-16. In at least one embodiment, at least one element of system 4406 is used to perform an API to cause a software kernel to be generated to perform an implicit matrix multiplication operation. In at least one embodiment, at least one element of system 4406 is used to perform an API to cause one or more dimensions of a tensor to be modified. In at least one embodiment, at least one element of system 4406 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

FIG. 45 illustrates an exemplary kernel translated by CUDA-to-HIP translation tool 4420 of FIG. 44C, in accordance with at least one embodiment. In at least one embodiment, CUDA source code 4410 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 4410 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "global_" declaration specifier. In at least one embodiment, the dimension of a grid that executes a kernel for a given kernel call and associated streams are specified using a CUDA kernel launch syntax 4510. In at least one embodiment, CUDA kernel launch syntax 4510 is specified as "KernelName <<<GridSize, BlockSize, SharedMemorySize, Stream>>> (KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 4510 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 4510, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 4510, SharedMemorySize defaults to zero. In at least one embodiment and with respect to CUDA kernel launch syntax 4510, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 4410 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>> (A, B, C);". In at least one embodiment and as per CUDA kernel launch syntax 4510, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 4410 to HIP source code 4430, CUDA to HIP translation tool 4420 translates each kernel call in CUDA source code 4410 from CUDA kernel launch syntax 4510 to a HIP kernel launch syntax 4520 and converts any number of other CUDA calls in source code 4410 to any number of other functionally similar HIP calls. In at least one embodiment, HIP kernel launch syntax 4520 is specified as "hipLaunchKernelGGL (KernelName, GridSize, BlockSize, SharedMemorySize, Stream, KernelArguments);". In at least one embodiment, each of KernelName, GridSize, BlockSize, ShareMemory Size, Stream, and KernelArguments has the same meaning in HIP kernel launch syntax 4520 as in CUDA kernel launch syntax 4510 (described previously herein). In at least one embodiment, arguments SharedMemorySize and Stream are required in HIP kernel launch syntax 4520 and are optional in CUDA kernel launch syntax 4510.

In at least one embodiment, a portion of HIP source code 4430 depicted in FIG. 45 is identical to a portion of CUDA source code 4410 depicted in FIG. 45 except for a kernel call that causes kernel MatAdd to execute on a device. In at least one embodiment, kernel MatAdd is defined in HIP source code 4430 with the same "_global" declaration specifier with which kernel MatAdd is defined in CUDA source code 4410. In at least one embodiment, a kernel call in HIP source code 4430 is "hipLaunchKernelGGL (MatAdd, numBlocks, threadsPerBlock, 0, 0, A, B, C);", while a corresponding kernel call in CUDA source code 4410 is "MatAdd<<<numBlocks, threadsPerBlock>>> (A, B, C);".

In at least one embodiment, at least one component shown or described with respect to FIG. 45 is used to implement techniques and/or functions described in connection with FIGS. 1-16. In at least one embodiment, at least one of CUDA Source Code 4510, CUDA to HIP Translation Tool 4520, or HIP Source Code 4530 is used to perform an API to cause a software kernel to be generated to perform an implicit matrix multiplication operation. In at least one embodiment, at least one of CUDA Source Code 4510, CUDA to HIP Translation Tool 4520, or HIP Source Code 4530 is used to perform an API to cause one or more dimensions of a tensor to be modified. In at least one embodiment, at least one of CUDA Source Code 4510, CUDA to HIP Translation Tool 4520, or HIP Source Code 4530 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 46:
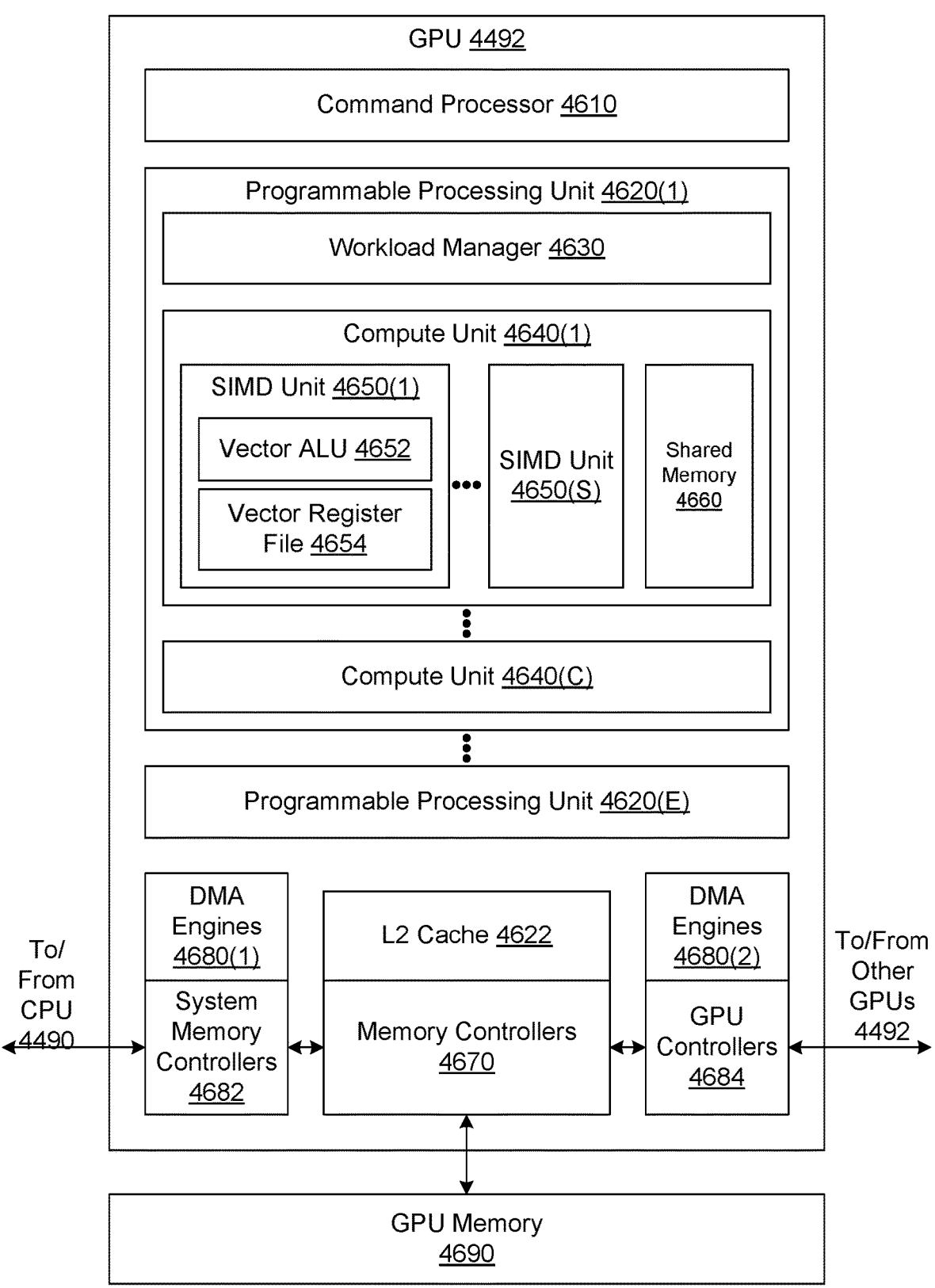
FIG. 46 illustrates non-CUDA-enabled GPU of FIG. 44C in greater detail, in accordance with at least one embodiment.

FIG. 46 illustrates non-CUDA-enabled GPU 4492 of FIG. 44C in greater detail, in accordance with at least one embodiment. In at least one embodiment, GPU 4492 is developed by AMD corporation of Santa Clara. In at least one embodiment, GPU 4492 can be configured to perform compute operations in a highly-parallel fashion. In at least one embodiment, GPU 4492 is configured to execute graphics pipeline operations such as draw commands, pixel operations, geometric computations, and other operations associated with rendering an image to a display. In at least one embodiment, GPU 4492 is configured to execute operations unrelated to graphics. In at least one embodiment, GPU 4492 is configured to execute both operations related to graphics and operations unrelated to graphics. In at least one embodiment, GPU 4492 can be configured to execute device code included in HIP source code 4430.

In at least one embodiment, GPU 4492 includes, without limitation, any number of programmable processing units 4620, a command processor 4610, an L2 cache 4622, memory controllers 4670, DMA engines 4680(1), system memory controllers 4682, DMA engines 4680(2), and GPU controllers 4684. In at least one embodiment, each programmable processing unit 4620 includes, without limitation, a workload manager 4630 and any number of compute units 4640. In at least one embodiment, command processor 4610 reads commands from one or more command queues (not shown) and distributes commands to workload managers 4630. In at least one embodiment, for each programmable processing unit 4620, associated workload manager 4630 distributes work to compute units 4640 included in programmable processing unit 4620. In at least one embodiment, each compute unit 4640 may execute any number of thread blocks, but each thread block executes on a single compute unit 4640. In at least one embodiment, a workgroup is a thread block.

In at least one embodiment, each compute unit 4640 includes, without limitation, any number of SIMD units 4650 and a shared memory 4660. In at least one embodiment, each SIMD unit 4650 implements a SIMD architecture and is configured to perform operations in parallel. In at least one embodiment, each SIMD unit 4650 includes, without limitation, a vector ALU 4652 and a vector register file 4654. In at least one embodiment, each SIMD unit 4650 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4660.

In at least one embodiment, programmable processing units 4620 are referred to as "shader engines." In at least one embodiment, each programmable processing unit 4620 includes, without limitation, any amount of dedicated graphics hardware in addition to compute units 4640. In at least one embodiment, each programmable processing unit 4620 includes, without limitation, any number (including zero) of geometry processors, any number (including zero) of rasterizers, any number (including zero) of render back ends, workload manager 4630, and any number of compute units 4640.

In at least one embodiment, compute units 4640 share L2 cache 4622. In at least one embodiment, L2 cache 4622 is partitioned. In at least one embodiment, a GPU memory 4690 is accessible by all compute units 4640 in GPU 4492. In at least one embodiment, memory controllers 4670 and system memory controllers 4682 facilitate data transfers between GPU 4492 and a host, and DMA engines 4680(1) enable asynchronous memory transfers between GPU 4492 and such a host. In at least one embodiment, memory controllers 4670 and GPU controllers 4684 facilitate data transfers between GPU 4492 and other GPUs 4492, and DMA engines 4680(2) enable asynchronous memory transfers between GPU 4492 and other GPUs 4492.

In at least one embodiment, GPU 4492 includes, without limitation, any amount and type of system interconnect that facilitates data and control transmissions across any number and type of directly or indirectly linked components that may be internal or external to GPU 4492. In at least one embodiment, GPU 4492 includes, without limitation, any number and type of I/O interfaces (e.g., PCIe) that are coupled to any number and type of peripheral devices. In at least one embodiment, GPU 4492 may include, without limitation, any number (including zero) of display engines and any number (including zero) of multimedia engines. In at least one embodiment, GPU 4492 implements a memory subsystem that includes, without limitation, any amount and type of memory controllers (e.g., memory controllers 4670 and system memory controllers 4682) and memory devices (e.g., shared memories 4660) that may be dedicated to one component or shared among multiple components. In at least one embodiment, GPU 4492 implements a cache subsystem that includes, without limitation, one or more cache memories (e.g., L2 cache 4622) that may each be private to or shared between any number of components (e.g., SIMD units 4650, compute units 4640, and programmable processing units 4620).

In at least one embodiment, at least one component shown or described with respect to FIG. 46 is used to implement techniques and/or functions described in connection with FIGS. 1-16. In at least one embodiment, at least one component shown or described with respect to FIG. 46 is used to perform an API to cause a software kernel to be generated to perform an implicit matrix multiplication operation. In at least one embodiment, at least one component shown or described with respect to FIG. 46 is used to perform an API to cause one or more dimensions of a tensor to be modified. In at least one embodiment, at least one component shown or described with respect to FIG. 46 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 47:
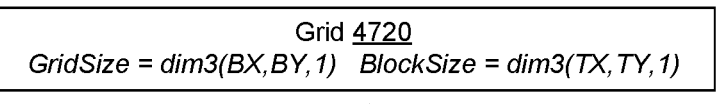
FIG. 47 illustrates how threads of an exemplary CUDA grid are mapped to different compute units of FIG. 46, in accordance with at least one embodiment.

FIG. 47 illustrates how threads of an exemplary CUDA grid 4720 are mapped to different compute units 4640 of FIG. 46, in accordance with at least one embodiment. In at least one embodiment and for explanatory purposes only, grid 4720 has a GridSize of BX by BY by 1 and a BlockSize of TX by TY by 1. In at least one embodiment, grid 4720 therefore includes, without limitation, (BX*BY) thread blocks 4730 and each thread block 4730 includes, without limitation, (TX*TY) threads 4740. Threads 4740 are depicted in FIG. 47 as squiggly arrows.

In at least one embodiment, grid 4720 is mapped to programmable processing unit 4620(1) that includes, without limitation, compute units 4640(1)-4640(C). In at least one embodiment and as shown, (BJ*BY) thread blocks 4730 are mapped to compute unit 4640(1), and the remaining thread blocks 4730 are mapped to compute unit 4640(2). In at least one embodiment, each thread block 4730 may include, without limitation, any number of warps, and each warp is mapped to a different SIMD unit 4650 of FIG. 46.

In at least one embodiment, warps in a given thread block 4730 may synchronize together and communicate through shared memory 4660 included in associated compute unit 4640. For example and in at least one embodiment, warps in thread block 4730 (BJ, 1) can synchronize together and communicate through shared memory 4660(1). For example and in at least one embodiment, warps in thread block 4730 (BJ+1,1) can synchronize together and communicate through shared memory 4660(2).

In at least one embodiment, at least one component shown or described with respect to FIG. 47 is used to implement techniques and/or functions described in connection with FIGS. 1-16. In at least one embodiment, at least one thread of exemplary CUDA grid 4720 is used to perform an API to cause a software kernel to be generated to perform an implicit matrix multiplication operation. In at least one embodiment, at least one thread of exemplary CUDA grid 4720 is used to perform an API to cause one or more dimensions of a tensor to be modified. In at least one embodiment, at least one thread of exemplary CUDA grid 4720 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

Figure 48:
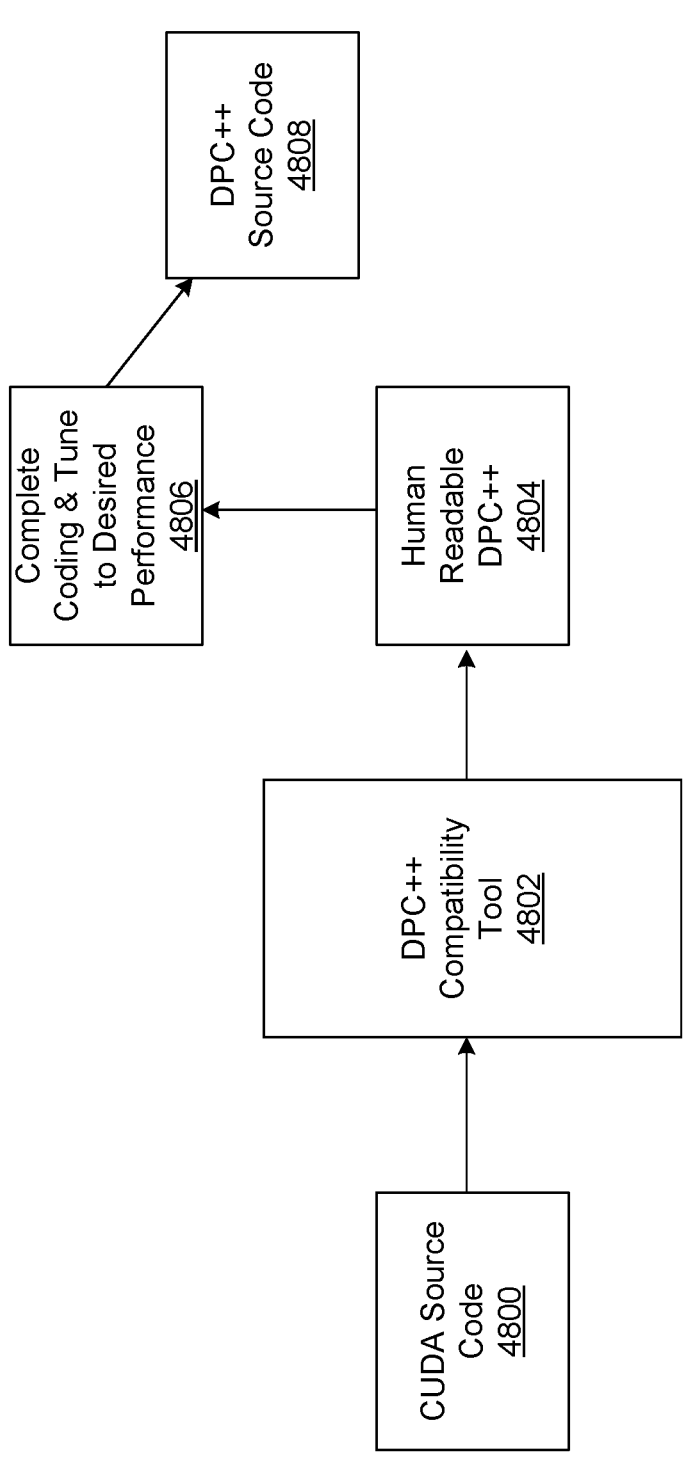
FIG. 48 illustrates how to migrate existing CUDA code to Data Parallel C++ code, in accordance with at least one embodiment.

FIG. 48 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4800 is provided as an input to a DPC++ compatibility tool 4802 to generate human readable DPC++ 4804. In at least one embodiment, human readable DPC++ 4804 includes inline comments generated by DPC++ compatibility tool 4802 that guides a developer on how and/or where to modify DPC++ code to complete coding and tuning to desired performance 4806, thereby generating DPC++ source code 4808.

In at least one embodiment, CUDA source code 4800 is or includes a collection of human-readable source code in a CUDA programming language. In at least one embodiment, CUDA source code 4800 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4800 described in connection with FIG. 48 may be in accordance with those discussed elsewhere in this document.

In at least one embodiment, DPC++ compatibility tool 4802 refers to an executable tool, program, application, or any other suitable type of tool that is used to facilitate migration of CUDA source code 4800 to DPC++ source code 4808. In at least one embodiment, DPC++ compatibility tool 4802 is a command-line-based code migration tool available as part of a DPC++ tool kit that is used to port existing CUDA sources to DPC++. In at least one embodiment, DPC++ compatibility tool 4802 converts some or all source code of a CUDA application from CUDA to DPC++ and generates a resulting file that is written at least partially in DPC++, referred to as human readable DPC++ 4804. In at least one embodiment, human readable DPC++ 4804 includes comments that are generated by DPC++ compatibility tool 4802 to indicate where user intervention may be necessary. In at least one embodiment, user intervention is necessary when CUDA source code 4800 calls a CUDA API that has no analogous DPC++ API; other examples where user intervention is required are discussed later in greater detail.

In at least one embodiment, a workflow for migrating CUDA source code 4800 (e.g., application or portion thereof) includes creating one or more compilation database files; migrating CUDA to DPC++ using a DPC++ compatibility tool 4802; completing migration and verifying correctness, thereby generating DPC++ source code 4808; and compiling DPC++ source code 4808 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4802 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4802 migrates CUDA code (e.g., applications) written in CUDA to DPC++ by generating DPC++ wherever possible. In at least one embodiment, DPC++ compatibility tool 4802 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4802 to migrate CUDA code to DPC++. In at least one embodiment, non-CUDA C++ code and files are migrated as is. In at least one embodiment, DPC++ compatibility tool 4802 generates human readable DPC++ 4804 which may be DPC++ code that, as generated by DPC++ compatibility tool 4802, cannot be compiled by DPC++ compiler and requires additional plumbing for verifying portions of code that were not migrated correctly, and may involve manual intervention, such as by a developer. In at least one embodiment, DPC++ compatibility tool 4802 provides hints or tools embedded in code to help developers manually migrate additional code that could not be migrated automatically. In at least one embodiment, migration is a one-time activity for a source file, project, or application.

In at least one embodiment, DPC++ compatibility tool 48002 is able to successfully migrate all portions of CUDA code to DPC++ and there may simply be an optional step for manually verifying and tuning performance of DPC++ source code that was generated. In at least one embodiment, DPC++ compatibility tool 4802 directly generates DPC++ source code 4808 which is compiled by a DPC++ compiler without requiring or utilizing human intervention to modify DPC++ code generated by DPC++ compatibility tool 4802. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4802. In at least one embodiment, CUDA source code includes one or more header files which may include CUDA header files. In at least one embodiment, a CUDA source file includes a<cuda.h>header file and a<stdio.h>header file which can be used to print text. In at least one embodiment, a portion of a vector addition kernel CUDA source file may be written as or related to:

```
#include <cuda.h>
#include <stdio.h>
#define VECTOR_SIZE 256
[   ]   global_void   VectorAddKernel(float*A,   float*B,
    float*C)
{
    A [threadIdx.x]=threadIdx.x+1.0f;
    B [threadIdx.x]=threadIdx.x+1.0f;
    C [threadIdx.x]=A [threadIdx.x]+B [threadIdx.x];
}
int main( )
{
    float*d_A,*d_B,*d_C;
    cudaMalloc(&d_A, VECTOR_SIZE*sizeof (float));
    cudaMalloc(&d_B, VECTOR_SIZE*sizeof (float));
    cudaMalloc(&d_C, VECTOR_SIZE*sizeof (float));
    VectorAddKernel  <<<1,  VECTOR_SIZE>>>  (d_A,
        d_B, d_C);
    float Result [VECTOR_SIZE]={ };
    cudaMemcpy (Result,  d_C,  VECTOR_SIZE*sizeof
        (float),
    cudaMemcpyDeviceToHost);
    cudaFree(d_A);
    cudaFree(d_B);
    cudaFree(d_C);
```

```
for (int i=0; i<VECTOR_SIZE; i++ {
    if (i % 16==0) {
        printf("\n");
    }
    printf("% f", Result[i]);
}
return 0;
}
```

In at least one embodiment and in connection with CUDA source file presented above, DPC++ compatibility tool 4802 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ) In at least one embodiment, DPC++ compatibility tool 4802 converts CUDA thread IDs used to index work elements to SYCL standard addressing for work elements via a local ID as part of migrating CUDA code to DPC++ code. In at least one embodiment, DPC++ code generated by DPC++ compatibility tool 4802 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4802. In at least one embodiment, DPC++ compatibility tool 4802 modify CUDA APIs for memory setup and/or host calls to execute kernel on the acceleration device. In at least one embodiment and in connection with CUDA source file presented above, a corresponding human readable DPC++ 4804 (e.g., which can be compiled) is written as or related to:

```
#include <CL/sycl.hpp>
#include <dpct/dpct.hpp>
#define VECTOR_SIZE 256
```

```
void VectorAddKernel(float*A, float*B, float*C,
    sycl: nd_item<3>item_ct1)
{
    A [item_ct1.get_local_id (2)]=item_ct1.get_local_id
        (2)+1.0f;
    B [item_ct1.get_local_id (2)]=item_ct1.get_local_id
        (2)+1.0f;
    C [item_ct1.get_local_id (2)]=
        A          [item_ct1.get_local_id          (2)]+B
        [item_ct1.get_local_id (2)];
}
int main( )
{
    float*d_A,*d_B,*d_C;
    d_A=(float*)                    sycl::malloc_device
        (VECTOR_SIZE*sizeof (float),
        dpct::get_current_device( )
        dpct::get_default_context( );
    d_B=(float*)                    sycl::malloc_device
        (VECTOR_SIZE*sizeof (float),
        dpct::get_current_device( )
        dpct::get_default_context( );
    d_C=(float*)                    sycl::malloc_device
        (VECTOR_SIZE*sizeof (float),
        dpct::get_current_device( )
        dpct::get_default_context( )
    dpct::get_default_queue_wait( ) submit ([&] (sycl::
        handler &cgh) {
        cgh.parallel_for (
            sycl: nd_range<3> (sycl::range<3> (1, 1, 1)*
                sycl: range<3> (1, 1, VECTOR_SIZE)*
                sycl: range<3> (1, 1, VECTOR_SIZE)),
            [=] (sycl: nd_items<3>item_ct1) {
            VectorAddKernel(d_A, d_B, d_C, item_ct1);
        });
    });
    float Result [VECTOR_SIZE]={ };
    dpct::get_default_queue_wait( )
        .memcpy (Result,  d_C,  VECTOR_SIZE*sizeof
        (float))
        .wait0;
    sycl::free (d_A, dpct::get_default_context( )
    sycl::free (d_B, dpct::get_default_context( );
    sycl::free (d_C, dpct::get_default_context( )
    for (int i=0; i<VECTOR_SIZE; i++ {
        if (i % 16=0) {
            printf ("\n");
        }
        printf ("% f", Result [i]);
    }
    return 0;
}
```

In at least one embodiment, human readable DPC++ 4804 refers to output generated by DPC++ compatibility tool 4802 and may be optimized in one manner or another. In at least one embodiment, human readable DPC++ 4804 generated by DPC++ compatibility tool 4802 can be manually edited by a developer after migration to make it more maintainable, performance, or other considerations. In at least one embodiment, DPC++ code generated by DPC++ compatibility tool 48002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4802 replace uses of unified shared memory with accessors. In at least one embodiment, DPC++ compatibility tool 4802 has an option to change how it migrates CUDA code to DPC++ code. In at least one embodiment, DPC++ compatibility tool 4802 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4802; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, one VPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, at least one component shown or described with respect to FIG. 48 is used to implement techniques and/or functions described in connection with FIGS. 1-16. In at least one embodiment, at least one component shown or described with respect to FIG. 48 is used to perform an API to cause a software kernel to be generated to perform an implicit matrix multiplication operation. In at least one embodiment, at least one component shown or described with respect to FIG. 48 is used to perform an API to cause one or more dimensions of a tensor to be modified. In at least one embodiment at least one component shown or described with respect to FIG. 48 is used to perform at least one aspect described with respect to example computer system 100, example data structure 200, example algorithm 300, example data flow 400, example process 500, example data flow 600, example data flow 700, example data flow 800, example data flow 900, example data flow 1000, example data flow 1100, example data flow 1200, example data flow 1300, example data flow 1400, example API 1500, and/or example API 1600.

It should be noted that, while example embodiments described herein may relate to a CUDA programming model, techniques described herein can be utilized with any suitable programming model, such HIP, oneAPI, and/or variations thereof.

At least one embodiment of the disclosure can be described in view of the following clauses:

1. A processor, comprising:
one or more circuits to perform an application programming interface (API) to cause one or more dimensions of a tensor to be modified.

2. The processor of clause 1, wherein the API is to further cause a software kernel to be generated to cause the one or more dimensions of the tensor to be modified.

3. The processor of clause 1 or 2, wherein the one or more dimensions of the tensor are to be modified based, at least in part, on a tensor reduction operation.

4. The processor of any of clauses 1-3, wherein the one or more circuits are to further perform a second API to perform a convolution operation before the API to cause one or more dimensions of the tensor to be modified is performed.

5. The processor of any of clauses 1-4, wherein the one or more circuits are to cause the one or more dimensions of the tensor to be modified by at least converting the tensor to a matrix.

6. The processor of any of clauses 1-5, wherein the tensor is an image tensor.

7. The processor of any of clauses 1-6, wherein the one or more circuits are to further perform a second API to cause a convolution operation and a tensor reduction operation to be combined into a software kernel.

8. A computer-implemented method, comprising:
performing an application programming interface (API) to cause one or more dimensions of a tensor to be modified.

9. The computer-implemented method of clause 8, further comprising:
generating a software kernel to cause the one or more dimensions of the tensor to be modified.

10. The computer-implemented method of clause 8 or 9, wherein the one or more dimensions of the tensor are to be modified based, at least in part, on a tensor reduction operation.

11. The computer-implemented method of any of clauses 8-10, further comprising:
performing a convolution operation before causing the one or more dimensions of the tensor to be modified.

12. The computer-implemented method of any of clauses 8-11, further comprising:
modifying one or more of the one or more dimensions of the tensor by converting the tensor to a matrix.

13. The computer-implemented method of any of clauses 8-12, wherein the tensor is an operand of a convolution operation.

14. The computer-implemented method of any of clauses 8-13, further comprising:
performing a second API to cause a convolution operation and a tensor reduction operation to be combined into a software kernel.

15. A computer system, comprising:
one or more processors and memory storing executable instructions that, if executed by the one or more processors, cause the one or more processors to perform an application programming interface (API) to cause one or more dimensions of a tensor to be modified.

16 The computer system of clause 15, wherein the API is to further cause a software kernel to be generated to cause the one or more dimensions of the tensor to be modified.

17. The computer system of clause 15 or 16, wherein the tensor is a result of a convolution operation.

18. The computer system of any of clauses 15-17, wherein the one or more circuits are to further perform a second API to perform a convolution operation before the API to cause one or more dimensions of the tensor to be modified is performed.

19. The computer system of any of clauses 15-18, wherein at least one of the one or more dimensions of the tensor are reduced to a scalar value.

20. The computer system of any of clauses 15-19, wherein the tensor is a result of a data processing operation.

21 The computer system of any of clauses 15-20, wherein the one or more circuits are to further perform a second API to cause a convolution operation and a tensor reduction operation to be combined into a software kernel.

22. A machine-readable medium having stored thereon a set of instructions, which if performed by one or more processors, cause the one or more processors to perform an application programming interface (API) to cause one or more dimensions of a tensor to be modified.

23. The machine-readable medium of clause 22, wherein the API is to further cause a software kernel to be generated to cause the one or more dimensions of the tensor to be modified.

24 The machine-readable medium of clause 22 or 23, wherein the one or more circuits are to cause the one or more dimensions of the tensor to be modified based, at least in part, on a reduction operation.

25. The machine-readable medium of any of clauses 22-24, wherein the tensor is to be generated from a operand of an implicit matrix multiplication operation.

26 The machine-readable medium of any of clauses 22-25, wherein the tensor is to be generated, at least in part, on a result of an implicit matrix multiplication operation.

27 The machine-readable medium of any of clauses 22-26, wherein the tensor is a result of convolution operation.

28 The machine-readable medium of any of clauses 22-27, wherein the one or more circuits are to further perform a second API to cause a convolution operation and a tensor reduction operation to be combined into a software kernel.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
one or more circuits to perform, based, at least in part, on an application programming interface (API) call to perform a tensor modification operation to increase or decrease a number of dimensions of a tensor:
a compiler operation to combine a convolution operation and the tensor modification operation into a same software kernel for execution.

2. The processor of claim 1, wherein the API is to further cause the same software kernel to be generated to cause one or more dimensions of a tensor to be modified.

3. The processor of claim 2, wherein the one or more dimensions of the tensor are to be modified based, at least in part, on a tensor reduction operation.

4. The processor of claim 2, wherein the one or more circuits are to modify the one or more dimensions of the tensor so that the one or more tensor operations can be performed in the same software kernel.

5. The processor of claim 2, wherein the one or more circuits are to use the tensor with modified dimensions in the same software kernel to perform two or more tensor operations.

6. The processor of claim 1, wherein the one or more circuits are to further perform a second API to perform the convolution operation using a general matrix multiply operation.

7. The processor of claim 1, wherein the one or more circuits are to cause one or more dimensions of a tensor to be modified by at least converting the tensor to a matrix.

8. The processor of claim 1, wherein a tensor of the tensor modification operation is an image tensor.

9. The processor of claim 1, wherein the one or more circuits are to further perform the API to increase or decrease the number of dimensions of the tensor to match dimensions of a general matrix multiply operation to implement the convolution operation.

10. A computer-implemented method, comprising:
performing, based, at least in part, on an application programming interface (API) call to perform a tensor modification operation to increase or decrease a number of dimensions of a tensor:
a compiler operation to combine a convolution operation and the tensor modification operation into a same software kernel for execution.

11. The computer-implemented method of claim 10, further comprising:
generating the same software kernel to cause one or more dimensions of a tensor to be modified.

12. The computer-implemented method of claim 11, wherein the one or more dimensions of the tensor are to be modified based, at least in part, on a tensor reduction operation.

13. The computer-implemented method of claim 10, further comprising:
performing the convolution operation using a general matrix multiply operation.

14. The computer-implemented method of claim 10, further comprising:
modifying one or more dimensions of a tensor by converting the tensor to a matrix.

15. The computer-implemented method of claim 10, wherein a tensor of the tensor modification operation is an operand of the convolution operation.

16. The computer-implemented method of claim 10, further comprising:
performing the API to increase or decrease the number of dimensions of the tensor to match dimensions of a general matrix multiply operation to implement the convolution operation.

17. A computer system, comprising:
one or more processors and memory storing executable instructions that, if executed by the one or more processors, cause the one or more processors to perform, based, at least in part, on an application programming interface (API) call to perform a tensor modification operation to increase or decrease a number of dimensions of a tensor:
a compiler operation to combine a convolution operation and the tensor modification operation into a same software kernel for execution.

18. The computer system of claim 17, wherein the API is to further cause the same software kernel to be generated to cause one or more dimensions of a tensor to be modified.

19. The computer system of claim 18, wherein the tensor is a result of the convolution operation.

20. The computer system of claim 17, wherein the one or more processors are to further perform a second API to perform the convolution operation using a general matrix multiply operation.

21. The computer system of claim 18, wherein at least one of the one or more dimensions of the tensor are reduced to a scalar value.

22. The computer system of claim 18, wherein the tensor is a result of a data processing operation.

23. The computer system of claim 17, wherein the one or more processors are to further perform the API to increase or decrease the number of dimensions of the tensor to match dimensions of a general matrix multiply operation to implement the convolution operation.

24. A machine-readable medium having stored thereon a set of instructions, which if performed by one or more processors, cause the one or more processors to:
perform an application programming interface (API) for a tensor modification operation to increase or decrease a number of dimensions of a tensor; and
combine a convolution operation and the tensor modification operation into a same software kernel for execution.

25. The machine-readable medium of claim 24, wherein the API is to further cause the same software kernel to be generated to cause one or more dimensions of a tensor to be modified.

26. The machine-readable medium of claim 25, wherein the one or more processors are to cause the one or more dimensions of the tensor to be modified based, at least in part, on a reduction operation.

27. The machine-readable medium of claim 25, wherein the tensor is to be generated from an operand of an implicit matrix multiplication operation.

28. The machine-readable medium of claim 25, wherein the tensor is to be generated, at least in part, on a result of an implicit matrix multiplication operation.

29. The machine-readable medium of claim 25, wherein the tensor is a result of the convolution operation.

30. The machine-readable medium of claim 24, wherein the one or more processors are to further perform the API to increase or decrease the number of dimensions of the tensor to match dimensions of a general matrix multiply operation to implement the convolution operation.

* * * * *